United States Patent
Jeon et al.

(10) Patent No.: US 9,204,026 B2
(45) Date of Patent: Dec. 1, 2015

(54) MOBILE TERMINAL AND METHOD OF CONTROLLING AN IMAGE PHOTOGRAPHING THEREIN

(75) Inventors: Jinsoo Jeon, Gyeonggi-do (KR); Jongseok Park, Gyeonggi-do (KR); Taeyun Kim, Gyeonggi-do (KR); Hayang Jung, Seoul (KR); Shinhae Lee, Seoul (KR); Seunghyun Woo, Seoul (KR); Kyunghee Kang, Gyeonggi-do (KR); Dongok Kim, Seoul (KR); Hyoungyoon Kim, Seoul (KR); Ramchan Woo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 505 days.

(21) Appl. No.: 13/205,472

(22) Filed: Aug. 8, 2011

(65) Prior Publication Data

US 2012/0105579 A1 May 3, 2012

(30) Foreign Application Priority Data

Nov. 1, 2010 (KR) ......................... 10-2010-0107683
Nov. 2, 2010 (KR) ......................... 10-2010-0108109

(51) Int. Cl.
*G03B 33/00* (2006.01)
*H04N 5/232* (2006.01)
(Continued)

(52) U.S. Cl.
CPC .............. *H04N 5/232* (2013.01); *H04N 5/2258* (2013.01); *H04N 5/23238* (2013.01);
(Continued)

(58) Field of Classification Search
CPC ..... H04N 5/2258; H04N 13/025; G03B 3/00; G03B 13/18; G03B 7/38; G03B 7/285
See application file for complete search history.

(56) References Cited

U.S. PATENT DOCUMENTS 6,408,140 B1 *  6/2002  Malloy Desormeaux .... 396/429
7,102,686 B1    9/2006  Orimoto et al.
(Continued)

FOREIGN PATENT DOCUMENTS

| EP | 0642275 | 3/1995 |
|---|---|---|
| JP | 2004-172978 | 6/2004 |
| JP | 2005-109979 | 4/2005 |

OTHER PUBLICATIONS

European Patent Office Application Serial No. 11006887.1, Search Report dated Jan. 2, 2013, 12 pages.
(Continued)

*Primary Examiner* — Tung Vo
*Assistant Examiner* — Joseph Becker
(74) *Attorney, Agent, or Firm* — Lee, Hong, Degerman, Kang & Waimey

(57) ABSTRACT

A mobile terminal and method of controlling an image photographing therein are disclosed, by which a user interface for effectively receiving an input of a control command for each of a plurality of cameras provided to a mobile terminal can be provided. The present invention includes receiving an input of a first image and an input of a second image using a first camera and a second camera, respectively, setting a first photographing condition for the first camera and a second photographing condition for the second camera, photographing the first image and the second image using the first camera and the second camera according to the set first photographing condition and the set second photographing condition, respectively, generating a third image by synthesizing the photographed first and second images together, and displaying the generated third image as a photographed image.

19 Claims, 73 Drawing Sheets

(51) Int. Cl.
  *H04N 5/225* (2006.01)
  *H04N 5/247* (2006.01)
  *H04N 5/77* (2006.01)
  *H04N 9/82* (2006.01)
  *H04N 13/02* (2006.01)

(52) U.S. Cl.
  CPC .......... *H04N 5/23245* (2013.01); *H04N 5/247* (2013.01); *H04N 5/772* (2013.01); *H04N 9/8227* (2013.01); *H04N 13/0239* (2013.01); *H04N 13/0285* (2013.01)

(56) References Cited

U.S. PATENT DOCUMENTS

| | | | |
|---|---|---|---|
| 8,675,085 B2 * | 3/2014 | Beckers et al. | 348/218.1 |
| 2001/0051509 A1 | 12/2001 | Mukai et al. | |
| 2005/0030391 A1 | 2/2005 | Ishii | |
| 2005/0041132 A1 * | 2/2005 | Juen et al. | 348/333.12 |
| 2007/0046809 A1 | 3/2007 | Nakamura | |
| 2007/0279482 A1 | 12/2007 | Oswald et al. | |
| 2008/0158346 A1 * | 7/2008 | Okamoto et al. | 348/47 |
| 2010/0097444 A1 | 4/2010 | Lablans | |
| 2010/0134597 A1 * | 6/2010 | Wu et al. | 348/47 |
| 2010/0225744 A1 | 9/2010 | Tomizawa et al. | |

OTHER PUBLICATIONS

European Patent Office Application Serial No. 11006887.1, Search Report dated Nov. 9, 2012, 6 pages.

Doutre, et al., "Correcting Unsynchronized Zoom in 3D Video," IEEE International Symposium on Circuits and Systems, XP031725151, May 2010, pp. 3244-3247.

European Patent Office Application Serial No. 11006887.1, Office Action dated Mar. 30, 2015, 6 pages.

\* cited by examiner

Left eye

220

Right eye

230

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(c)

(a)

(b)

(a)

(b)

(a)

(b)

(a)

(b)

(c)

(a)

(c)

(b)

(d)

MOBILE TERMINAL AND METHOD OF CONTROLLING AN IMAGE PHOTOGRAPHING THEREIN

CROSS-REFERENCE TO RELATED APPLICATIONS

Pursuant to 35 U.S.C. §119(a), this application claims the benefit of earlier filing date and right of priority to Korean Application Nos. 10-2010-0107683, filed on Nov. 1, 2010 and 10-2010-0108109, filed on Nov. 2, 2010, the contents of which are hereby incorporated by reference herein in their entirety.

BACKGROUND OF THE INVENTION

1. Field of the Invention

The present invention relates to a mobile terminal, and more particularly, to a mobile terminal and method of controlling an image photographing therein. Although the present invention is suitable for a wide scope of applications, it is particularly suitable for a mobile terminal having a plurality of cameras.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural part and/or software part of the terminal.

Generally, a mobile terminal having a plurality of cameras can perform each photographing operation using a plurality of the cameras.

However, the mobile terminal is unable to provide a user interface effective to input a camera related control command to each of a plurality of the cameras.

Moreover, the mobile terminal is unable to generate a new photographed image using a plurality of images taken via a plurality of the cameras.

SUMMARY OF THE INVENTION

Accordingly, the present invention is directed to a mobile terminal and method of controlling an image photographing therein that substantially obviate one or more problems due to limitations and disadvantages of the related art.

An object of the present invention is to provide a mobile terminal and method of controlling an image photographing therein, by which a user interface for effectively receiving an input of a control command for each of a plurality of cameras provided to a mobile terminal can be provided.

Another object of the present invention is to provide a mobile terminal and method of controlling an image photographing therein, by which a new photographed image can be provided in a manner of being generated from a plurality of images photographed to match each photographing condition using a plurality of cameras provided to the mobile terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a first camera receiving an input of a first image, a second camera receiving an input of a second image, a controller setting a first photographing condition for the first camera and a second photographing condition for the second camera, the controller photographing the first image and the second image using the first camera and the second camera according to the set first photographing condition and the set second photographing condition, respectively, the controller generating a third image by synthesizing the photographed first and second images together, and a display unit displaying the generated third image as a photographed image under the control of the controller.

In another aspect of the present invention, a method of controlling an image photographing in a mobile terminal includes the steps of receiving an input of a first image and an input of a second image using a first camera and a second camera, respectively, setting a first photographing condition for the first camera and a second photographing condition for the second camera, photographing the first image and the second image using the first camera and the second camera according to the set first photographing condition and the set second photographing condition, respectively, generating a third image by synthesizing the photographed first and second images together, and displaying the generated third image as a photographed image.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts. The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

Figure 1:
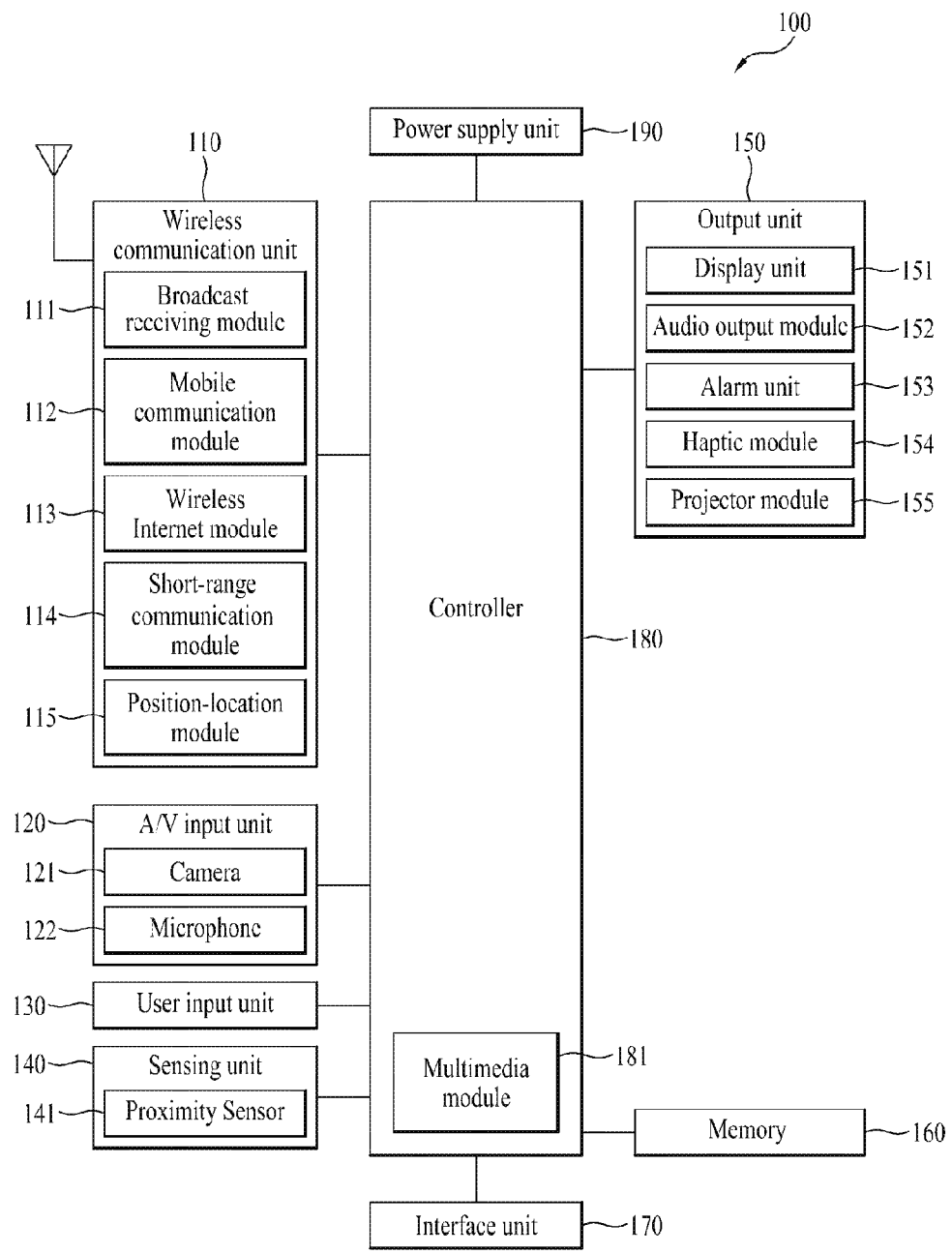
FIG. 1 is a block diagram of a mobile terminal according to one embodiment of the present invention.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (NV) input unit 120 is configured to provide audio or video signal input to the mobile terminal 100. As shown, the NV input unit 120 includes a camera 121 and a microphone 122. The camera 121 receives and processes image frames of still pictures or video, which are obtained by an image sensor in a video call mode or a photographing mode. And, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user is able to see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

In case that the display unit 151 and a sensor for detecting a touch action (hereinafter called 'touch sensor') configures a mutual layer structure (hereinafter called 'touchscreen'), it is able to use the display unit 151 as an input device as well as an output device. In this case, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display unit 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
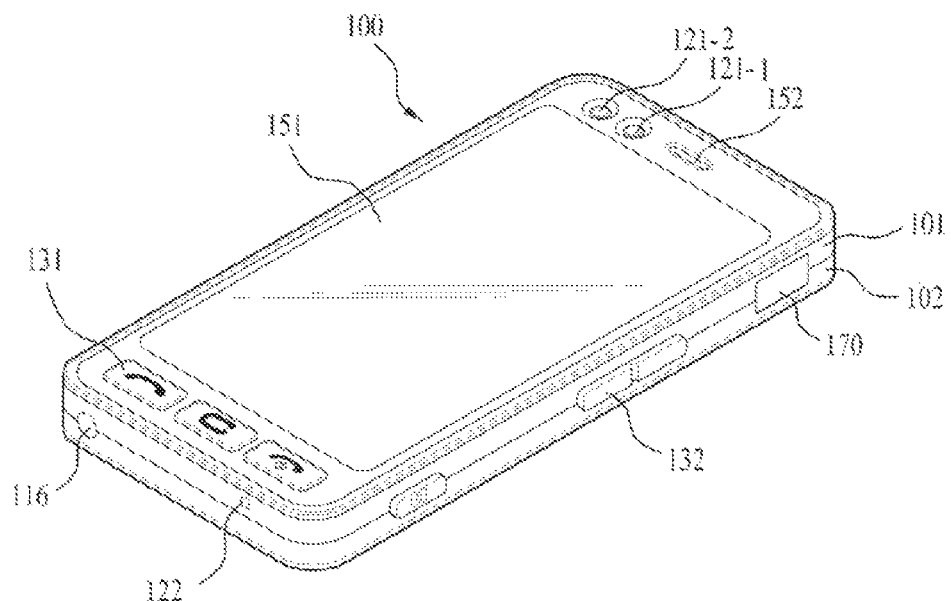
FIG. 2A is a front perspective diagram of a mobile terminal according to one embodiment of the present invention.
Figure 2B:
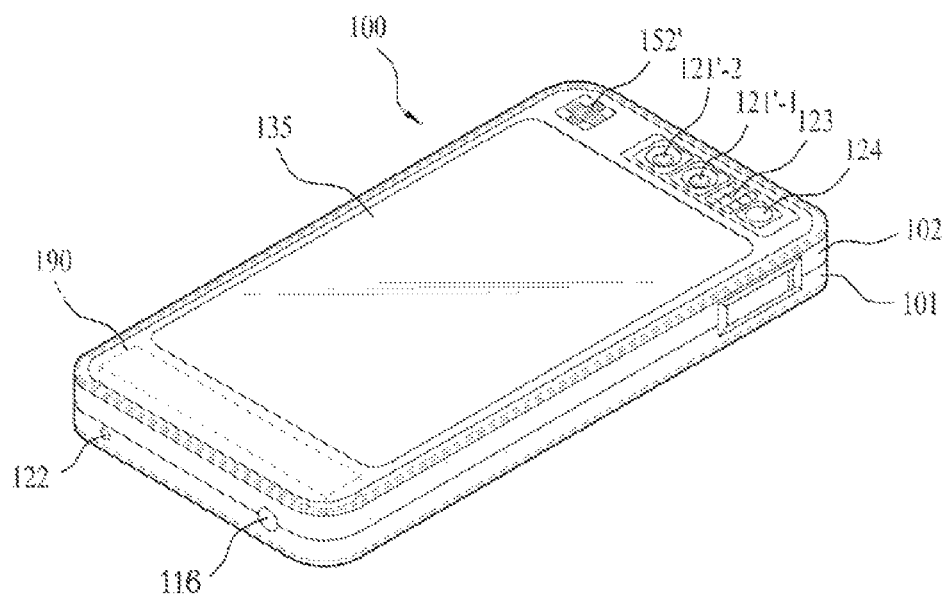
FIG. 2B is a rear perspective diagram of a mobile terminal according to one embodiment of the present invention.

FIG. 2A and FIG. 2B show a case that a plurality of cameras are provided to front and rear sides of a terminal, respectively. For clarity and convenience of the following description, assume that a plurality of the cameras include a first camera and a second camera.

Referring to FIG. 2A and FIG. 2B, first and second cameras 121-1 and 121-2 can be provided on the same side (i.e., front side in FIG. 2A) in parallel with each other. And, first and second cameras 121'-1 and 121'-2 can be provided on the same side (i.e., rear side in FIG. 2B) in parallel with each other.

For instance, referring to FIG. 2A, the first camera 121-1 and the second camera 121-2 can be provided to left and right parts, respectively. In case that a same subject is photographed, the first camera 121-1 photographs an image in which the subject is positioned at relatively right side within a photograph angle range. And, the second camera 121-2 photographs an image in which the subject is positioned at relatively left side within the photograph angle range.

Although the drawings show that the first and second cameras are horizontally arranged in the same plane in parallel with each other, if the first and second cameras are positioned to photograph a same subject despite differing from each other in a photograph angle range, the arrangement formation is non-limited.

Besides, if a camera related application is executed, at least one of the first cameras 121-1 and 121'-1 and the second cameras 121-2 and 121'-2 can be activated.

In the following description, a method of displaying a 3D image in a mobile terminal applicable to embodiments of the present invention and a display unit configuration for the same are explained.

First of all, stereoscopic images implemented on the display unit 151 of the mobile terminal 100 according to the present invention can be mainly classified into two kinds of categories. In this case, the reference for this classification is attributed to whether different images are provided to both eyes, respectively.

The first stereoscopic image category is described as follows.

First of all, the first category is a monoscopic scheme of providing the same image to both eyes and is advantageous in that it can be implemented with a general display unit 151. In particular, the controller 180 arranges a polyhedron generated from combining at least one of dots, lines, surfaces or combination thereof in a virtual 3D space and enables an image, which is generated from seeing the polyhedron in a specific view, to be displayed on the display unit 151. Therefore, such a stereoscopic image can substantially include a planar image.

Secondly, the second category is a stereoscopic scheme of providing different image to both eyes, respectively, which uses the principle that a user can sense a stereoscopic effect in looking at an object with human eyes. In particular, human eyes are configured to see different planar images in looking at the same object due to a distance between both eyes. These different images are forwarded to a human brain via retinas. The human brain is able to sense depth and reality of a 3D image by combining the different images together. Therefore, the binocular disparity attributed to the distance between both of the eyes enables the user to sense the stereoscopic effect despite that there is an individual difference of the binocular disparity more or less. Therefore, the binocular disparity becomes the most important factor of the second category. The binocular disparity is explained in detail with reference to FIG. 2C as follows.

Figure 2C:
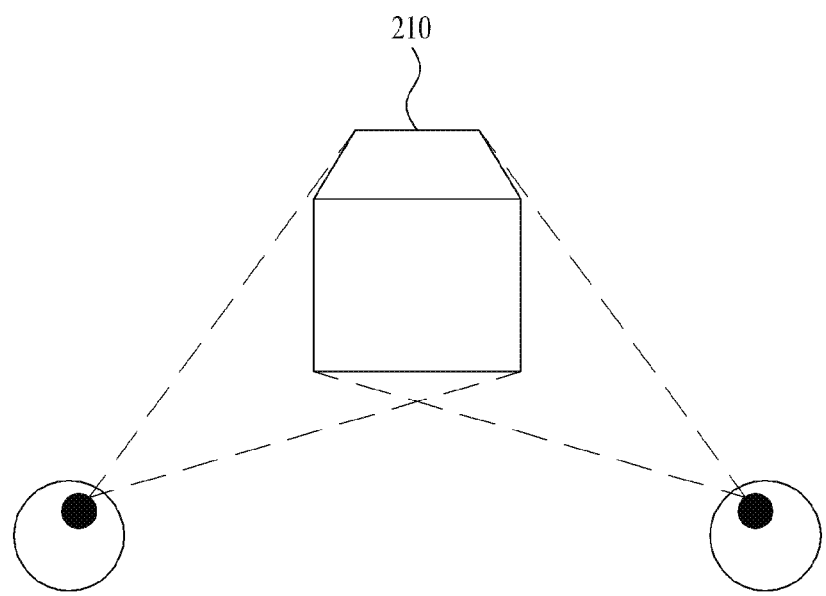
FIG. 2C is a diagram for describing the 3D image generating principle using binocular disparity according to the present invention.
Figure 2C:
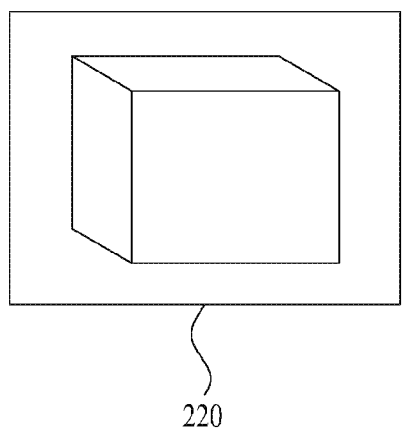
Figure 2C:
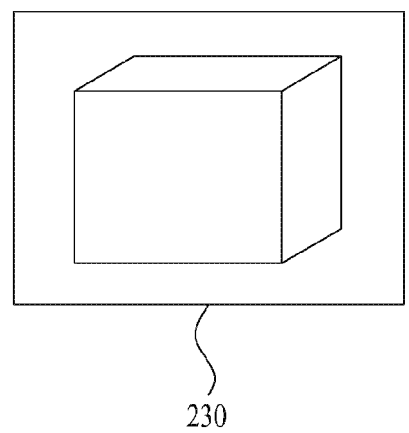

FIG. 2C is a conceptional diagram for explaining the 3D image generating principle using binocular disparity.

Referring to FIG. 2C, assume a situation that a hexahedron 210 is positioned as a subject in front below an eye's height to be seen through human eyes. In this case, a left eye is able to see a left eye planar image 220 revealing three facets including a top side, a front side and a left lateral side of the hexahedron 210 only. And, a right eye is able to see a right eye planar image 230 revealing three facets including the top side, the front side and a right lateral side of the hexahedron 210 only.

Even if a real thing is not actually positioned in front of both eyes of a user, if the left eye planar image 220 and the right eye planar image 230 are set to arrive at the left eye and the right eye, respectively, a user is able to substantially sense the hexahedron 210 as if looking at the hexahedron 210 actually.

Thus, in order to implement the stereoscopic image belonging to the second category in the mobile terminal 100, images of the same object should arrive at both eyes in a manner of being discriminated from each other for the left and right eye images of the same object with a predetermined parallax.

In order to discriminate the above-mentioned two categories from each other in this disclosure, a stereoscopic image belonging to the first category shall be named '2D stereoscopic image' and a stereoscopic image belonging to the second category shall be named '3D stereoscopic image'.

A method of implementing a 3D stereoscopic image is described as follows.

First of all, as mentioned in the following description, in order to implement a 3D stereoscopic image, an image for a right eye and an image for a left eye need to arrive at both eyes in a manner of being discriminated from each other. For this, various methods are explained as follows.

1) Parallax Barrier Scheme

The parallax barrier scheme enables different images arrive at both eyes in a manner of controlling a propagating direction of light by electronically driving a cutoff device provided between a general display and both eyes.

First of all, a structure of a parallax barrier type display unit 151 for displaying a 3D stereoscopic image can be configured in a manner that a general display device 151*a* is combined with a switch LC (liquid crystals). A propagating direction of light is controlled by activating an optical parallax barrier using the switch LC, whereby the light is separated into two different lights to arrive at left and right eyes, respectively. Thus, when an image generated from combining an image for the right eye and an image for the left eye together is displayed on the display device, a user sees the images corresponding to the eyes, respectively, thereby feeling the 3D or stereoscopic effect.

Alternatively, the parallax barrier attributed to the switch LC is electrically controlled to enable entire light to be transmitted therethrough, whereby the light separation due to the parallax barrier is avoided. Therefore, the same image can be seen through left and right eyes. In this case, the same function of a conventional display unit is available.

Besides, although the parallax barrier performs parallel translation in one axial direction to provide a 3D stereoscopic image, the present invention is able to use a parallax barrier that enables parallel translation in at least two axial directions according to a control signal from the controller 180.

2) Lenticular

The lenticular scheme relates to a method of using a lenticular screen provided between a display and both eyes. In particular, a propagating direction of light is refracted via lens on the lenticular screen, whereby different images arrive at both eyes, respectively.

3) Polarized Glasses

According to the polarized glasses scheme, polarizing directions are set orthogonal to each other to provide different images to both eyes, respectively. In case of circular polarization, polarization is performed to have different rotational direction, whereby different images can be provided to both eyes, respectively.

4) Active Shutter

This scheme is a sort of the glasses scheme. In particular, a right eye image and a left eye image are alternately displayed on a display unit with prescribed periodicity. And, user's glasses close its shutter in an opposite direction when an image of a corresponding direction is displayed. Therefore, the image of the corresponding direction can arrive at the eyeball in the corresponding direction. Namely, while the left eye image is being displayed, a shutter of the right eye is closed to enable the left eye image to arrive at the left eye only. On the contrary, while the right eye image is being displayed, a shutter of the left eye is closed to enable the right eye image to arrive at the right eye only.

Therefore, in generating a 3D image, the mobile terminal 100 photographs a left eye planar image of a subject using the first camera 121-1 and is also able to photograph a right eye planar image of the subject using the second camera 121-2. And, the mobile terminal 100 is able to generate a 3D image by synthesizing the left eye planar image photographed via the first camera 121-1 and the right eye planar image photographed via the second camera 121-2 together.

Figure 2D:
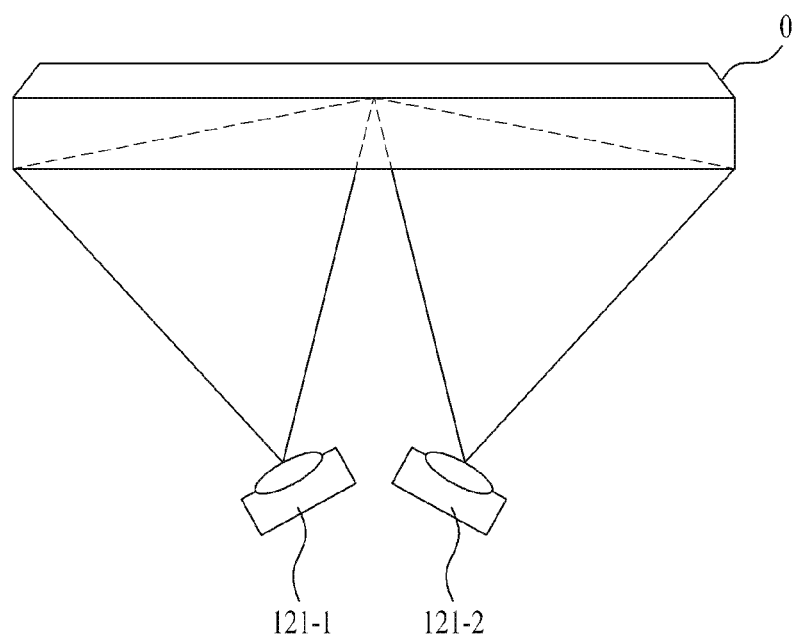
FIG. 2D is a diagram for describing the panoramic image generating principle according to the present invention.

FIG. 2D is a diagram for describing the panoramic image generating principle according to the present invention.

Referring to FIG. 2D, a panoramic image means an image of photographing a thing with a ultra-wide angle, and more particularly, a high-resolution image impossible to be taken or observed with a normal angle of view at a time.

For instance, the mobile terminal 100 is able to generate a panoramic image by connecting the first and second images photographed via the first and second cameras 121-1 and 121-2 together in a horizontal direction. In this case, it is not necessary for a same region of a subject to be taken via each of the first and second cameras 121-1 and 121-2. In order to photograph a panoramic image with a maximum wide angle, boundaries of photographed images can be naturally connected by minimizing the overlapping between the photographed images.

Moreover, referring to FIG. 2C and FIG. 2D, each of the first and second cameras 121-1 and 121-2 is able to change a photographing direction whether to generate a 3D image or a panoramic image by synthesizing the photographed first and second images together.

For instance, in case of generating the 3D image, referring to FIG. 2C, since an overlapped area of the same subject is photographed via the first and second cameras 121-1 and 121-2, photographing directions of the first and second cameras 121-1 and 121-2 can be set to oppose each other, respectively.

For another instance, in case of generating the panoramic image, referring to FIG. 2D, since an overlapped area of the same subject is not photographed via the first and second cameras 121-1 and 121-2 or a minimized overlapped area is photographed via the first and second cameras 121-1 and 121-2, photographing directions of the first and second cameras 121-1 and 121-2 can be set not to oppose each other, respectively.

Meanwhile, the mobile terminal mentioned in this disclosure can include at least one of the components shown in FIG. 1. And, the mobile terminal 100 can be provided with a plurality of cameras including a first camera and a second camera. In particular, the display unit can include a touchscreen for example. In the following description, the same reference number 151 of the display unit shall be given to the touchscreen.

In the following description, a method of controlling an image photographing using a plurality of cameras in a mobile terminal according to a first embodiment of the present invention is explained with reference to the accompanying drawings.

In particular, according to the first embodiment, a plurality of images are photographed to cope with a photographing configuration set for each of a plurality of the cameras and a new photographed image is generated by synthesizing a plurality of the photographed images together.

Figure 3:
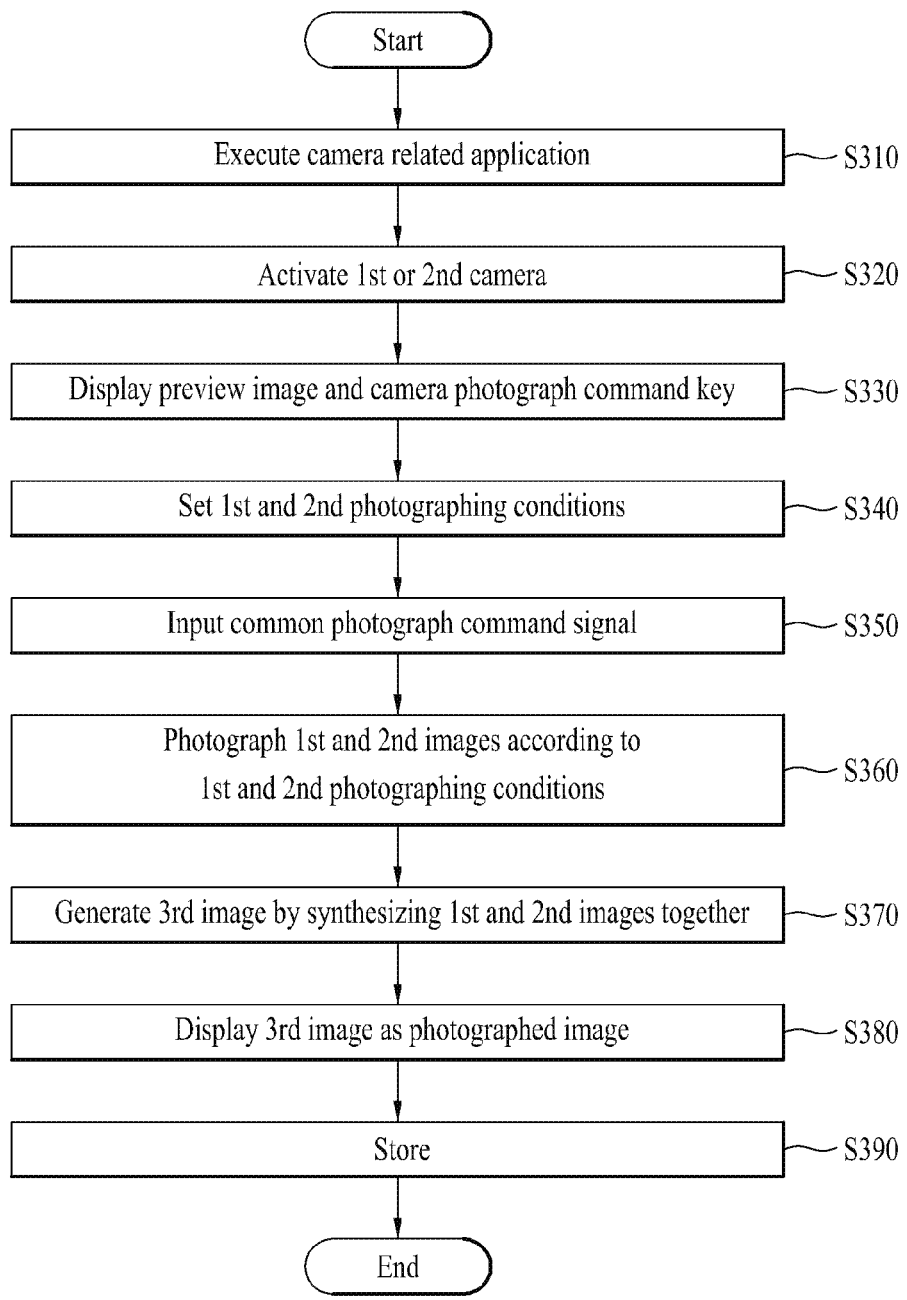
FIG. 3 is a first flowchart for a method of controlling an image photographing in a mobile terminal according to one embodiment of the present invention.

FIG. 3 is a first flowchart for a method of controlling an image photographing in a mobile terminal.

Referring to FIG. 3, the mobile terminal 100 executes a camera related application under the control of the controller 180 [S310].

In particular, the mobile terminal 100 displays an application list including a plurality of applications. If a user inputs an action of selecting the camera related application from the application list, the mobile terminal 100 is able to execute the selected camera related application. In this case, the camera related application is basically stored in the mobile terminal 100 or can be stored in a manner of being received or downloaded from an external terminal or an external server.

Optionally, if the user selects a key zone (e.g., a hot key) or a button key corresponding to a camera related application execute command or a terminal motion (e.g., shaking, inclination at a predetermined angle, etc.) corresponding to a camera related application execute command is detected, the mobile terminal 100 can perform the executing step S310.

If the camera related application is executed, the mobile terminal 100 activates at least one of the first camera and the second camera under the control of the controller 180 [S320].

In this case, the camera activation can mean a following state. First of all, a camera module is turned on. Secondly, an image inputted via the turned-on camera module is displayed or photographed as a preview image.

For instance, if one of the first and second cameras is designated in advance to a camera, which is to be activated at a timing point of a camera related application execution, the mobile terminal 100 is able to activate the designated camera only. Alternatively, if the designated camera does not exist, the mobile terminal 100 activates both of the first and second cameras or can activate either the first camera or the second camera.

Alternatively, the mobile terminal enables a user to select a camera to activate in a manner of displaying a list of activation target cameras (e.g., first and second cameras included) at an execution start timing point of the camera related application. Therefore, the mobile terminal 100 is able to activate the camera selected by the user only.

The mobile terminal 100 displays an image, which is inputted from the activated one of the first and second cameras and then displays a camera photograph command key, under the control of the controller 180 [S330]. In particular, the displaying step S330 can be performed using the touchscreen 151.

For clarity of the following description, assume that a first image and a second image are inputted from a first camera and a second camera, respectively.

In the displaying step S330, the mobile terminal 100 is able to display at least one image selected from the first and second images by a user or at least one image randomly selected by the controller 180 as a preview image.

For instance, if the first camera is designated as a basic camera, the controller 180 is able to display the first image as the preview image. Moreover, if the first image is displayed as the preview image, the second camera is turned off (OFF) (i.e., absence of an input image). Alternatively, although an image is inputted in a state that the second camera is turned on, the inputted image may not be displayed as the preview image.

In this case, the camera photograph command key can mean a key for receiving an input of a camera operation related touch action (e.g., a photograph command touch action, a preview command touch action, a configuration setting touch action, etc.) for at least one of the first and second cameras.

And, the camera photograph command key can include a first camera zone, a second camera zone and a common zone. In particular, the first camera zone is a zone for receiving an input of a touch action for controlling an operation of the first camera, the second camera zone is a zone for receiving an input of a touch action for controlling an operation of the second camera, and the common zone is a zone for receiving an input of a touch action for controlling a camera operation in common with both of the first camera and the second camera.

In the displaying step S330, in case of displaying both of the first and second images as a preview image, the mobile terminal 100 partitions a screen into a plurality of regions including a first region and a second region and then displays the first image and the second image on the first region and the second region, respectively.

In the displaying step S330, in case of displaying the first image as a preview image only, the mobile terminal 100 displays the first image on a whole screen and also displays the second image on a partial region of the whole screen. Alternatively, the mobile terminal displays the first image on a main screen and also displays the second image on a subscreen behind the main screen (e.g., the main screen takes priority over the subscreen on a part where the main screen and the subscreen are overlapped).

In the displaying step S330, the mobile terminal 100 displays a preview image on a screen center and is also able to display the camera photograph command key on a prescribed region of the screen (e.g., a screen bottom).

Moreover, the mobile terminal 100 is able to shift a position of the camera photograph command key according to a user selection. For instance, in case of receiving an input of a touch & drag action from a first point within the camera photograph command key to a second point within the screen or an input of a touch action on each of the first and second points, the mobile terminal 100 is able to shift the camera photograph command key to the position corresponding to the second point. Besides, the mobile terminal 100 is able to switch the zones within the camera photograph command key to one another according to a user selection.

The mobile terminal 100 is able to change a size of the camera photograph command key or a size of each of the first camera zone, the second camera zone and the common zone included in the camera photograph command key. For instance, under the control of the controller 180, the mobile terminal 100 changes a size of the camera photograph command key or a size of the corresponding zone to correspond to a user input action. The mobile terminal 100 enlarges a size of the zone having high frequency of selection for a predetermined period of time. And, the mobile terminal 100 reduces a size of the zone having low frequency of selection for a predetermined period of time.

The structure of the camera photograph command key shall be described in detail in the description of a second embodiment with reference to FIGS. 17A to 17D later.

Meanwhile, the mobile terminal 100 sets a first photographing condition for the first camera and a second photographing condition for the second camera under the control of the controller 180 [S340].

In this case, the first and second photographing conditions may include the mutually-opposed (or mutually-corresponding) photographing conditions. In order to solve the difficulty in reflecting all of the mutually-opposed photographing conditions in photographing one image, a plurality of images having the mutually-opposed photographing conditions are photographed and synthesized together, thereby resulting in reflecting all of the mutually-opposed photographing conditions in one image substantially.

For instance, if the first photographing condition includes a focus setting at a first point, a near focus setting, a first exposure time setting or a video photographing, the second photographing condition can include a focus setting at a second point, a far focus setting, a second exposure time setting or a still picture photographing to correspond to the first photographing condition.

The setting step S340 can be performed if a user inputs a photographing condition setting command signal.

For instance, in case of receiving an input of a touch action for a photographing condition setting on a camera photograph command key, a selection of a key (or a key zone) corresponding to a photographing condition setting or a detection of a terminal motion corresponding to a photographing condition setting, the photographing condition setting command signal can be inputted.

The photographing condition setting command signal can be inputted for the first camera, the second camera or each of the first and second cameras. In particular, in case of receiving an input of a touch action for a photographing condition setting on the first camera zone and an input of a touch action for a photographing condition setting on the second camera zone, it is ale to set a mode for setting a first photographing condition for the first camera and a mode for setting a second photographing condition for the second camera. In case of receiving an input of a touch action for a photographing condition setting on the common zone, it is able to set a mode for setting photographing conditions for the first and second cameras.

In the setting step S340, in case of receiving an input of the photographing condition setting command signal, the mobile terminal 100 sets the mode for setting the photographing condition and is then able to display a screen (hereinafter named a photographing condition setting screen) for setting the photographing condition.

Therefore, the controller 180 is able to set the first photographing condition for the first camera or the second photographing condition for the second camera using the displayed photographing condition setting screen.

Of course, the setting step S340 can be performed in a camera deactivated state or a photographed image display state as well as a preview image display state. Moreover, the setting step S340 can be performed if a menu item of the photographing condition setting by a general menu search is executed.

In the following description, the setting step S340 is explained in detail with reference to FIGS. 4A to 8E. For instance, the first camera and the second camera can include a left camera and a right camera, respectively.

FIGS. 4A to 5B are diagrams of receiving an input of a photographing condition setting command signal.

Figure 4A:
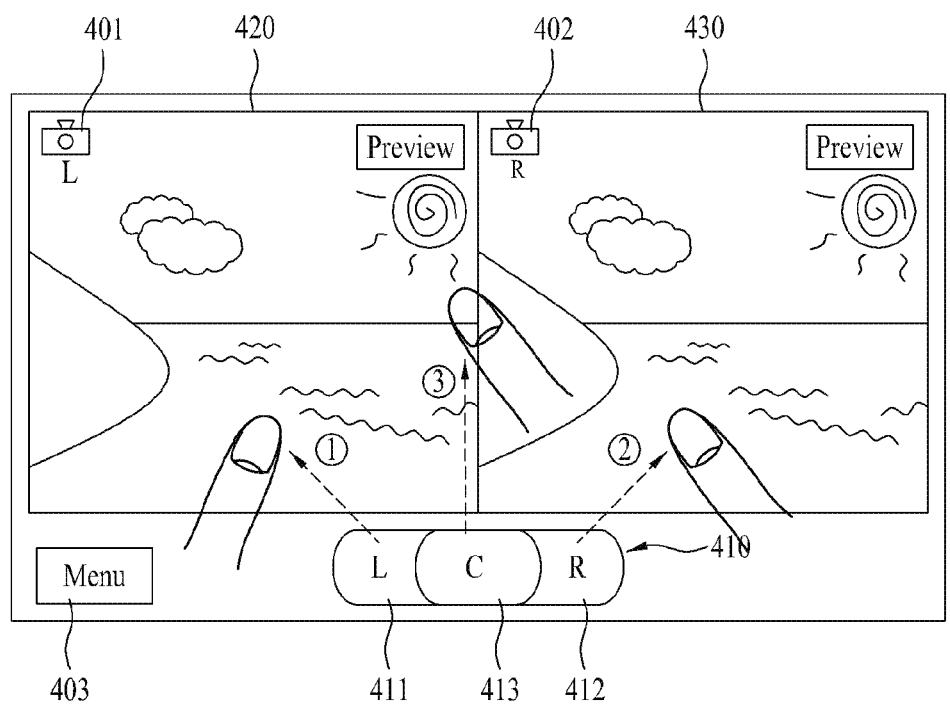
FIGS. 4A to 5B are diagrams of receiving an input of a command signal for setting a first photographing condition and an input of a command signal for setting a second photographing condition according to the present invention.

Referring to FIG. 4A, while a first image and a second image are displayed as a preview image, in case of receiving a touch & drag action from the first camera zone 411 to a display region 420 of the first image [①], the mobile terminal 100 receives an input of a photographing condition setting command signal for the first camera. In case of receiving a touch & drag action from the second camera zone 412 to a display region 430 of the second image [②], the mobile terminal 100 receives an input of a photographing condition setting command signal for the second camera. And, in case of receiving an input of a touch & drag action to a random point of the first or second region 420 or 430 from the common zone 413 [③], the mobile terminal 100 is able to receive an input of a photographing condition setting command signal for both of the first and second cameras.

In this case, an indicator 401 indicating the image inputted from the first camera and an indicator 402 indicating the image inputted from the second camera can be displayed on the first image and the second image, respectively.

Figure 4B:
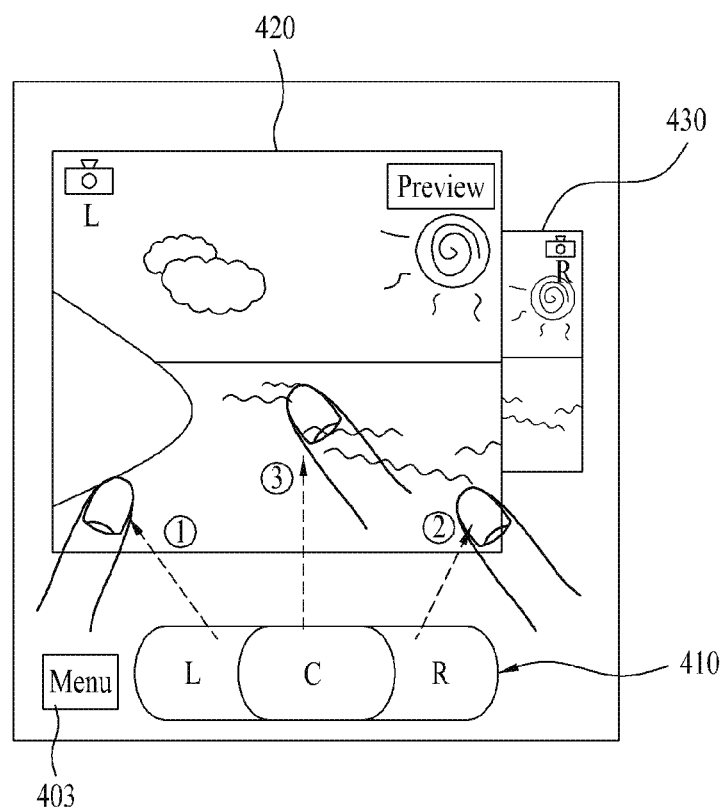

Referring to FIG. 4B, while the first image (or the second image) is displayed as a preview image only, in case of receiving a touch & drag action from the first camera zone 411 [①], the mobile terminal 100 receives an input of a photographing condition setting command signal for the first camera. In case of receiving a touch & drag action from the second camera zone 412 [②], the mobile terminal 100 receives an input of a photographing condition setting command signal for the second camera. And, in case of receiving an input of a touch & drag action from the common zone 413 [③], the mobile terminal 100 is able to receive an input of a photographing condition setting command signal for both of the first and second cameras.

Figure 5A:
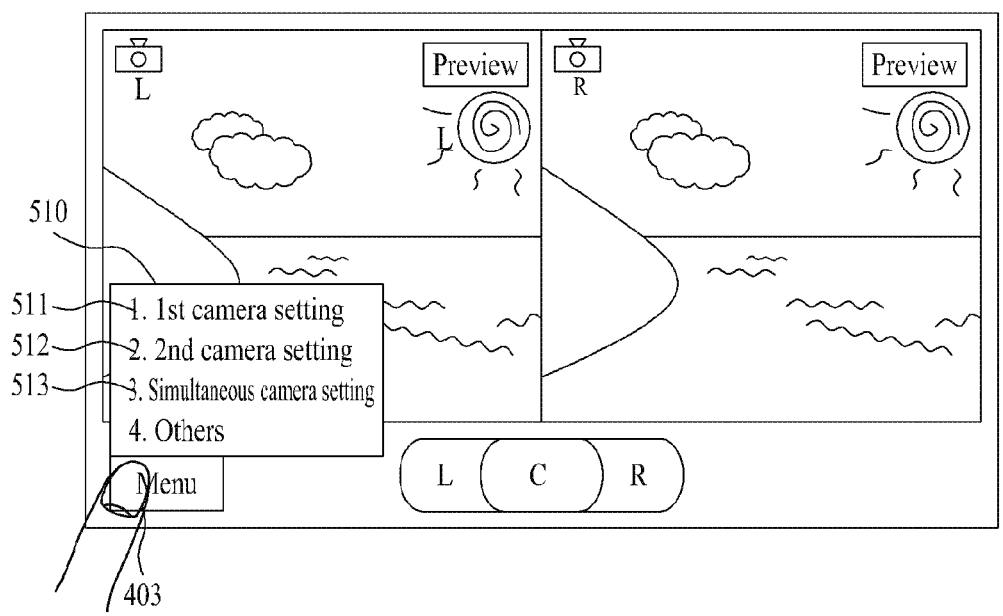
Figure 5B:
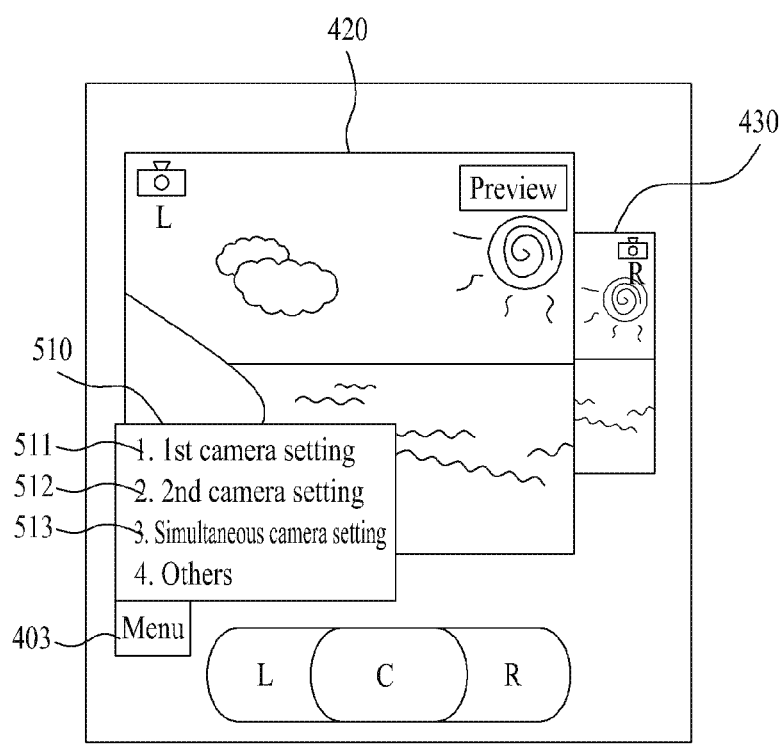

Referring to FIG. 5A and FIG. 5B, while preview image (i.e., the first and second images in FIG. 5A or the first image in FIG. 5B) is displayed, if a menu zone 403 is selected by a user, the mobile terminal 100 is able to display a menu item list 510.

If a first camera setting 511 is selected from the menu item list 510, the mobile terminal 100 receives an input of a photographing condition setting command signal for the first camera. If a second camera setting 512 is selected from the menu item list 510, the mobile terminal 100 receives an input of a photographing condition setting command signal for the second camera. If a simultaneous camera setting 513 is selected from the menu item list 510, the mobile terminal 100 receives an input of a photographing condition setting command signal for each of the first and second cameras.

FIGS. 6A to 8E are diagrams of receiving an input of a command signal for setting a first photographing condition and an input of a command signal for setting a second photographing condition according to the present invention.

In particular, FIGS. 6A to 6E show a case that a photographing condition for the first camera is inputted. In the following description, the first camera is limited to the left camera.

Figure 6A:
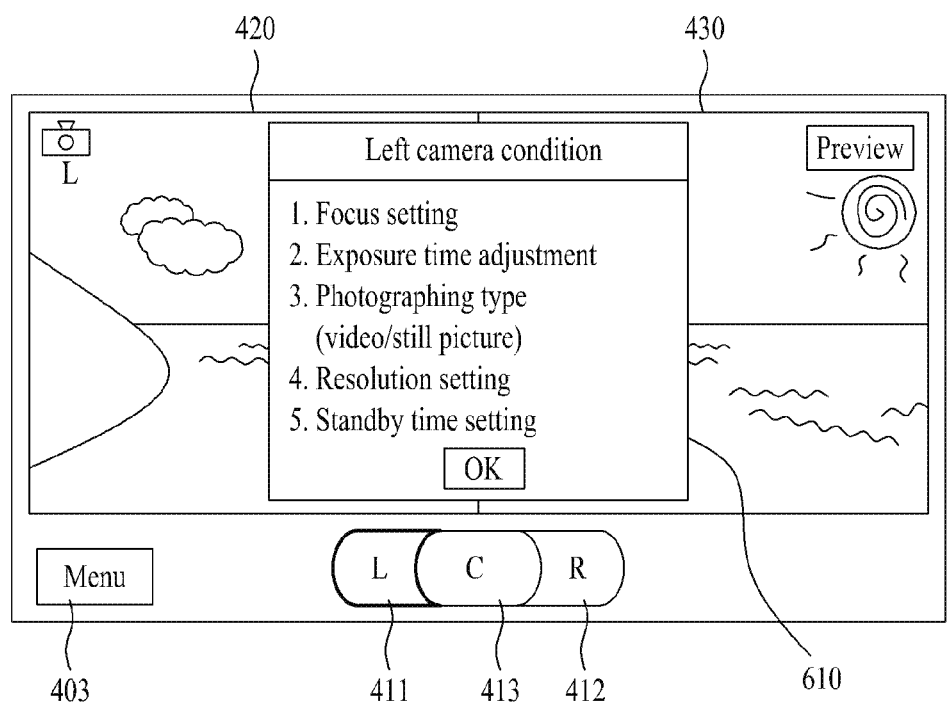
FIGS. 6A to 8E are diagrams of receiving an input of a command signal for setting a first photographing condition and an input of a command signal for setting a second photographing condition according to the present invention.

Referring to FIG. 6A, the mobile terminal 100 is able to display a photographing condition list 610 including photographing conditions settable for a left camera on a screen. For instance, the photographing conditions can include a focus setting, an exposure time adjustment, a photograph type (video/still picture), a resolution setting, a standby time setting and the like.

Figure 6B:
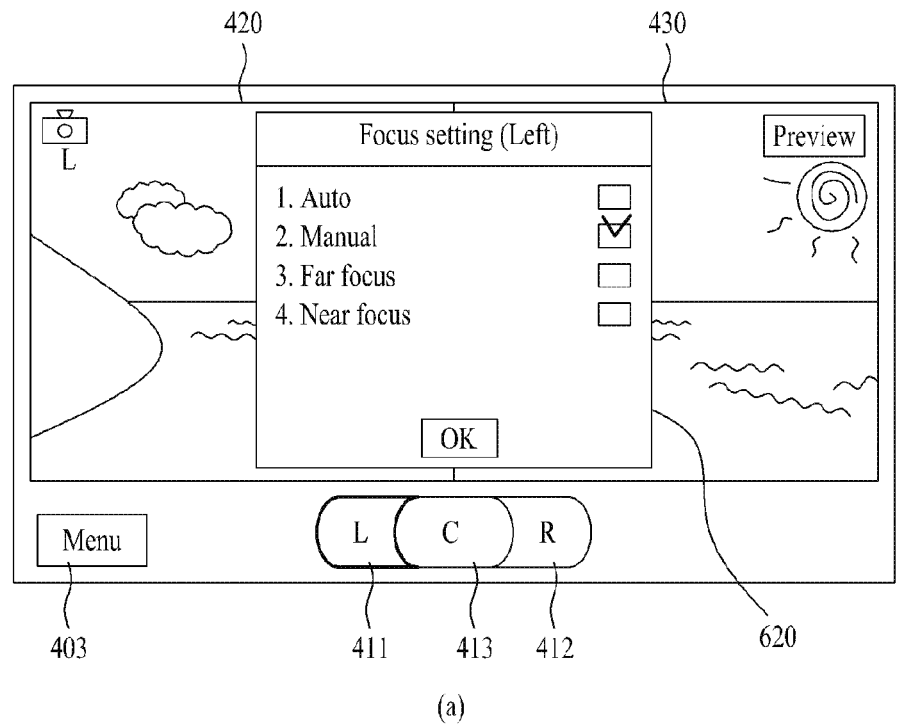
Figure 6B:
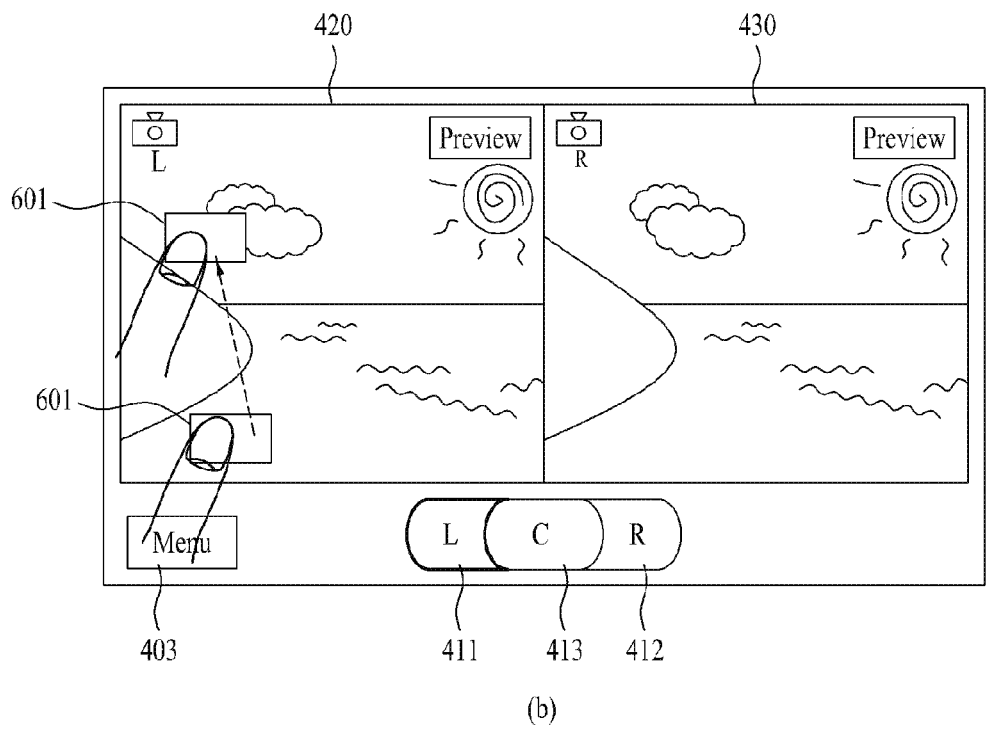

Referring to FIG. 6B, if the focus setting is selected from the photographing condition list 610 shown in FIG. 6A, the mobile terminal 100 displays a focus list 620 [a].

For instance, if 'auto' is selected from the focus list 620, the mobile terminal 100 sets an auto focus for the left camera. If 'far focus' or 'near focus' is selected from the focus list 620, the mobile terminal 100 is able to set a far or near focus for the left camera.

If 'manual' is selected from the focus list 620, the mobile terminal 100 displays a focus box 601 on a first point of the first image. In case of receiving an input of a touch & drag action from the first point to a second point or an input of a touch action on the second point from a user, the mobile terminal 100 is able to shift the focus box 601 to the second point [b]. Therefore, the mobile terminal 100 is able to set the focus of the left camera to an image part corresponding to the second point or the focus box 601 located at the second point.

Figure 6C:
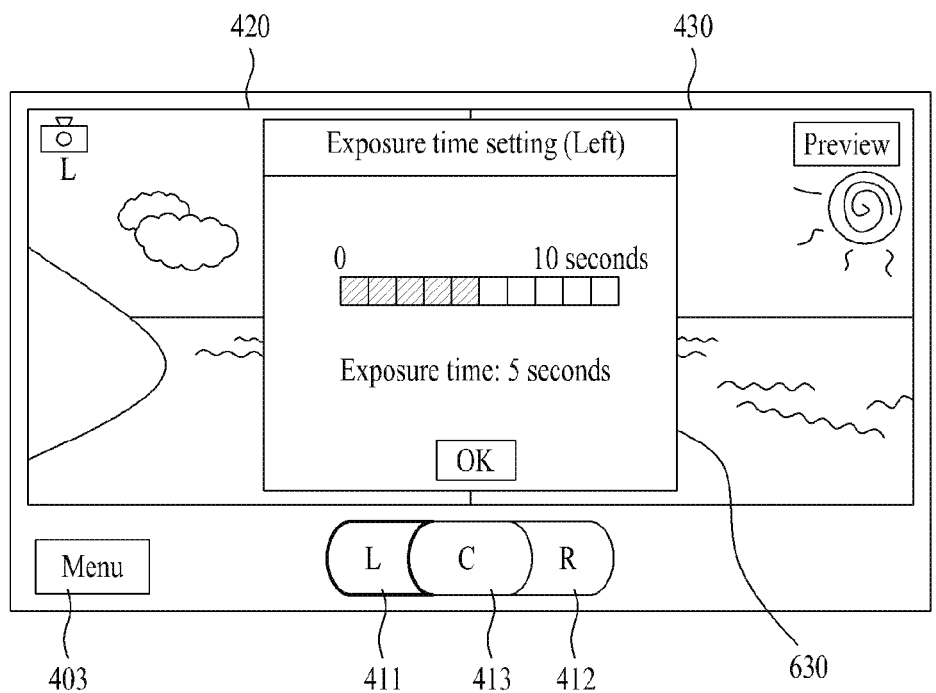

Referring to FIG. 6C, if the exposure time adjustment is selected from the photographing condition list 610 shown in FIG. 6A, the mobile terminal displays an exposure time adjust window 630 and is then able to set an exposure time (e.g., 5 seconds) for the left camera using the exposure time adjust window 630.

Figure 6D:
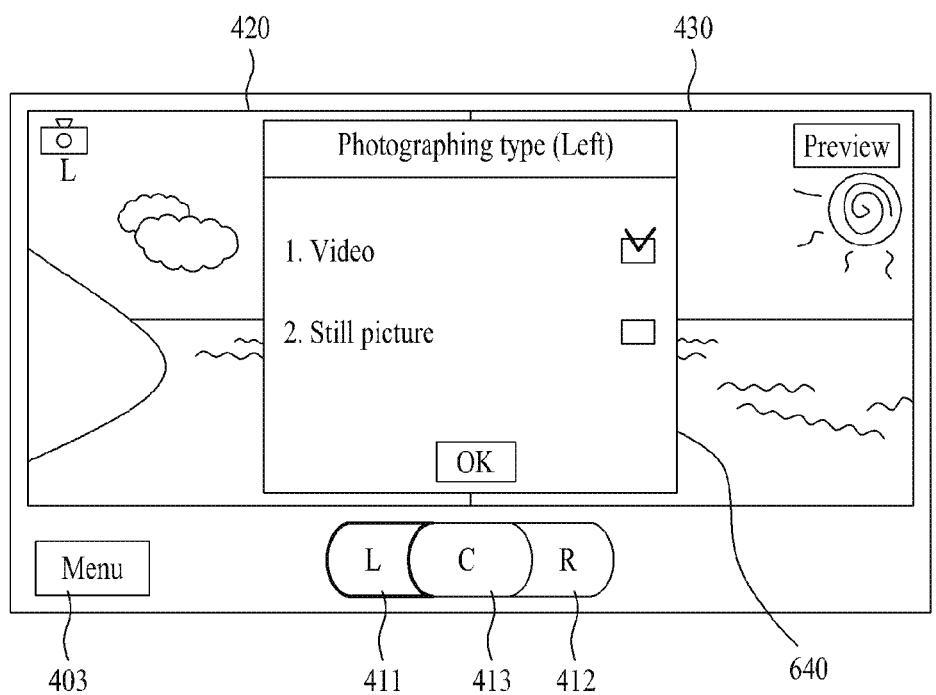

Referring to FIG. 6D, if the photograph type is selected from the photographing condition list 610 shown in FIG. 6A, the mobile terminal 100 displays a photograph type setting window 640 and is then able to set a video photographing or a still picture photographing for the left camera using the photograph type setting window 640.

Figure 6E:
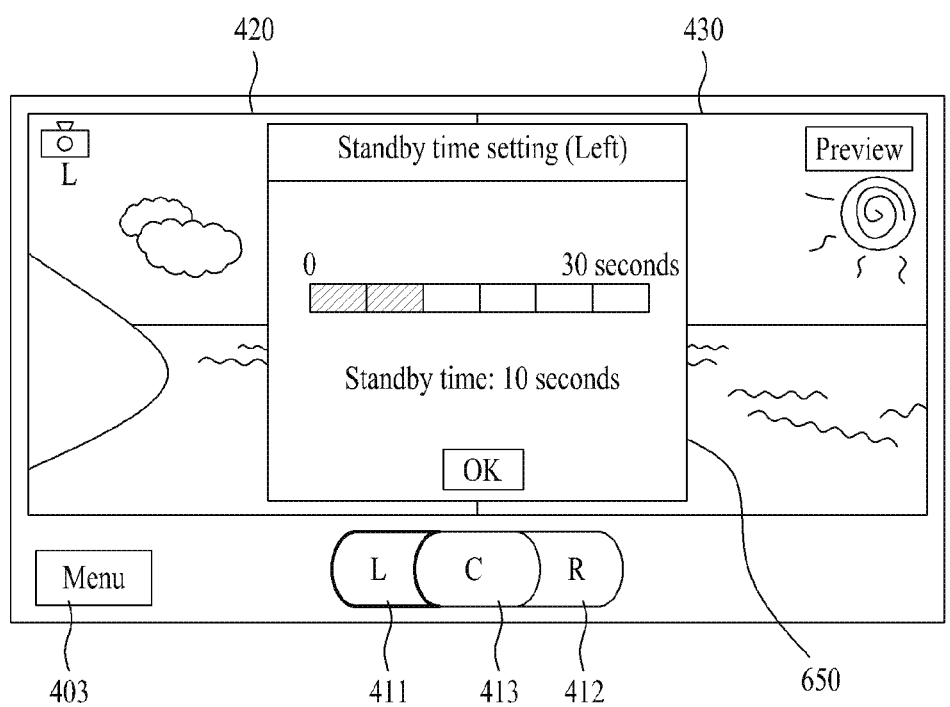

Referring to FIG. 6E, if the standby time setting is selected from the photographing condition list 610 shown in FIG. 6A, the mobile terminal 100 displays a standby time setting window 650 and is then able to set a standby time (e.g., 10 seconds) for the left camera using the standby time setting window 650.

FIGS. 7A to 7E show a case of receiving an input of a photographing condition setting command signal for the second camera. In the following description, the second camera is limited to the right camera.

Figure 7A:
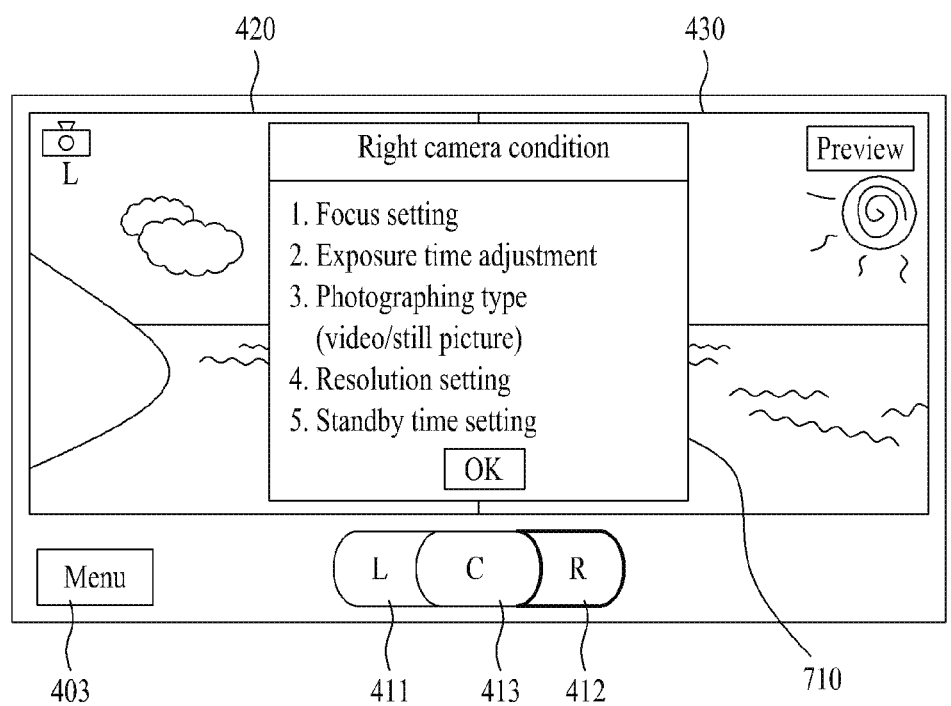

Referring to FIG. 7A, the mobile terminal 100 is able to display a photographing condition list 710 including photographing conditions settable for the right camera on the screen.

Figure 7B:
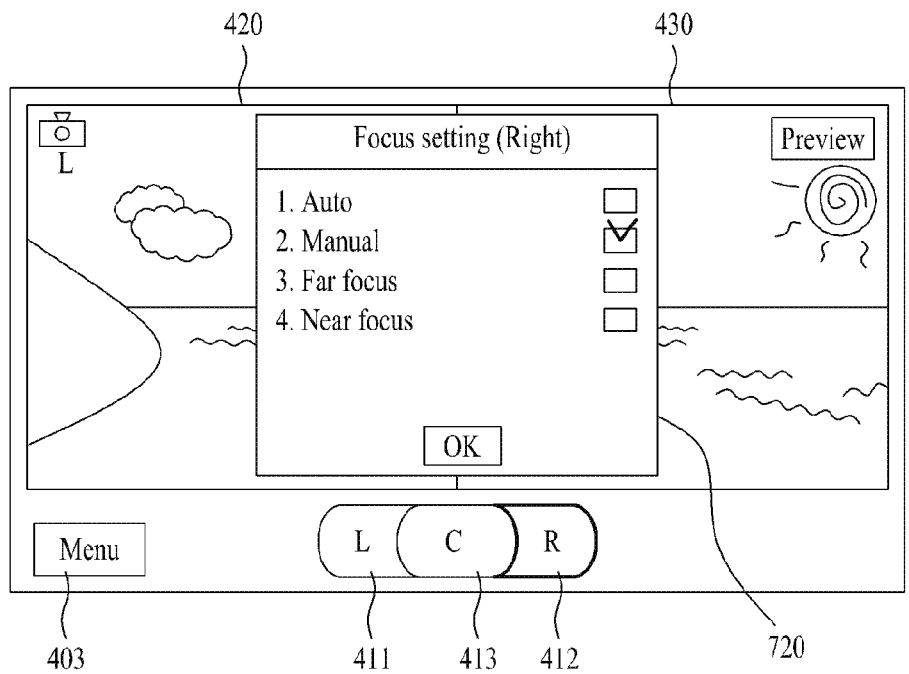
Figure 7B:
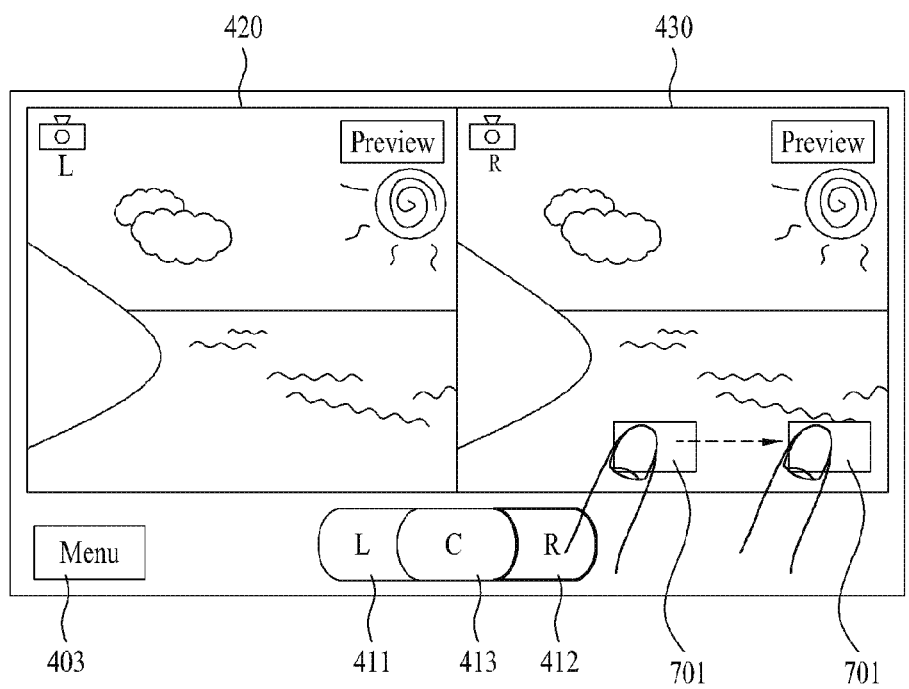

Referring to FIG. 7B, if the focus setting is selected from the photographing condition list 710 shown in FIG. 7A, the mobile terminal 100 displays a focus list 720 [a]. For instance, if 'manual' is selected from the focus list 720, the mobile terminal 100 displays a focus box 701 on a first point of the second image. In case of receiving an input of a touch & drag action from the first point to a second point or an input of a touch action on the second point from a user, the mobile terminal 100 is able to shift the focus box 701 to the second point [b]. Therefore, the mobile terminal 100 is able to set the focus of the right camera to an image part corresponding to the second point or the focus box 701 located at the second point.

Figure 7C:
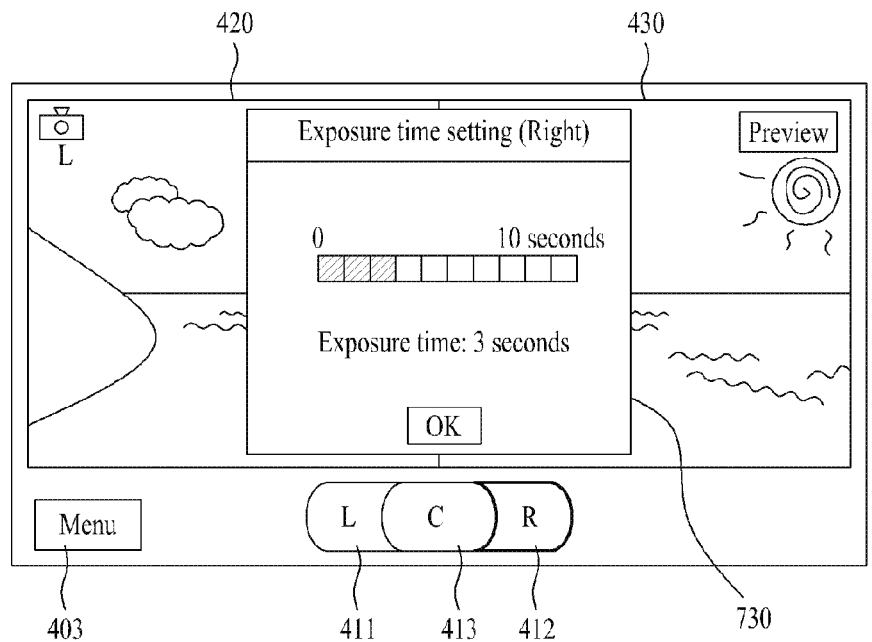

Referring to FIG. 7C, if the exposure time adjustment is selected from the photographing condition list 710 shown in FIG. 7A, the mobile terminal displays an exposure time adjust window 730 and is then able to set an exposure time (e.g., 3 seconds) for the right camera using the exposure time adjust window 730.

Figure 7D:
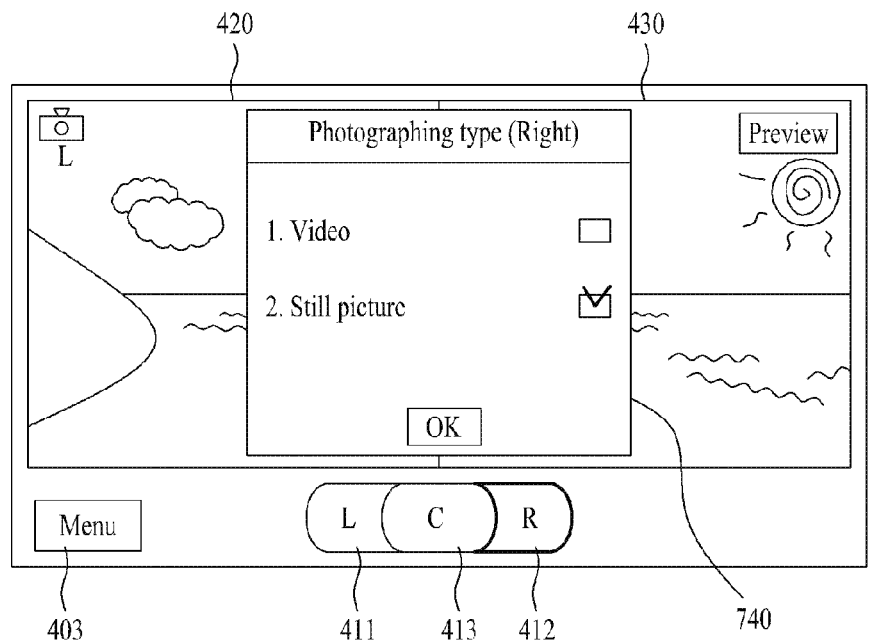

Referring to FIG. 7D, if the photograph type is selected from the photographing condition list 710 shown in FIG. 7A, the mobile terminal 100 displays a photograph type setting window 740 and is then able to set a video photographing or a still picture photographing for the right camera using the photograph type setting window 740.

Figure 7E:
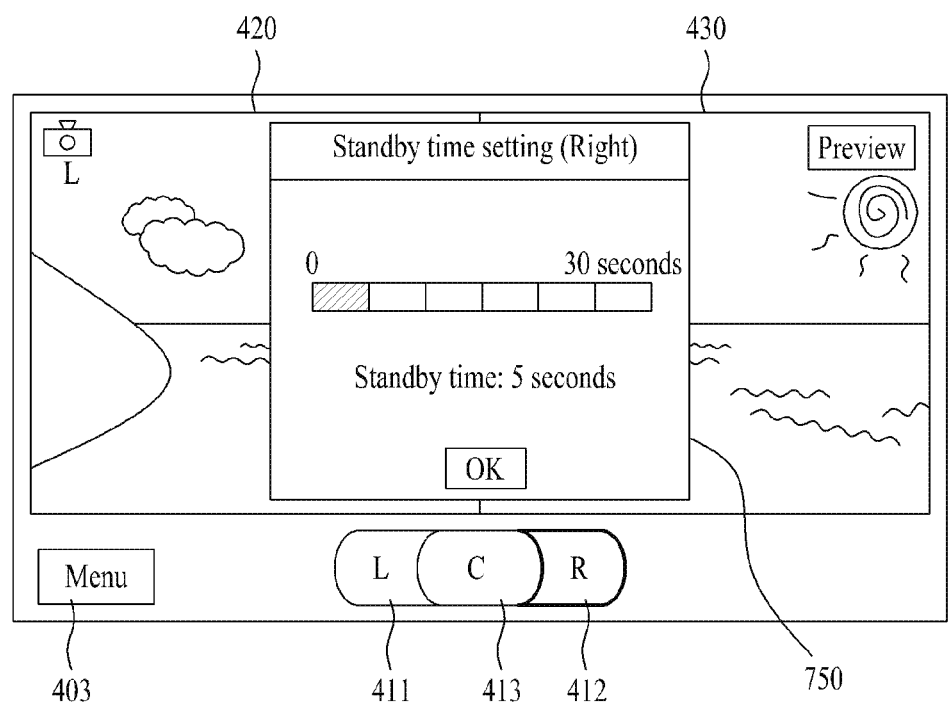

Referring to FIG. 7E, if the standby time setting is selected from the photographing condition list 710 shown in FIG. 7A, the mobile terminal 100 displays a standby time setting window 750 and is then able to set a standby time (e.g., 5 seconds) for the right camera using the standby time setting window 750.

FIGS. 8A to 8E show a case of receiving an input of a photographing condition setting command signal for each of the first and second cameras. In the following description, the first camera and the second camera are limited to the left camera and the right camera, respectively.

Figure 8A:
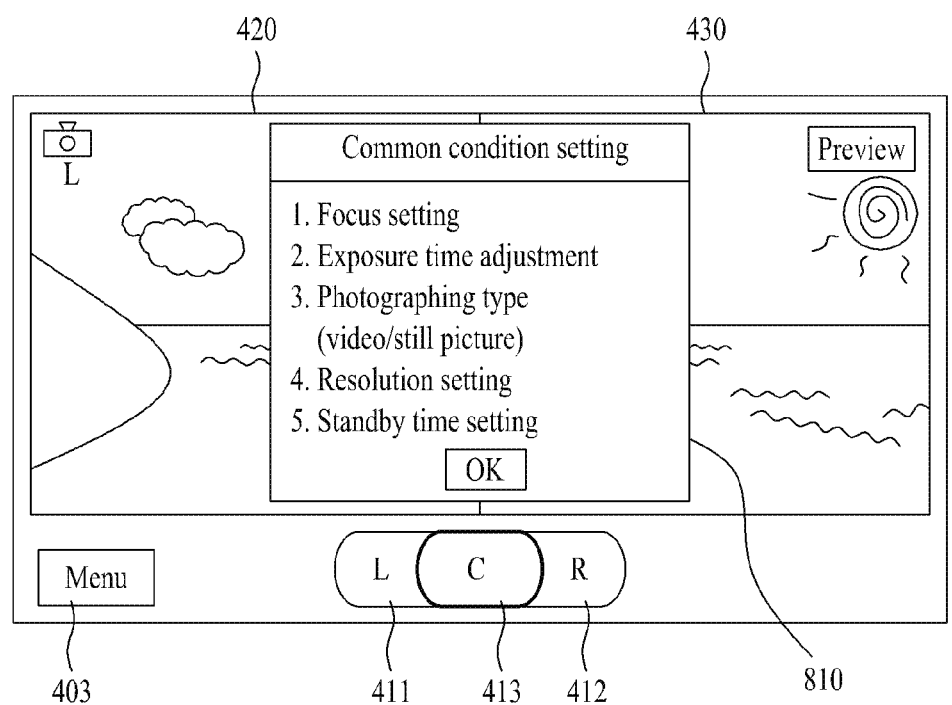

Referring to FIG. 8A, the mobile terminal 100 is able to display a photographing condition list 810 including photographing conditions settable for the left and right cameras on the screen.

Figure 8B:
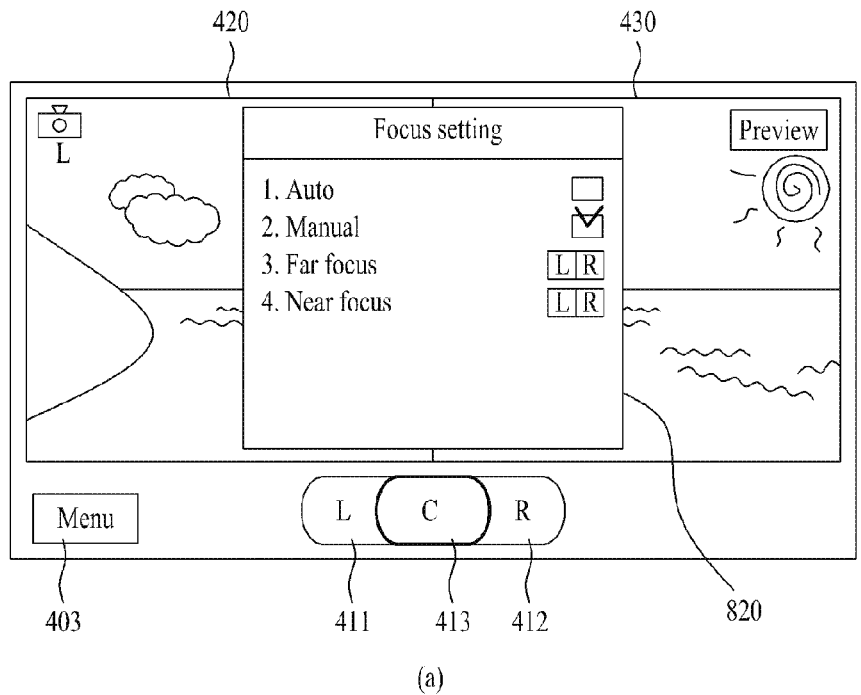
Figure 8B:
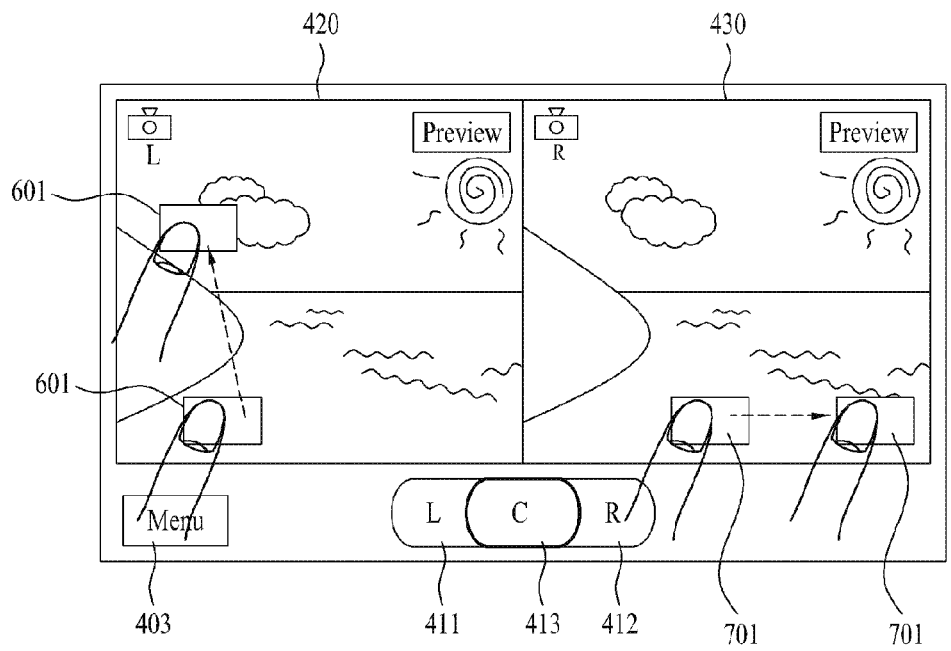
Figure 8C:
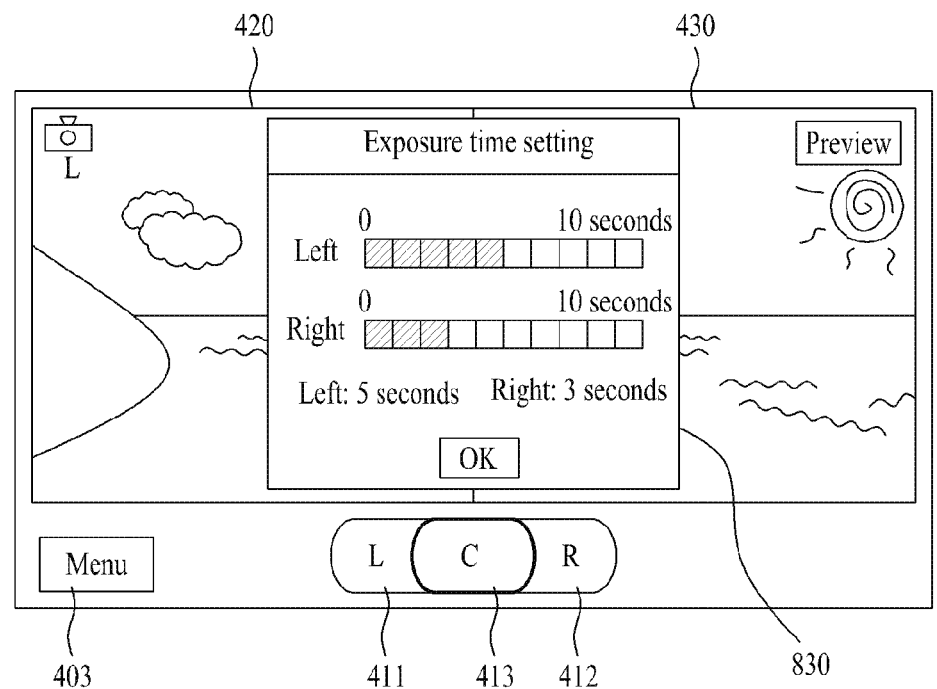

Referring to FIG. 8B, if a focus setting is selected from the photographing condition list 810 shown in FIG. 8A, the mobile terminal 100 is able to set a focus for each of the left and right cameras [cf. FIG. 6B, FIG. 7B].

Referring to FIG. 80, if an exposure time adjustment is selected from the photographing condition list 810 shown in FIG. 8A, the mobile terminal 100 is able to set an exposure time for each of the left and right cameras [cf. FIG. 60, FIG. 70].

Figure 8D:
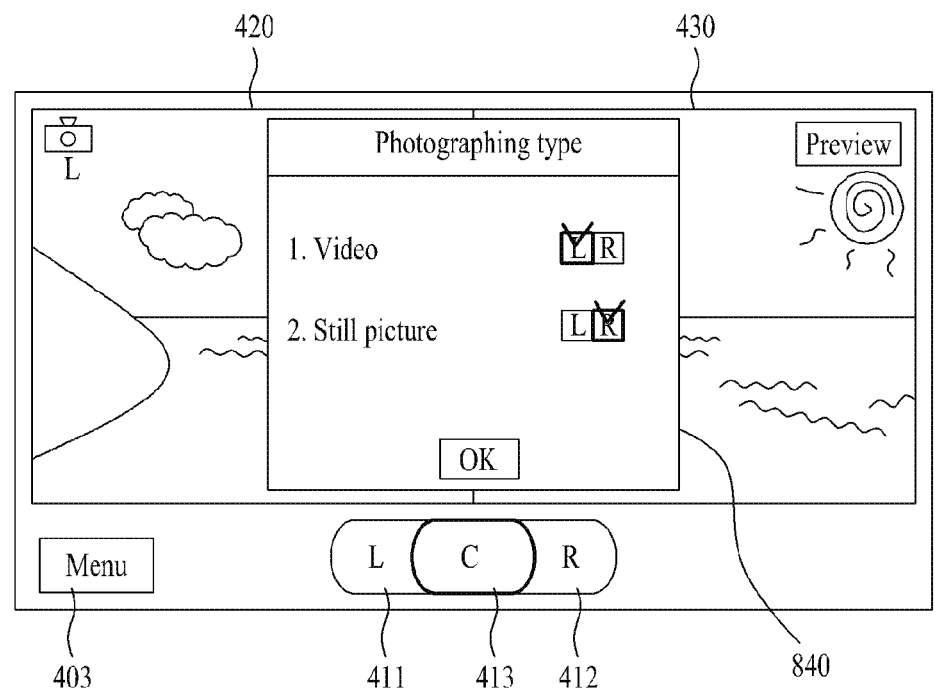

Referring to FIG. 8D, if a photograph type is selected from the photographing condition list 810 shown in FIG. 8A, the mobile terminal 100 is able to set a video photographing and a still picture photographing for the left and right cameras, respectively [cf. FIG. 6D, FIG. 7D].

Figure 8E:
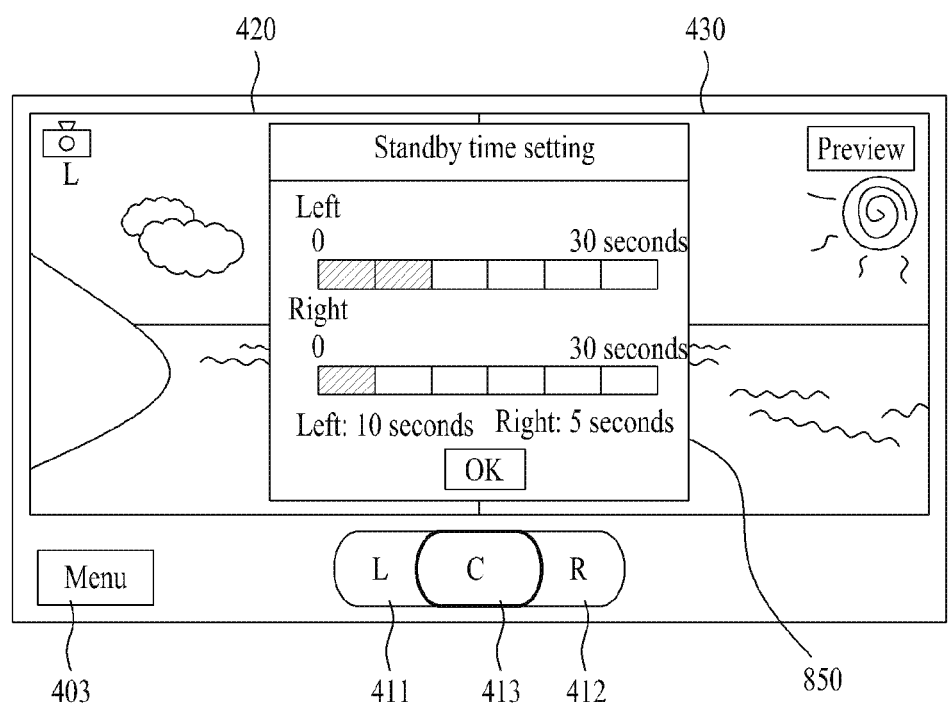

Referring to FIG. 8E, if a standby time setting is selected from the photographing condition list 810 shown in FIG. 8A, the mobile terminal 100 is able to set a standby time for each of the left and right cameras [cf. FIG. 6E, FIG. 7E].

Referring now to FIG. 3, in the displaying step S330, the mobile terminal 100 is able to display the above-set first or second photographing condition within the preview image under the control of the controller 180.

In particular, if the preview image includes the first image or the second image, the first photographing condition for the first camera and the second photographing condition for the second camera can be displayed on the first image inputted from the first camera and the second image inputted from the second camera, respectively.

In doing so, the photographing condition display can be performed on a prescribed region (e.g., a top or bottom side of the screen) of the screen not to interrupt the display of the preview image. Alternatively, whether to display the photographing condition can be determined by a user selection. In case that the photographing condition includes a plurality of condition items, the condition item selected by a user is displayed only or the rest of the condition items except the user-selected condition item can be displayed only.

In the following description, the photographing condition display is explained with reference to FIGS. 9A to 10D. In the following description, a first camera and a second camera can include a left camera and a right camera, respectively.

FIGS. 9A to 9D are diagrams for displaying a set photographing condition within a preview image according to the present invention.

Figure 9A:
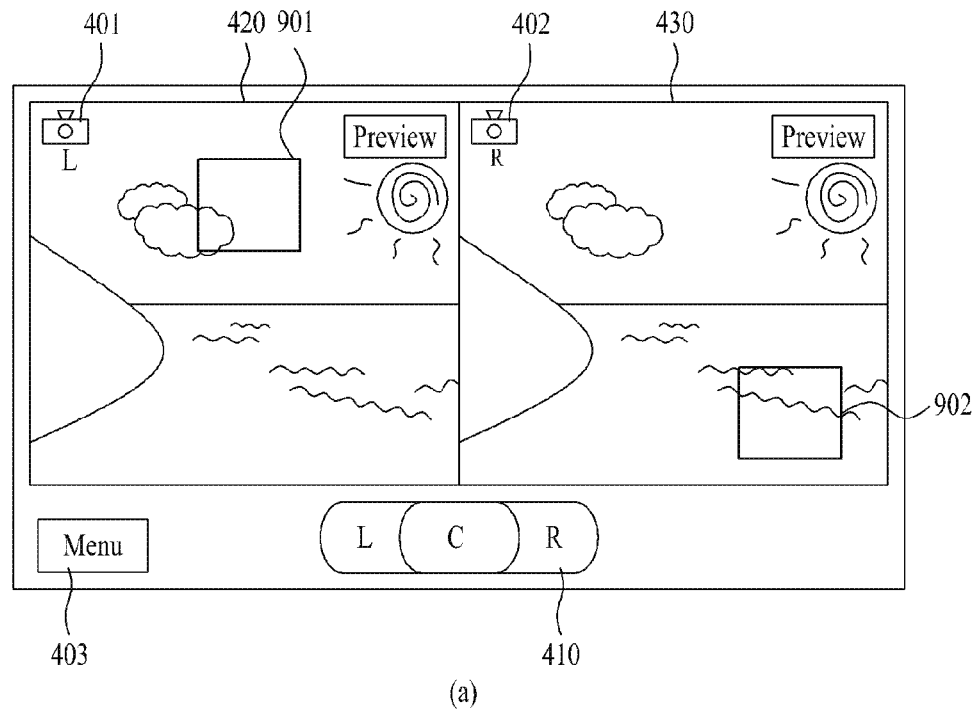
FIGS. 9A to 9D are diagrams for displaying a set photographing condition within a preview image according to the present invention.
Figure 9A:
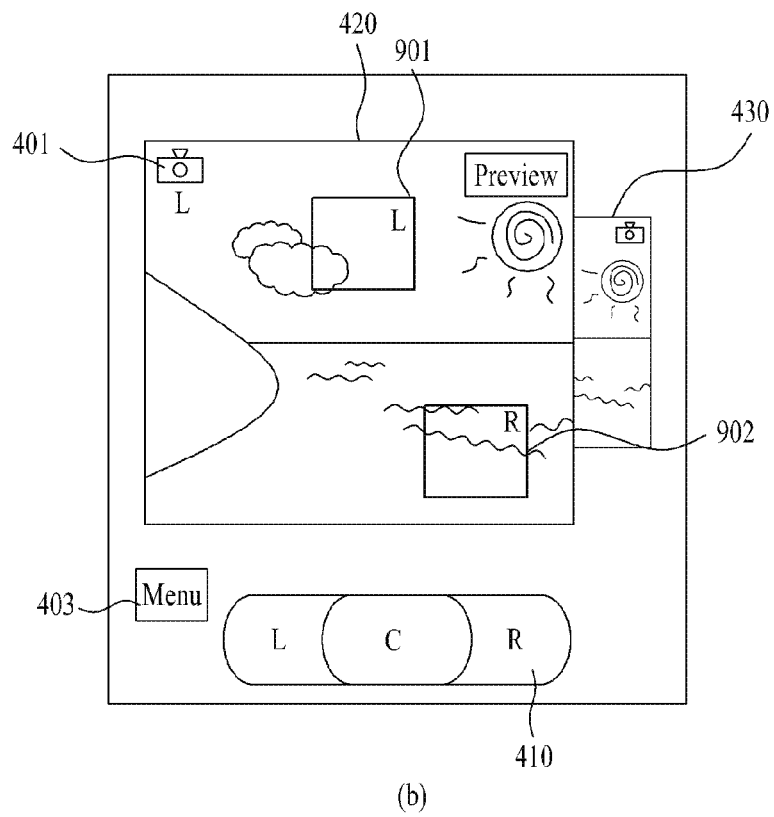

Referring to FIG. 9A (a), while a first image and a second image are displayed as a preview image, the mobile terminal 100 displays a first focus box 901 at a point corresponding to a focus (hereinafter named a first focus) set for the first camera within the first image and also displays a second focus box 902 at a point corresponding to a focus (hereinafter named a second focus) set for the second camera within the second image.

Referring to FIG. 9A (b), while a first image (or a second image) is displayed as a preview image only, the mobile terminal 100 displays a first focus box 901 at a point corresponding to a first focus within the first image and also displays a second focus box 902 at a point corresponding to a second focus within the first image.

In particular, an indicator L indicating the focus for the first camera can be further displayed on the first focus box 901 shown in FIG. 9A (b) and an indicator R indicating the focus for the second camera can be further displayed on the second focus box 902 shown in FIG. 9A (b).

Figure 9B:
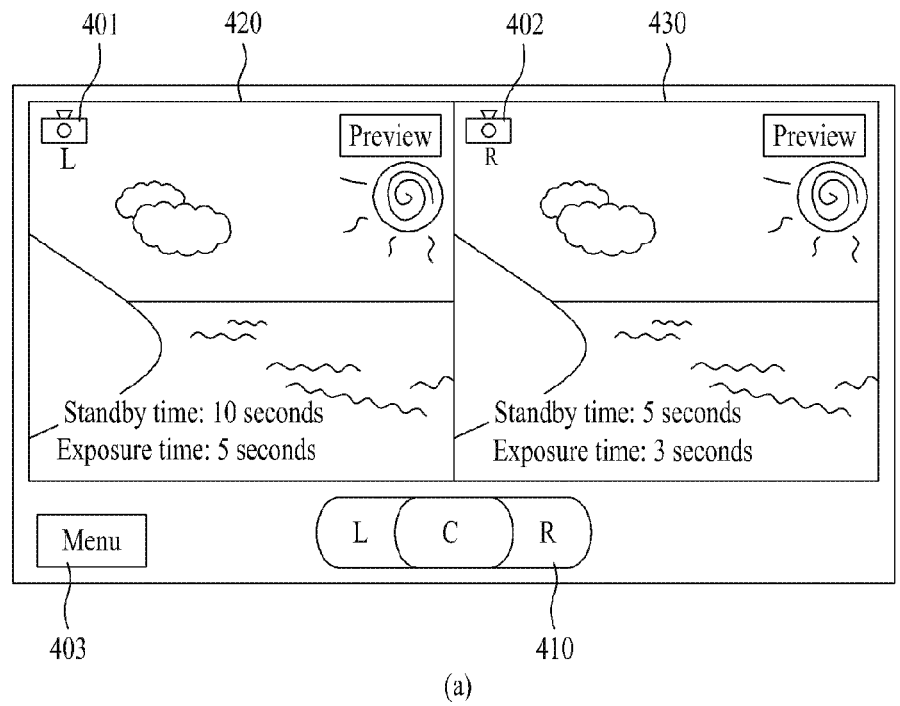
Figure 9B:
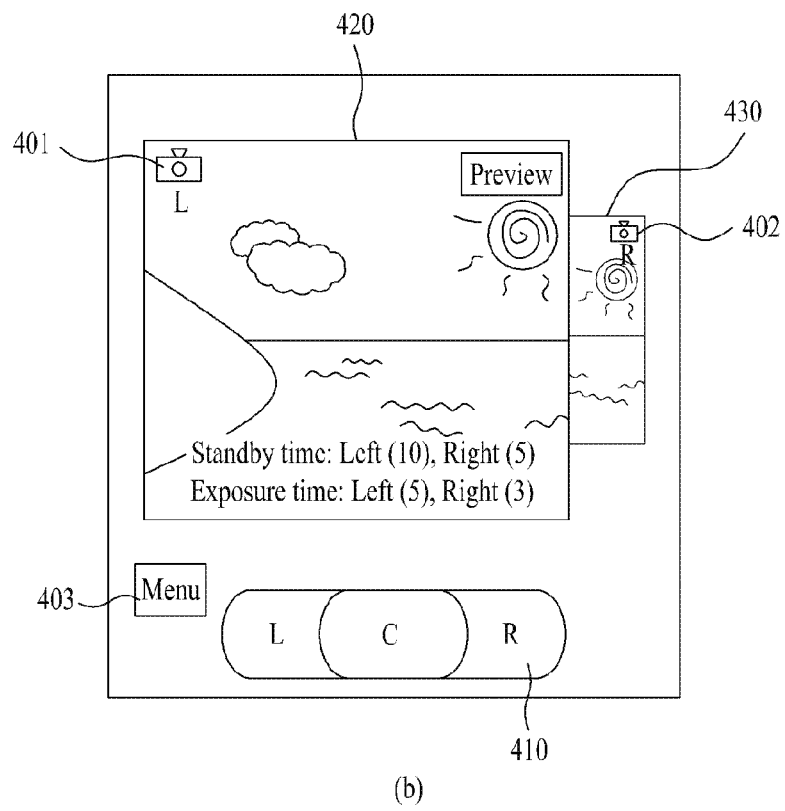

Referring to FIG. 9B (a), while a first image and a second image are displayed as a preview image, the mobile terminal 100 displays a standby time and an exposure time set for the first camera within the first image and also displays a standby time and an exposure time set for the second camera within the second image.

Referring to FIG. 9B (b), while a first image (or a second image) displayed as a preview image only, the mobile terminal 100 displays standby times (e.g., left: 10 seconds, right: 5 seconds) set for the first and second cameras and exposure times (e.g., left: 5 seconds, right: 3 seconds) set for the first and second cameras within the first image, respectively.

Figure 9C:
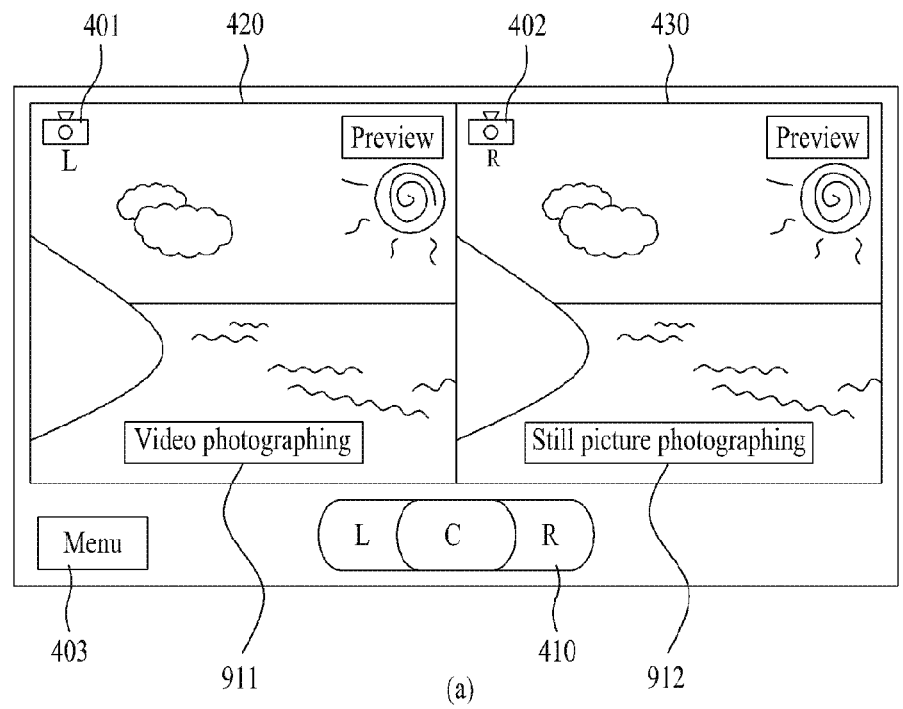
Figure 9C:
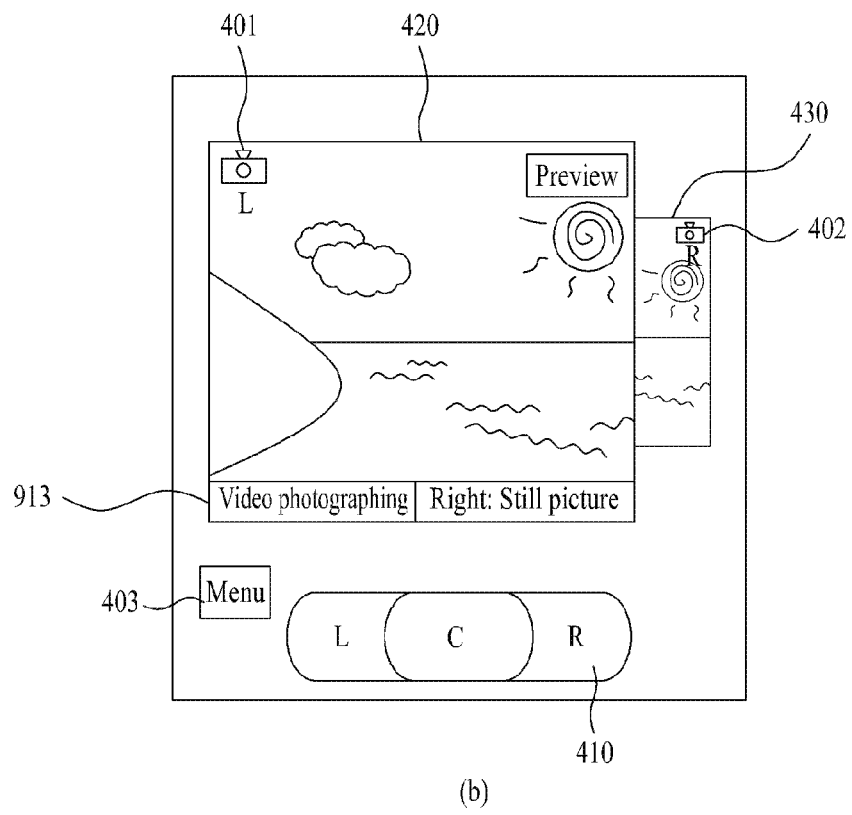

Referring to FIG. 9C (a), while first and second images are displayed as a preview image, the mobile terminal 100 displays an indication 911, which indicates that a video photographing is set for the first camera, within the first image and is able to display an indication 912, which indicates that a still picture photographing is set for the second camera, within the second image.

Referring to FIG. 9C (b), while a first image (or a second image) is displayed as a preview image, the mobile terminal 100 is able to display an indication 913, which indicates that a video photographing and a still picture photographing are set for the first camera and the second camera, respectively, within the first image.

Figure 9D:
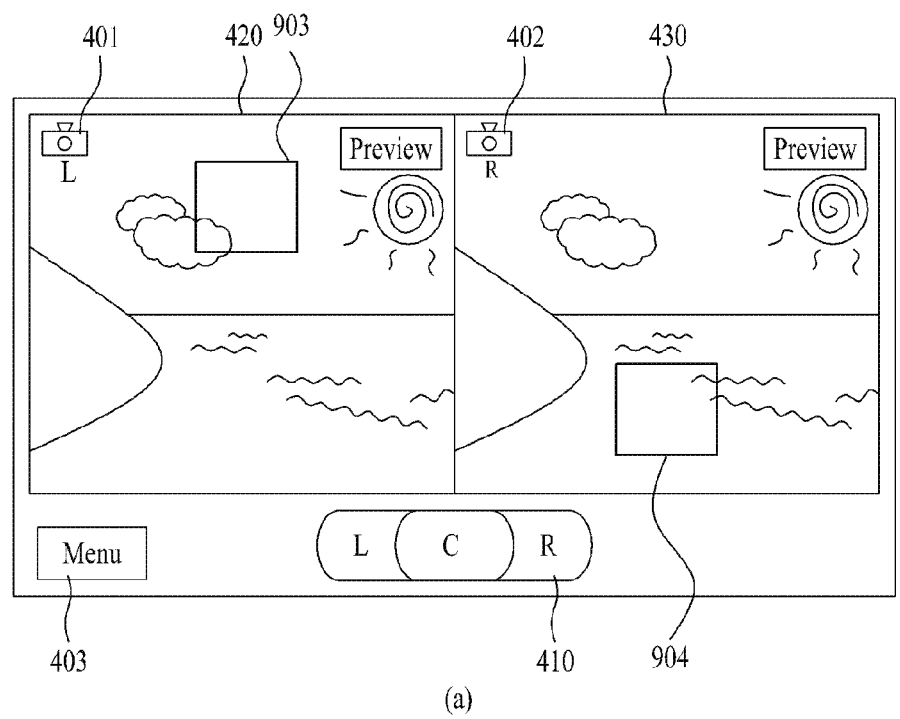
Figure 9D:
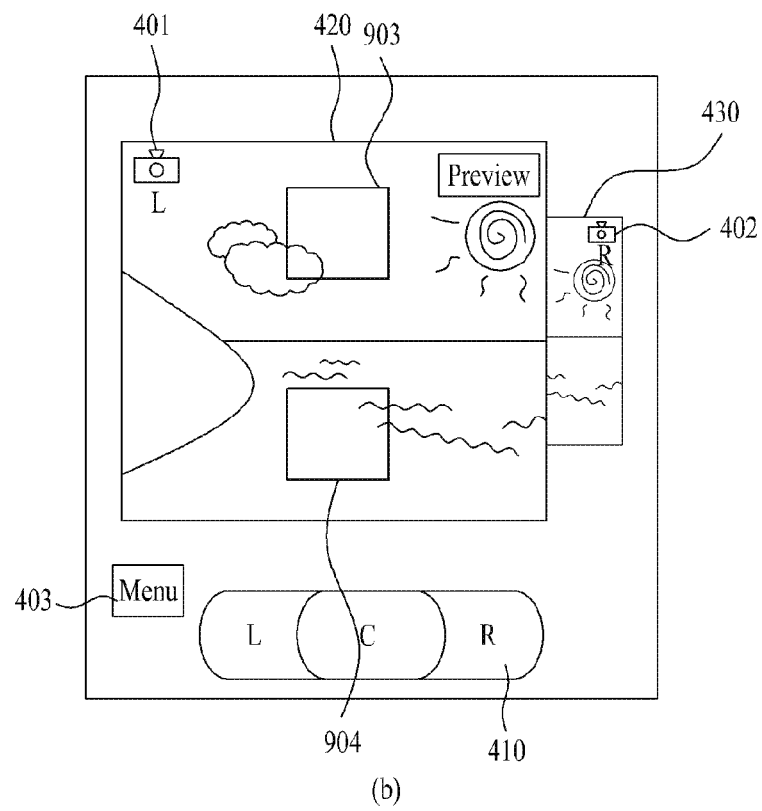

Referring to FIG. 9D (a), while first and second images are displayed as a preview image, the mobile terminal 100 displays a third focus box 903 at a point corresponding to a far focus set for the first camera within the first image and also displays a fourth focus box 904 at a point corresponding to a near focus set for the second camera within the second image.

Referring to FIG. 9D (b), while a first image (or a second image) is displayed as a preview image, the mobile terminal 100 is able to display a third focus box 903 and a fourth focus box 904 at corresponding points [cf. FIG. 9D (a)], respectively, within the first image.

FIGS. 10A to 10D are diagrams for changing a photographing condition within a preview image according to the present invention.

Figure 10A:
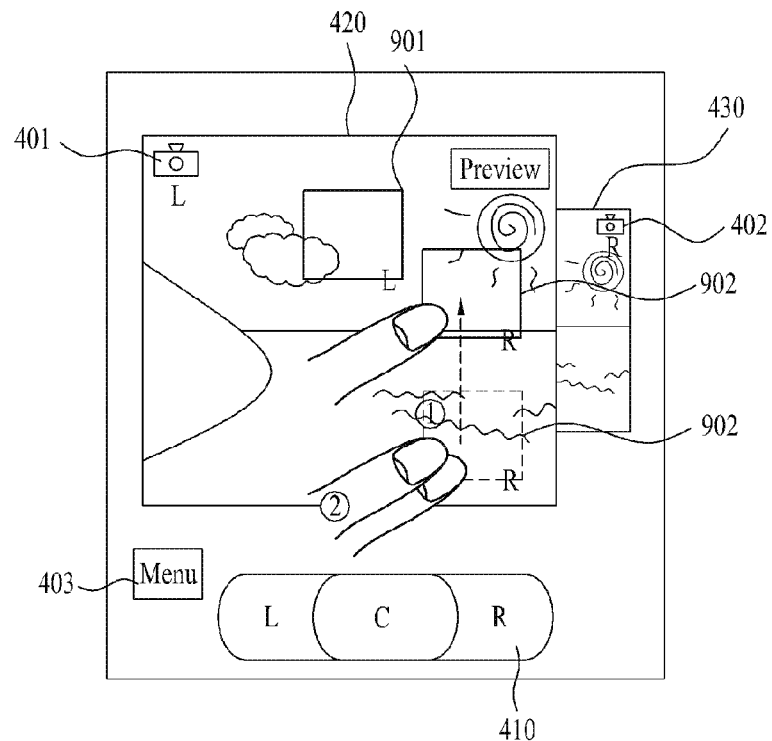
FIGS. 10A to 10D are diagrams for changing a photographing condition within a preview image according to the present invention.
Figure 10B:
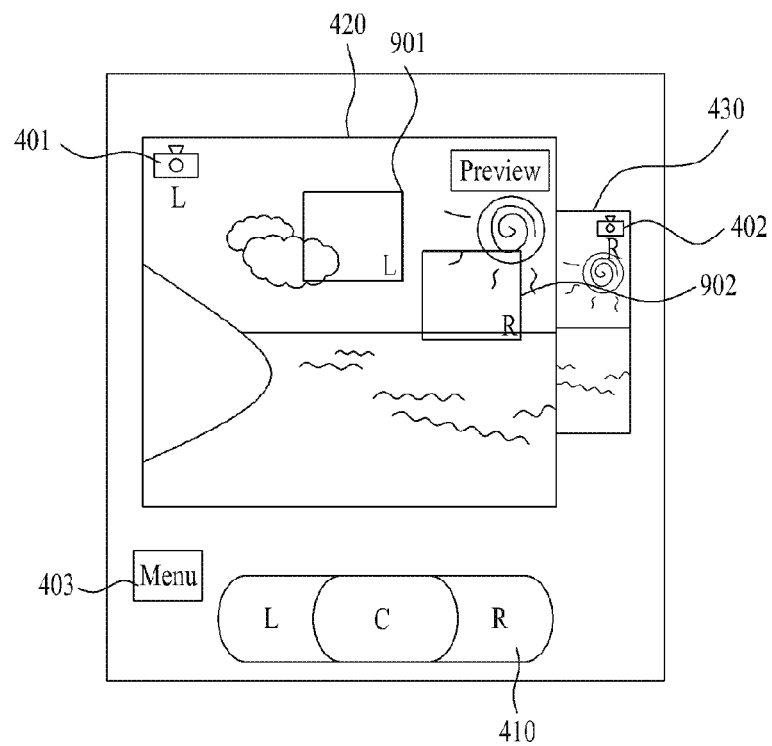

Referring to FIG. 10A and FIG. 10B, in case of receiving an input of a touch & drag action to shift a second focus box 902 corresponding to a focus of the second camera to a current position to a different position [t], the mobile terminal 100 shifts the second focus box 902 to the different position and then displays it at the different position. And, the mobile terminal 100 is able to reset a focus of the second camera to the position to which the second box 902 is shifted.

Figure 10C:
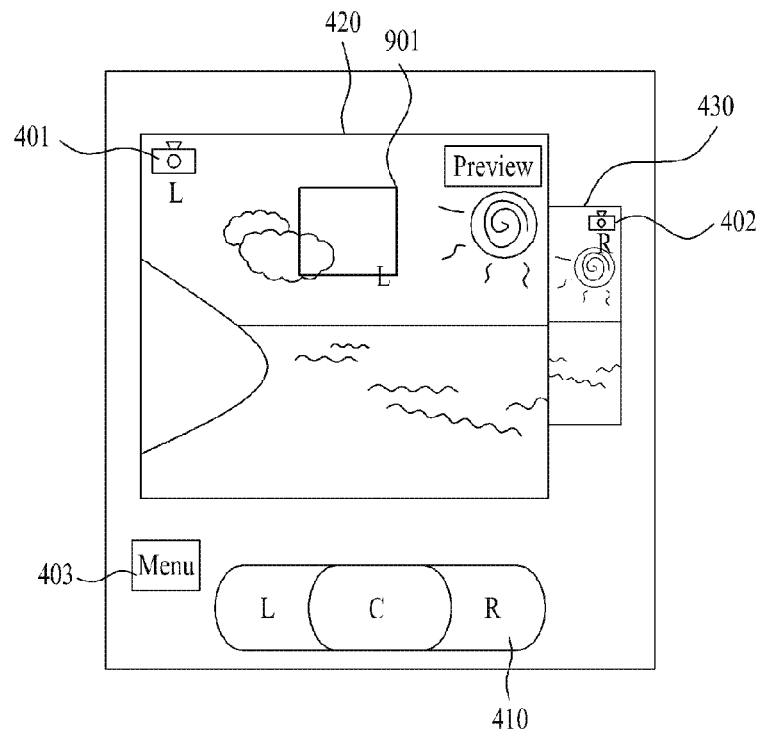

Referring to FIG. 10A and FIG. 10C, in case of receiving an input of a touch action (e.g., a touch maintained for a predetermined duration by a multi-pointer) corresponding to a focus delete command for the second focus box 902 corresponding to the focus of the second camera [c], the mobile terminal 100 releases the second camera from the focus corresponding to the second focus box 902 and may not further display the second focus box 902.

Figure 10D:
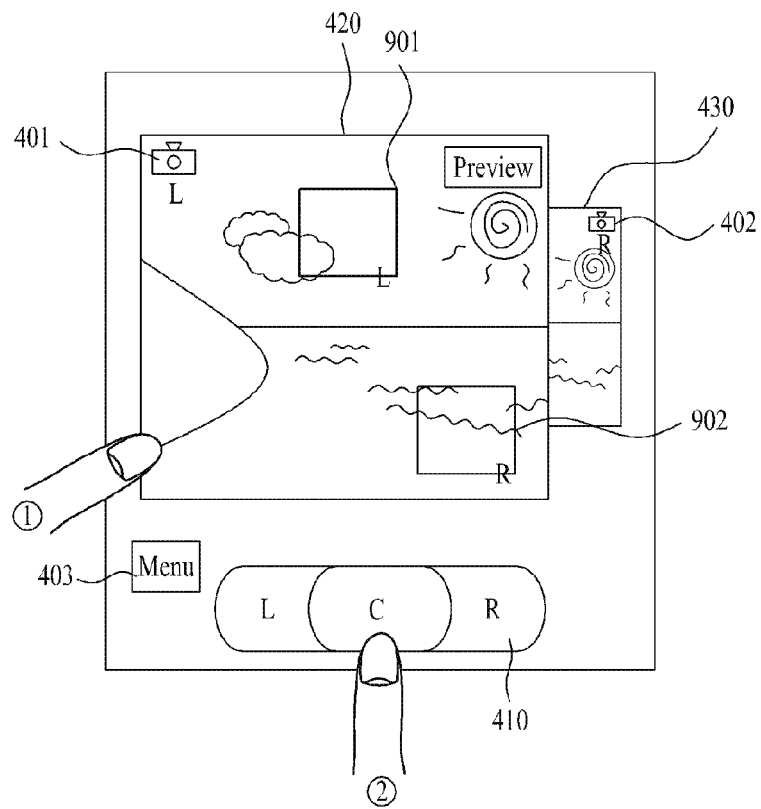

Referring to FIG. 10D, in case of receiving an input of a touch action on a random point outside the first or second focus box 901 or 902 or an input of a touch action corresponding to a photograph command on a common zone, the mobile terminal 100 is able to receive an input of a photograph command signal for an image currently displayed as a preview image.

Referring now to FIG. 3, the mobile terminal 100 receives a common photograph command signal for the first and second cameras [S350].

In this case, the common photograph command signal can include a command signal for photographing a first image currently inputted via the first camera and a second image currently inputted via the second camera respectively.

Moreover, the common photograph command signal can include a signal for commanding a simultaneous photographing of the first and second cameras or a sequential photographing of the first and second cameras. In particular, in the latter case, each of the first and second cameras can perform a photographing of its own with a predetermined time interval.

For instance, the common photograph command signal can be generated in case of receiving an input of a photograph command touch action on the common zone, receiving an input of a first photograph command touch action on the first camera zone and an input of a second photograph command touch action on the second camera zone simultaneously, receiving an input of a touch action on a key or a key zone (different from the common zone) corresponding to a common photograph command for photographing both of the first and second images, or detecting a terminal motion corresponding to a common photograph command for photographing both of the first and second images. For instance, FIG. 10D shows a process for receiving an input of a common photograph command signal.

The mobile terminal 100 photographs the first image and the second image inputted from the first camera and the second camera to correspond to the above-set first photographing condition and the above-set second photographing condition under the control of the controller 180, respectively.

In the photographing step S360, when the common photograph command signal is inputted, if the first and second images are being displayed as the preview image, the mobile terminal 100 is able to directly photograph the first and second images. On the contrary, in the photographing step S360, when the common photograph command signal is inputted, if either the first image or the second image is being displayed as the preview image, the mobile terminal 100 switches the preview image to the first and second images and is then able to photograph the first and second images. In this case, the input of the common photograph command signal can be requested again after the switching of the preview image.

In the photographing step S360, the mobile terminal 100 is able to adjust photograph angles of the first and second cameras to enable the first and second cameras to face the same object, respectively, under the control of the controller 180. So to speak, the first and second cameras can have the photograph angles adjusted to enable predetermined parts of the first and second images to be identical to each other. This enables a third image, which is generated from synthesizing the first and second images together, to have the same effect of photographing an image using a single camera.

The mobile terminal 100 synthesizes the photographed first and second images together to generate a third image under the control of the controller 180 [S370].

In the generating step S370, the mobile terminal 100 synthesizes the first and second images centering on the same part or object in the first and second images and is then able to generate the third image as a result of the corresponding synthesis. Moreover, in case that the same object in the first image differs from the same object in the second image in size, image size adjustment is performed to enable the sizes of the same objects respectively included in the first and second images to become equal to each other and the first and second images can be synthesized together. As a result of the synthesis, if a size of the third image is small or greater than that of a reference photographed image, it can be increased or decreased to fit into the reference photographed image size.

For instance, if a first focus ($1^{st}$ focus_near focus or $1^{st}$ point) and a second focus ($2^{nd}$ focus_far focus or $2^{nd}$ point) are set for the photographed first image and the photographed second image, respectively, both of the first and second focuses can be set for the third image. Alternatively, if a first exposure time and a second exposure time are set for the photographed first image and the photographed second image, respectively, the third image can reflect a brightness according to the first exposure time and a brightness according to the second exposure time. If the first image is a photographed video and the second image is a photographed still picture, the third image can include the first image of the video photographed image as a main image and the second image of the still-picture photographed image as a sub-image [cf. FIGS. 12A to 130].

The mobile terminal 100 displays the generated third image as a photographed image using the touchscreen, under the control of the controller 180 [S380].

In the displaying step S380, the mobile terminal 100 is able to display at least one of the first image, the second image and the third image generated from synthesizing the first and second images together as a photographed image entirely or selectively. In particular, in case of displaying all of the first to third images, the mobile terminal 100 is able to display the first to third images as thumbnails, respectively.

In the displaying step S380, the mobile terminal displays the generated third image as a photographed image on a whole screen and is also able to display a first region for displaying the display image and a second region for displaying the second image within the third image.

Alternatively, in the displaying step S380, the mobile terminal displays the generated third image as a photographed image on a main screen and is also able to display a first subscreen for displaying the first image and a second subscreen for displaying the second image behind the main screen.

In doing so, an indicator indicating the image inputted from the first camera, an indicator indicating the image inputted from the second camera and an indicator indicating the synthesized image of the images inputted from the first and second cameras can be displayed on the first to third images, respectively.

In the following description, the displaying step S380 is explained in detail with reference to FIGS. 11A to 14B.

Figure 11A:
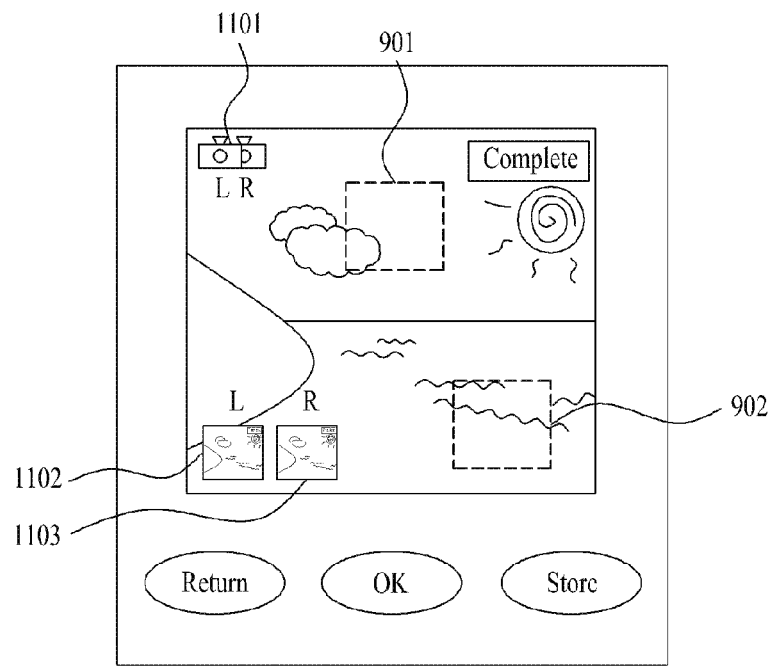
FIG. 11A and FIG. 11B are diagrams for displaying a third image generated from synthesizing a first image and a second image together as a photographed image according to the present invention.
Figure 11B:
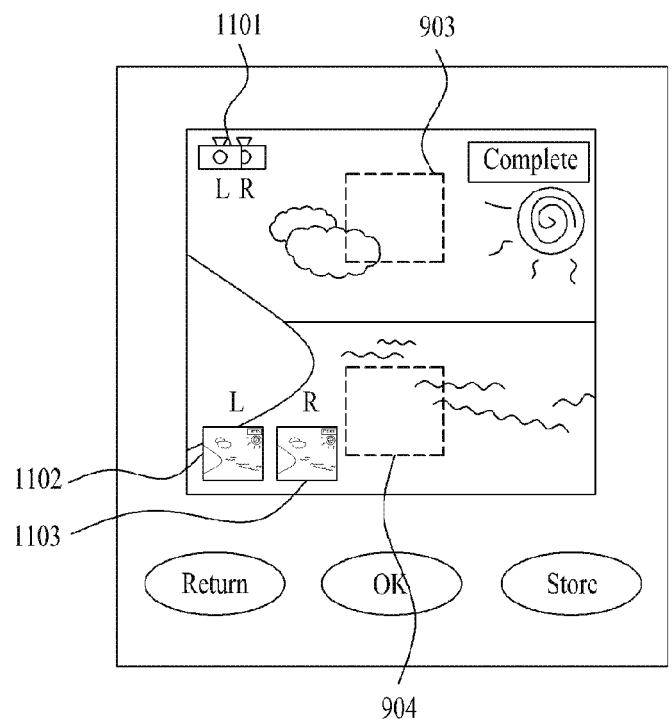

FIG. 11A and FIG. 11B are diagrams for displaying a third image generated from synthesizing a first image and a second image together as a photographed image according to the present invention.

Referring to FIG. 11A and FIG. 11B, the mobile terminal 100 displays a third image on a whole screen and is also able to display a first image and a second image on a first region 1102 and a second region 1103 within the third image, respectively.

In this case, a first focus box 901 corresponding to a focus of the first image and a second focus box 902 corresponding to a focus of the second image can be displayed on the third image. And, an indicator 1101, which indicates the third image is a synthetic image of the first and second images, can be displayed on the third image as well.

FIGS. 12A to 14B are diagrams of operations, when a first camera and a second camera perform a video photographing and a still picture photographing, respectively, according to the present invention.

Figure 12A:
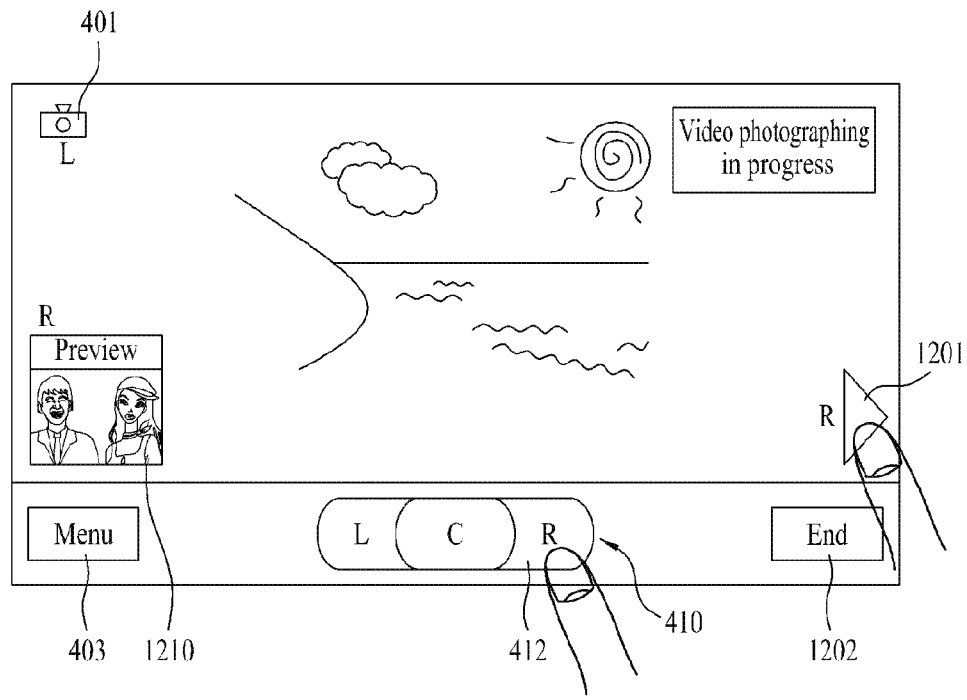
FIGS. 12A to 14B are diagrams of operations, when a first camera and a second camera perform a video photographing and a still picture photographing, respectively, according to the present invention.
Figure 12B:
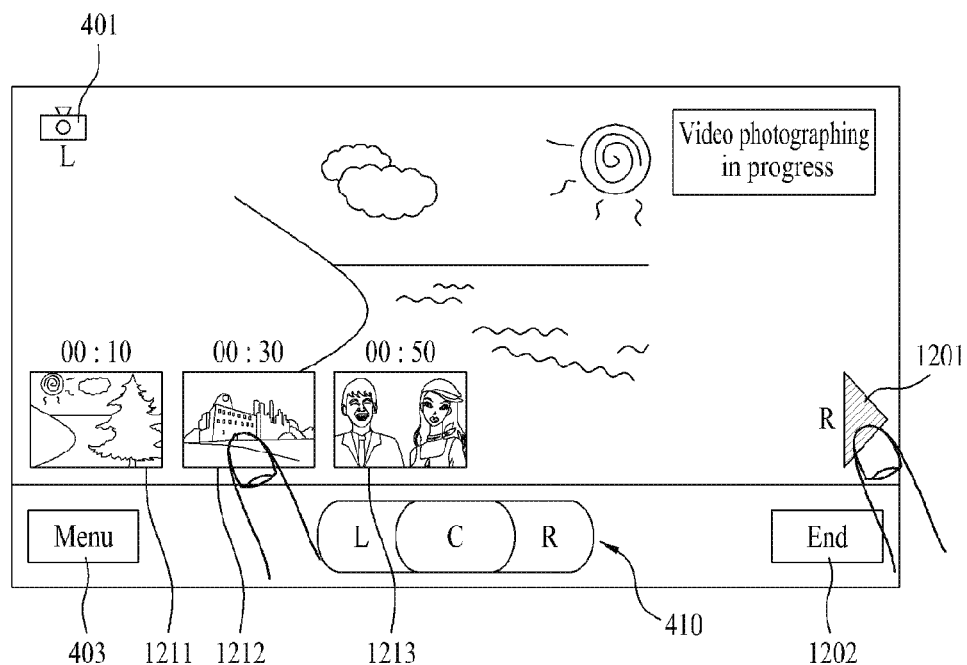
Figure 12C:
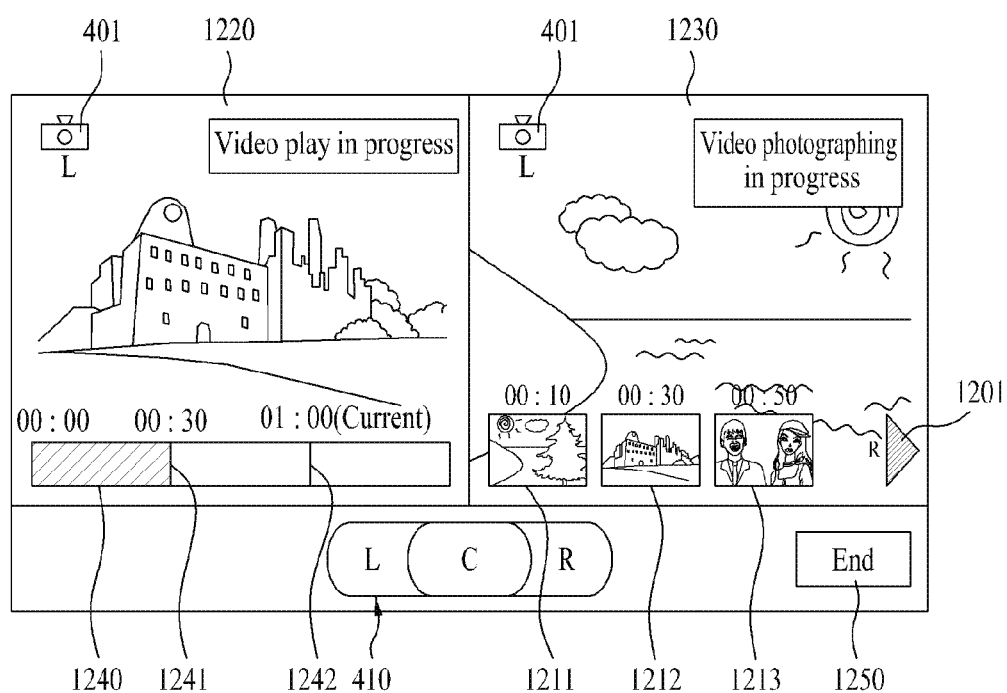

FIGS. 12A to 12C show an operation in a video photographing using the first camera.

Referring to FIG. 12A, in case of receiving an input of a photograph command touch action on the second camera zone 412 from a user in the course of the video photographing using the first camera, the mobile terminal 100 is able to photograph at least one second image by maintaining the video photographing of a first image. Moreover, referring to FIG. 12A, the first image in the course of the video photographing is displayed on a whole screen and the second image in a preview mode can be displayed on a prescribed region 1210 of the whole screen.

Referring to FIG. 12B, if a second image view zone 1201 is touched by a user in FIG. 12A, the mobile terminal 100 is able to display at least one or more second images 1211 to 1213 photographed until now on a prescribed region of the whole screen by maintaining the display of the first image on the whole screen. In this case, photograph hour information can be displayed on each of the at least one or more second images 1211 to 1213. For instance, a time elapsing from a photograph start time of the first image can be displayed as the photograph hour information.

In this case, referring to FIG. 12B, the second image view zone 1201 shown in FIG. 12A is switched to a second image close zone 1201. Hence, if the second image close zone 1201 is touched, the screen can return to the state shown in FIG. 12A.

Referring to FIG. 12C, if a specific one 1212 of the at least one or more second images 1211 to 1213 is touched by a user in FIG. 12B, the mobile terminal 100 is able to output or play the first image starting with the part corresponding to a photographed point of the specific image 1212 in the first image in the course of the video photographing.

In doing so, the mobile terminal partitions the screen into a plurality of regions including a first region 1220 and a second region 1230 and is then able to display the currently outputted first image and the currently video-photographed first image on the first region 1220 and the second region 1230, respectively.

Figure 13A:
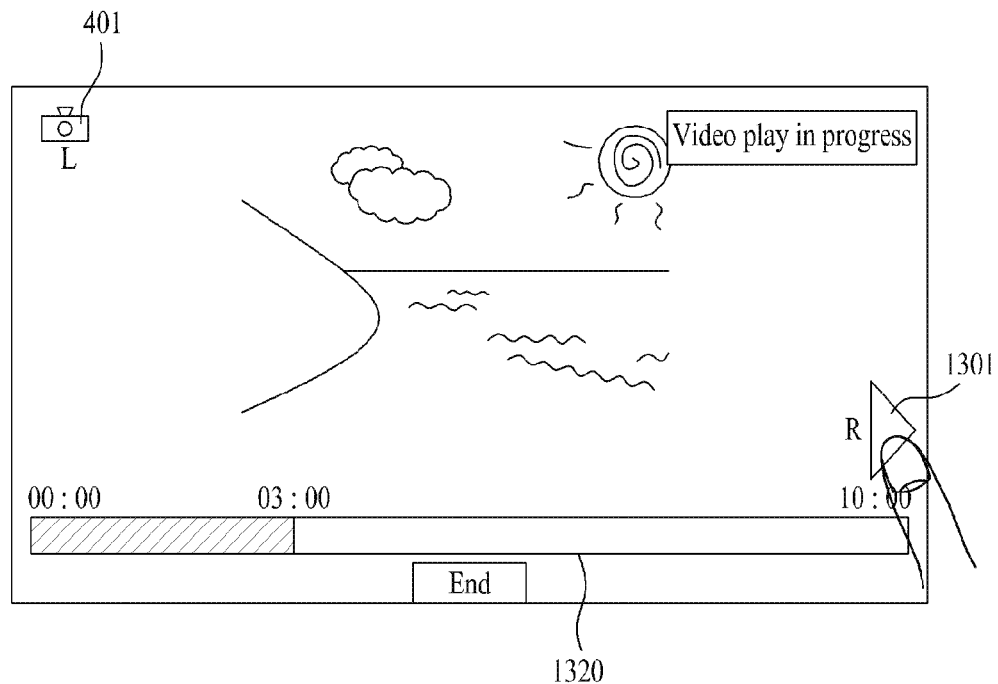
Figure 13B:
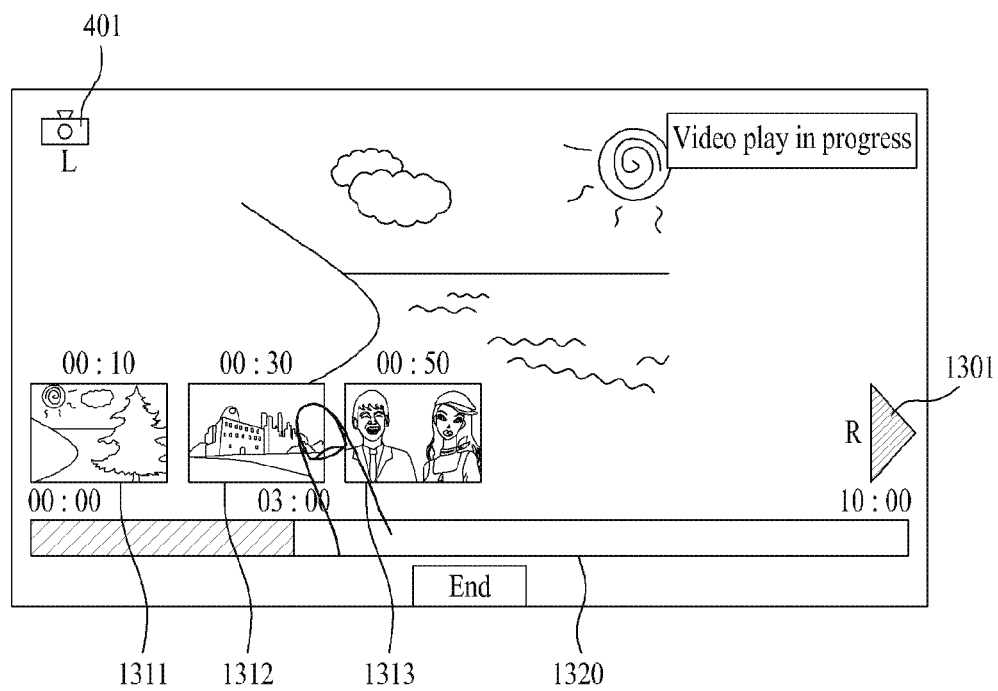
Figure 13C:
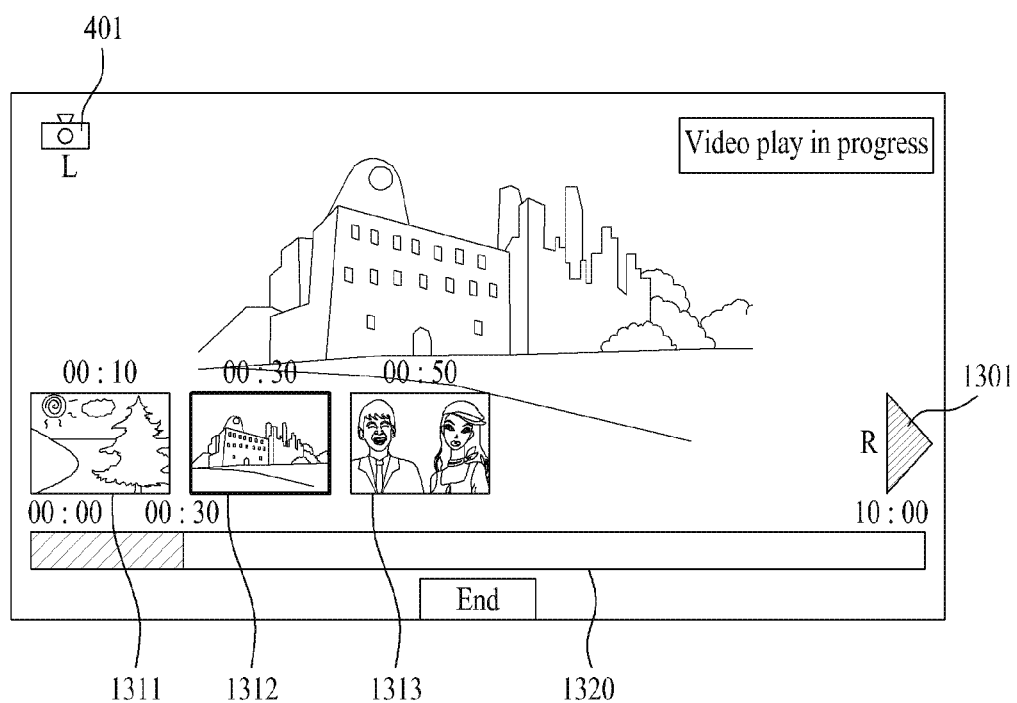

FIGS. 13A to 13C show an operation in the course of outputting a video photographing completed first image.

Referring to FIG. 13A, in the course of outputting a first image video-photographed via the first camera, the mobile terminal 100 is able to receive an input of a touch to a second image view zone 1301 from a user. In this case, an indicator, which indicates that a common-photographed second image exists, can be displayed on a prescribed region of the screen.

Referring to FIG. 13B, if the second image view zone 1301 is touched by the user in FIG. 13A, the mobile terminal, the mobile terminal 100 is able to display at least one or more second images 1311 to 1313, which are photographed in the course of photographing the first image using the second camera, on a prescribed region of the whole screen by maintaining the display of the first image on the whole screen. In this case, photograph hour information can be displayed on each of the at least one or more second images 1311 to 1313.

In this case, referring to FIG. 13B, the second image view zone 1301 shown in FIG. 13A is switched to a second image close zone 1301. Hence, if the second image close zone 1301 is touched, the screen can return to the state shown in FIG. 13A.

Referring to FIG. 13C, if a specific one 1312 of the at least one or more second images 1311 to 1313 is touched by a user in FIG. 13B, the mobile terminal 100 is able to output or play the first image starting with the part corresponding to a photographed point of the specific image 1312 in the first image.

Figure 14A:
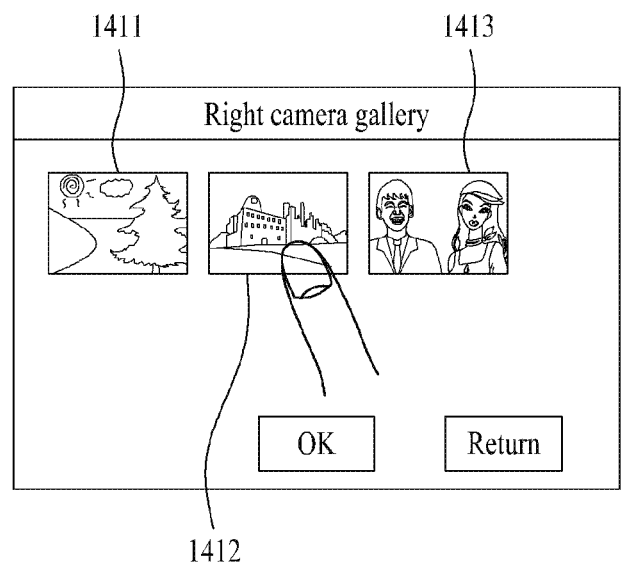
Figure 14B:
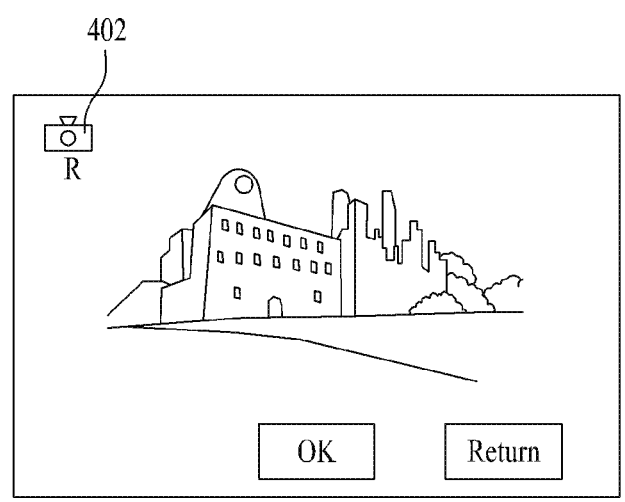

FIG. 14A and FIG. 14B show a case of receiving an input of a touch action, which corresponds to view a list of the images photographed in the course of the photographing of the first image, on the second image view zone 1201 or 1301 (or the second image close zone) shown in FIG. 12A (or FIG. 12B) or FIG. 13A (or FIG. 13B). For instance, if the second image view zone 1201 or 1301 is touched once or keeps being touched during a first time, the screen shown in FIG. 12B or FIG. 13B can be configured. For another instance, if the second image view zone 1201 or 1301 is touched twice or keeps being touched during a second time, the screen shown in FIG. 14A can be configured.

The mobile terminal 100 displays an image list including at least one or more second images 1411 to 1413 photographed in the course of a photographing of the first image [FIG. 14A] and is then able to display a specific image 1412 selected from the image list [FIG. 14B].

If a return zone is selected in FIG. 14A or FIG. 14B, the screen can go back to the state shown in FIG. 12A or FIG. 13A.

Referring now to FIG. 3, the mobile terminal 100 stores at least one of the first image photographed in the photographing step S360, the second image photographed in the photographing step S360 and the third image generated in the generating step S370 in the memory 160 under the control of the controller 180 [S390].

In particular, the storing step S390 can be performed in case that a user inputs a store command signal. Alternatively, the storing step S390 can be automatically performed irrespective of a presence or non-presence of an input of a store command signal.

For instance, the store command signal can be inputted in case of a selection of a key or key zone corresponding to a store command, a detection of a terminal motion corresponding to a store command or the like.

According to the present invention, the mobile terminal 100 displays a photographed image list including the generated third image as a photographed image and is able to further display an indicator indicating that the third image is the synthetic image of the first and second images, under the control of the controller 180. In this case, if the first and second images are stored as the photographed images, the first and second images can be included in the photographed image list. This is described in detail with reference to FIGS. 15A to 15D as follows.

FIGS. 15A to 15D are diagrams for displaying a photographed image list according to the present invention.

Figure 15A:
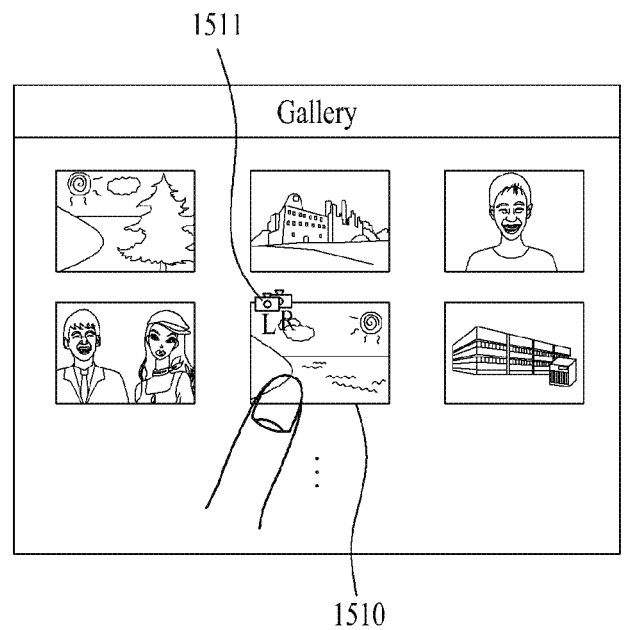
FIGS. 15A to 15D are diagrams for displaying a photographed image list according to the present invention.
Figure 15A:
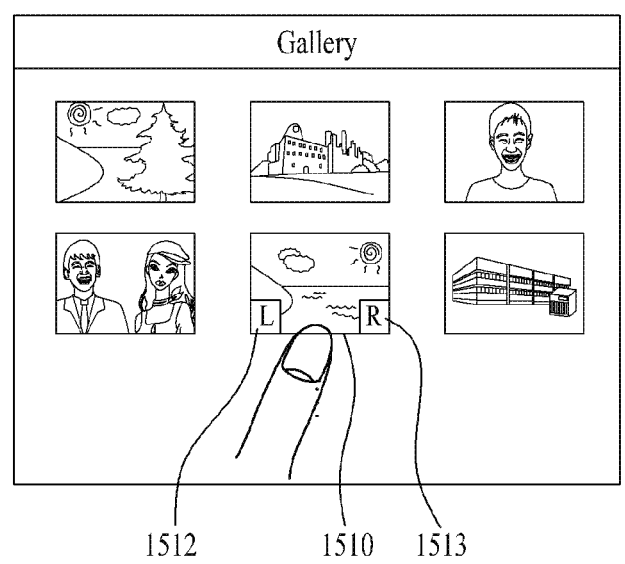

Referring to FIG. 15A, the mobile terminal 100 is able to display an indicator 1511 shown in FIG. 15A (a) or indicators 1512 and 1513 shown in FIG. 15A (b) on a photographed image list to indicate that a third image 1510 generated from synthesizing a first image and a second image together is a synthetic image.

Figure 15B:
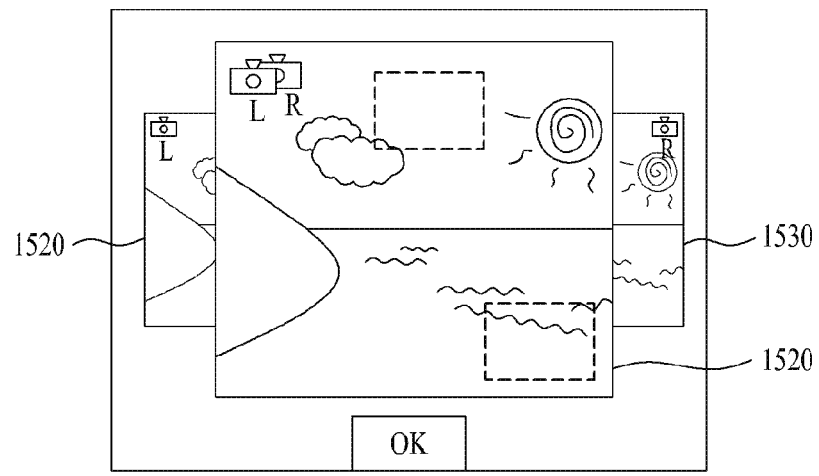
Figure 15B:
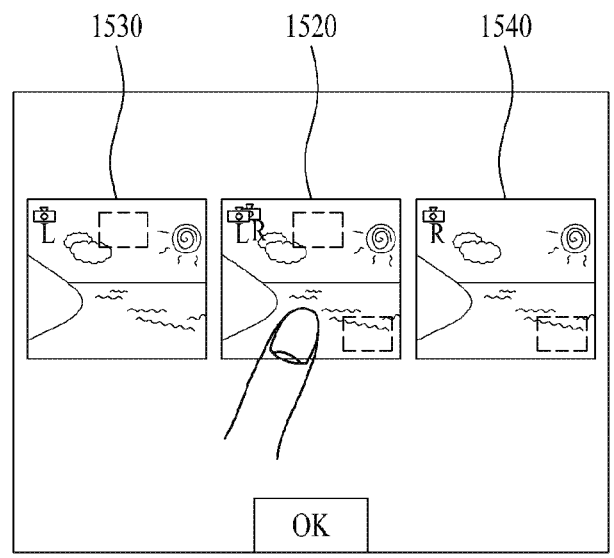

Referring to FIG. 15B, in case of receiving an input of a selection signal for the third image 1510 in FIG. 15A, the mobile terminal 100 is able to display the first to third images on the screen.

For instance, referring to FIG. 15B (a), the third image is displayed on a main screen 1520, and the first and second images are displayed on first and second subscreens 1530 and 1540 positioned behind the main screen 1510, respectively. Alternatively, referring to FIG. 15B (b), the first to third images 1520, 1530 and 1540 can be displayed as thumbnails on the screen, respectively.

Of course, if the third image 1510 is selected from the photographed image list, the third image can be directly displayed on the whole screen.

Figure 15C:
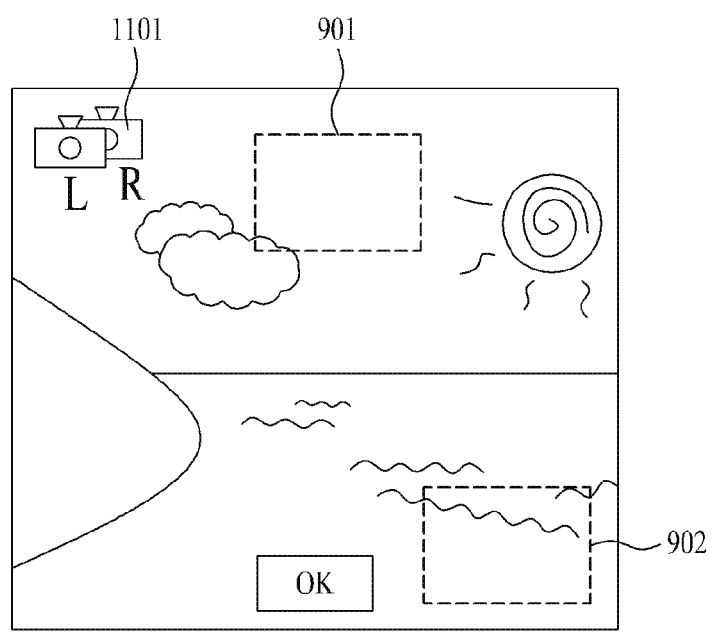

Referring to FIG. 15C, the mobile terminal 100 is able to display the image (e.g., one of the first to third images) selected in FIG. 15B on the screen. In doing so, if the third image is displayed, first and second focus boxes 901 and 902 respectively corresponding to focuses of the first and second images can be displayed within the third image.

Figure 15D:
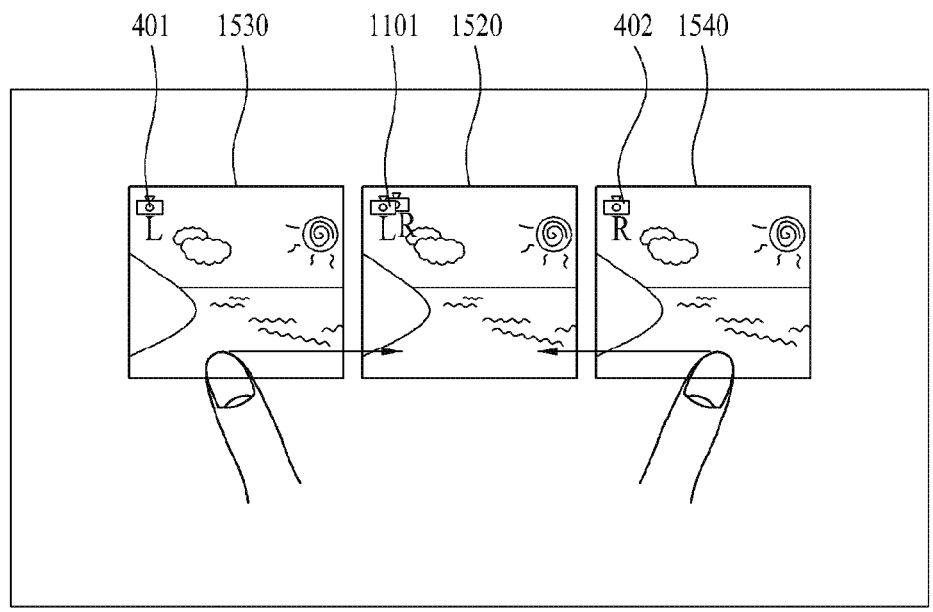
Figure 15D:
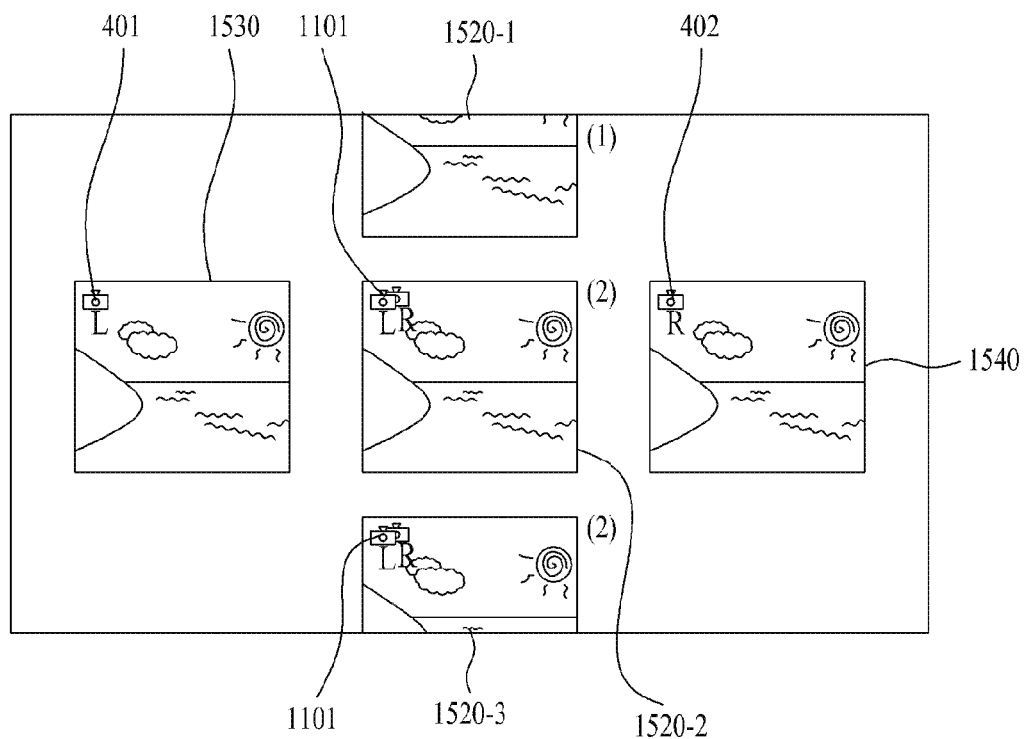

Referring to FIG. 15D, in case of receiving an input of a synthesize command action (e.g., a pinching action from the first and second images 1530 and 1540) on the first ad second images 1530 and 1540 in FIG. 15B (b) [a], the mobile terminal 100 generates a plurality of third image from combining a plurality of condition items included in a first photographing condition and condition items included in a second photographing condition together and is then able to display a plurality of the generated third images [b].

According to the present invention, if a photographing of first and second images is completed, the mobile terminal 100 is able to determine whether to generate a third image from synthesizing the first and second images together. Of course, even if there is no separate selection made by a user, if a common photograph command signal is inputted, the mobile terminal 100 is able to automatically generate the third image.

Moreover, the mobile terminal 100 is able to generate a third image at a timing point of a photographing completion of first and second images. Alternatively, in case of receiving an input of a synthesize command for the photographing completed first and second images from a user, the mobile terminal 100 is ale to generate the third image [cf. FIG. 15D].

In the following description, a method of controlling an image photographing using a plurality of cameras in a mobile terminal according to a second embodiment of the present invention is explained with reference to the accompanying drawings.

According to the second embodiment of the present invention, a camera photograph command key including a plurality of zones for controlling a plurality of the cameras is displayed. And, a photographing operation of each of a plurality of the cameras is controlled in accordance with a camera touch control action on the camera photograph command key.

Figure 16:
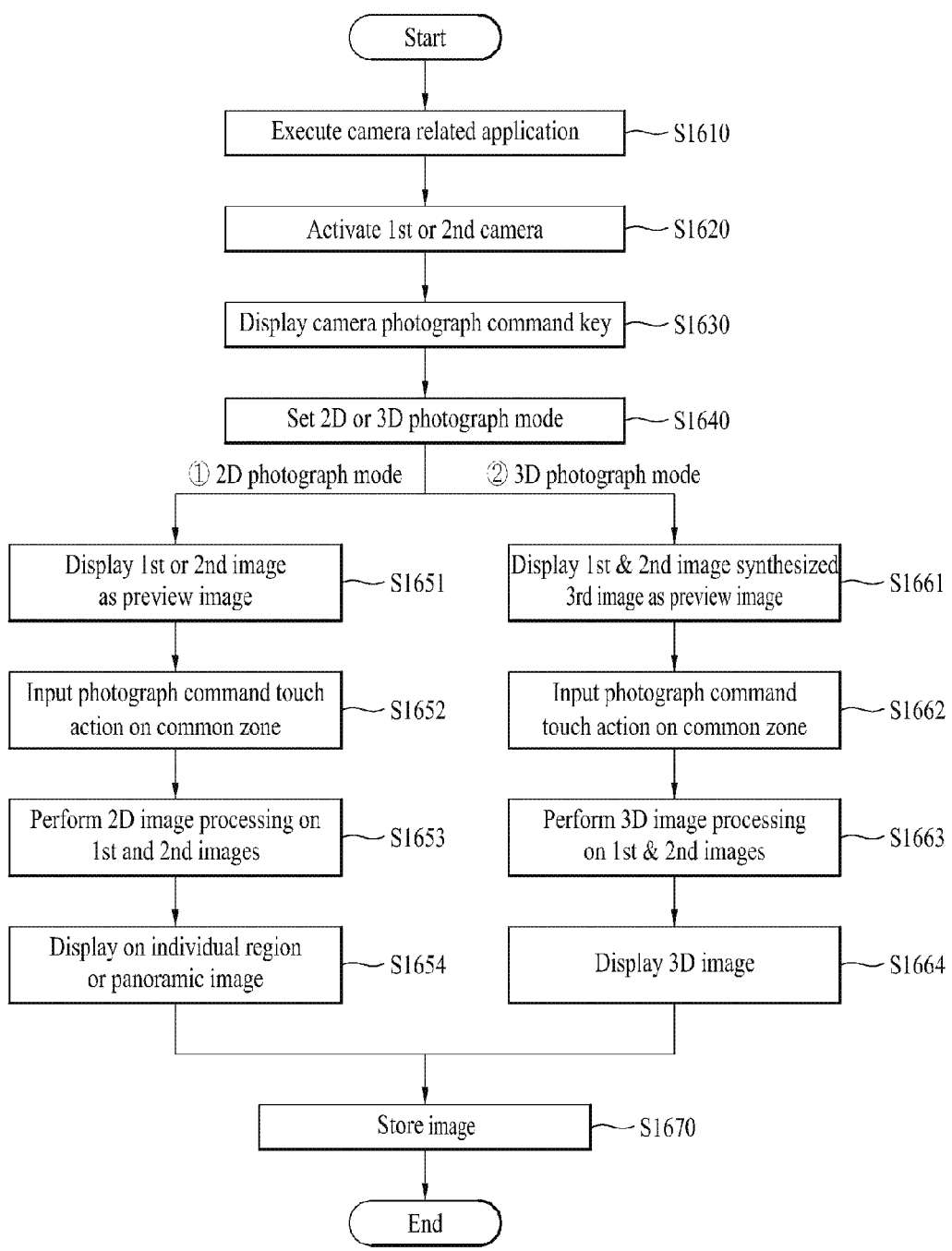
FIG. 16 is a second flowchart for a method of controlling an image photographing in a mobile terminal according to one embodiment of the present invention.

FIG. 16 is a second flowchart for a method of controlling an image photographing in a mobile terminal according to one embodiment of the present invention.

Referring to FIG. 16, the mobile terminal 100 executes a camera related application under the control of the controller 180 [S1610].

In particular, the executing step S1610 can refer to the description of the former executing step S310 of the first embodiment.

If the camera related application is executed, the mobile terminal 100 activates at least one of the first and second cameras under the control of the controller 180 [S1620].

In particular, the activating step S1620 can refer to the description of the former activating step S320 of the first embodiment.

Subsequently, the mobile terminal 100 displays a camera photograph command including a first camera zone, a second camera zone and a common zone on a prescribed region of the screen [S1630]. In particular, the displaying step S1630 can be performed using the touchscreen S330.

The structure of the camera photograph command key is described in detail with reference to FIGS. 17A to 17D as follows. For example, the first camera and the second camera can correspond to a left camera and a right camera, respectively.

Figure 17A:
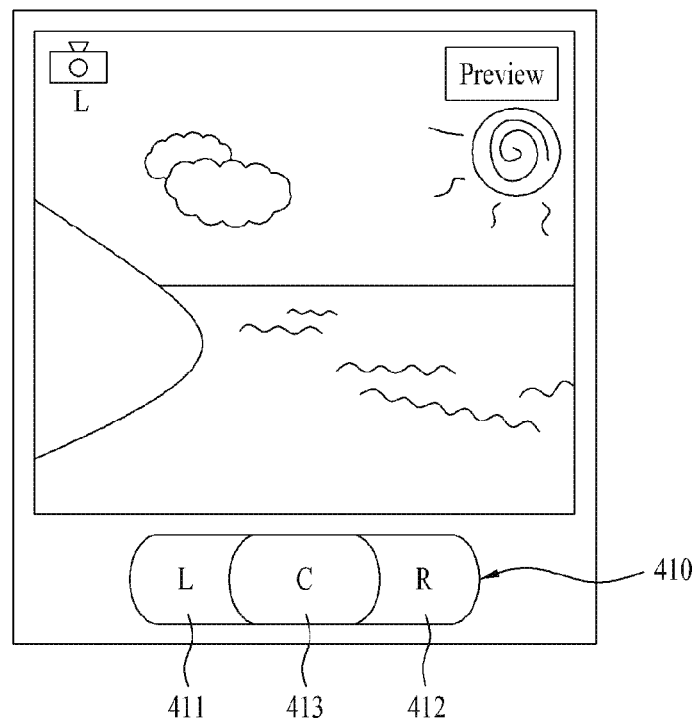
FIGS. 17A to 17D are diagrams of a camera photograph key according to the present invention.

Referring to FIG. 17A, the mobile terminal 100 displays a preview image on a whole screen and is able to display a camera photograph command key 410 on a bottom of the whole screen.

In this case, the camera photograph command key 410 can include a first camera zone 411, a second camera zone 412 and a common zone 413. In particular, the first camera zone 411 can be arranged to the left side of the camera photograph command key if the first camera is the left camera. And, the second camera zone 412 can be arranged to the right side of the camera photograph command key if the second camera is the right camera.

And, the mobile terminal 100 is able to display identification information on the corresponding camera within each of the first camera zone 411, the second camera zone 412 and the common zone 413.

For instance, the identification information can include a number of a corresponding camera (e.g., first camera_1, second camera_2, common_1+2), a color of a corresponding camera (e.g., first camera_red, second camera_blue, common_green), a name of a corresponding camera (e.g., first camera_Left or L, second camera_Right or R, common_Common or C) and the like, by which the present invention is non-limited. For instance, the identification information can be represented in various ways.

Figure 17B:
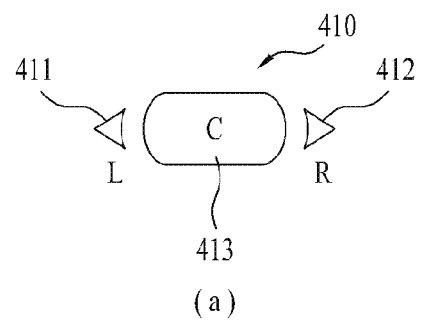
Figure 17B:
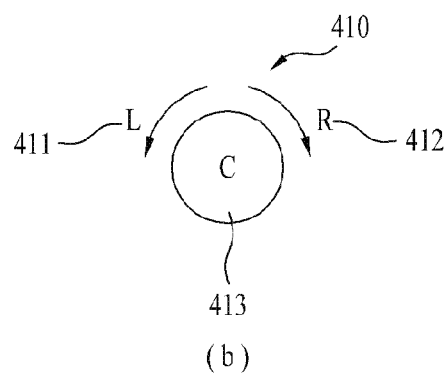

Referring to FIG. 17A and FIG. 17B, the camera photograph command key 410 can be provided in various forms.

Referring to FIG. 17A, the camera photograph command key 410 be configured in a following manner. First of all, the camera photograph command key 410 is divided into three equal parts including first to third zones. Secondly, the first camera zone 411, the common zone 413 and the second camera zone 412 can be assigned to the first zone, the second zone and the third zone in right direction, respectively. Moreover, a shape of the camera photograph command key 410 can be represented as various forms including an oval shape.

Referring to FIG. 17B (a), the camera photograph command key 410 includes the common zone 413 at its center, the first camera zone 411 of a direction indicator type provided to the left side of the common zone 413, and the second camera zone 412 of a direction indicator type provided to the right side of the common zone 413.

Referring to FIG. 17A or FIG. 17B (a), the mobile terminal 100 is able to receives a touch action on the first camera zone 411 or the second camera zone 412 or an input of a touch & drag action from the common zone 413 to the first or second camera zone 411 or 412 as a camera operation related touch action on the first camera zone 411 or the second camera zone 412 from a user. Moreover, the mobile terminal 100 is able to receive an input of a touch action on the common zone 413 as a camera operation related touch action on the common zone 413 from a user.

Referring to FIG. 17B (b), the camera photograph command key 410 includes a circular key to which the common zone 413 is assigned. And, it is able to assign the first camera zone 411 to the circular key in a counterclockwise direction. Moreover, it is able to assign the second camera zone 412 to the circular key in a clockwise direction.

Referring to FIG. 17B (b), the mobile terminal 100 is able to receive an input of a touch action for rotating the circular key clockwise/counterclockwise as a camera operation related touch action on the first/second camera zone 411/412 from a user. Moreover, the mobile terminal 100 is able to receive a touch action on the circular key as a camera operation related touch action on the common zone 413.

Figure 17C:
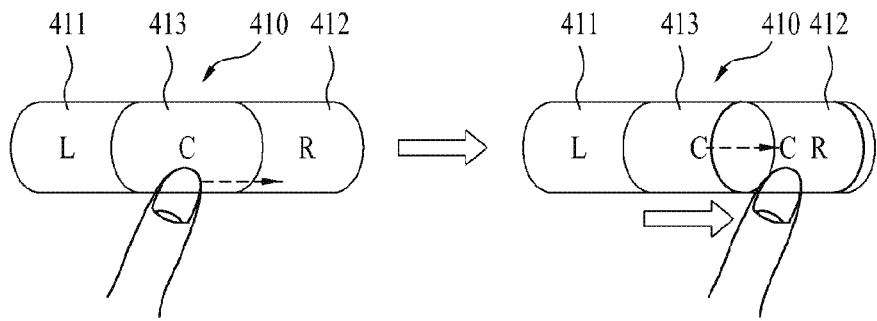
Figure 17C:
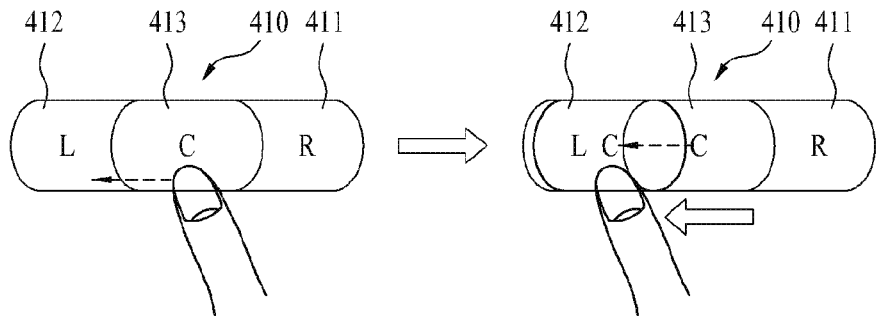

Referring to FIG. 17C, the camera photograph command key 410 can receives an input of a touch & drag action from one of the first camera zone 411, the second camera zone 412 and the common zone 413 to another zone and is then able to temporarily shift a position of one zone to another zone to correspond to the touch & drag action. If the touch & drag action ends, the position of the shifted zone can return to the original position.

Figure 17D:
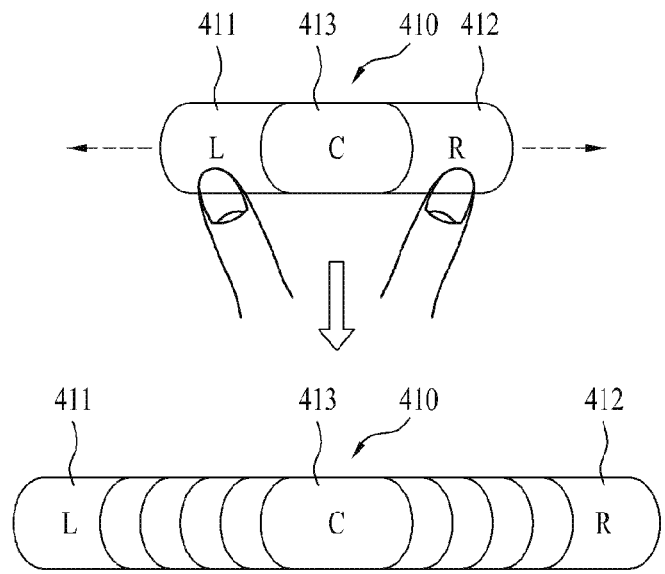

Referring to FIG. 17D, in case of receiving a first touch & drag action from a first point of the first camera zone 411 outward and a second touch & drag action from a second point of the second camera zone 412 outward simultaneously or separately, the camera photograph command key 410 can be configured in a manner that the first camera zone 411 and the second camera zone 412 are extended outwardly to correspond to the first touch & drag action and the second touch & drag action, respectively.

If the first touch & drag action and the second touch & drag action end, the first camera zone 411 an the second camera zone 412 can gradually return to their original statuses, respectively. For instance, the bigger the extended extent gets, the longer time it takes to return to the original status.

Referring now to FIG. 16, in case of executing the camera related application, the mobile terminal sets either a 2D photograph mode or a 3D photograph mode under the control of the controller 180 [S1640].

In this case, the 2D photograph mode means a mode for treating a first image photographed via the first camera and a second image photographed via the second camera as individual photographed images, respectively. And, the 3D photograph mode means a mode for treating a 3D image generated from synthesizing a first image photographed via the first camera and a second image photographed via the second camera together as a photographed image.

In the setting step S1640, the mobile terminal is able to set a photograph mode selected by a user from the 2D photograph mode and the 3D photograph mode or a photograph mode randomly selected by the controller 180.

In this case, the selection of the photograph mode by the user or the controller 180 can be performed before or after the camera related application execution.

For instance, the pre-selection by the user can be performed if a menu item corresponding to the photograph mode selection is executed via a menu search. And, the post-selection by the user can be executed if a window for selecting either the 2D photograph mode or the 3D photograph mode at a start point of the camera related application execution or the corresponding menu item is executed. Moreover, the selection by the controller 180 can be performed in a manner of automatically selecting the camera activated in a lately executed camera related application or the camera having a high activation time (or activation frequency) for a predetermined period of time.

In the setting step S1640, the mobile terminal 100 is able to receive an input of a photograph mode switching touch action on the common zone in the camera photograph command key. If the 2D photograph mode is currently set, the mobile terminal 100 can switch the 2D photograph mode to the 3D photograph mode under the control of the controller 180. On the contrary, if the 3D photograph mode is currently set, the mobile terminal 100 can switch the 3D photograph mode to the 2D photograph mode under the control of the controller 180.

In this case, the photograph mode switching touch action can mean a touch action for commanding to switch a currently set photograph mode to another photograph mode. The photograph mode switching touch action can be configured to have a touch pattern different from that of a photograph command touch action on the common zone or a preview command touch action, which will be described later.

For instance, the photograph mode switching touch action can have a pattern of maintaining a touch during a first hour or a pattern of a single touch. The preview command touch action can have a pattern of maintaining a touch during a second hour or a pattern of double touches. And, the photograph command touch action can have a pattern of maintaining a touch during a third hour or a pattern of triple touches. Moreover, the common zone can have a red color as a feedback according to a touch action input if a photograph mode switching touch action is inputted. The common zone can have a blue as a feedback according to a touch action input if a preview command touch action is inputted. The common zone can have a green color as a feedback according to a touch action input if a photograph command touch action is inputted.

Meanwhile, identification information on a currently set photograph mode can be displayed within the common zone.

For instance, if a currently set photograph mode is a 2D setting mode, the identification information can include one of 2D, 2 dimensions, 2, a random planar image and the like. For another instance, if a currently set photograph mode is a 3D setting mode, the identification information can include one of 3D, 3 dimensions, 3, a random stereoscopic image and the like. And, per-photograph mode identification information, which will be displayed within the common zone, can be selected by a user from identification informations stored in the memory or identification informations received from an external server or an external terminal.

In the following description, the setting step S1640 is explained in detail with reference to FIG. 18A and FIG. 18B.

Figure 18A:
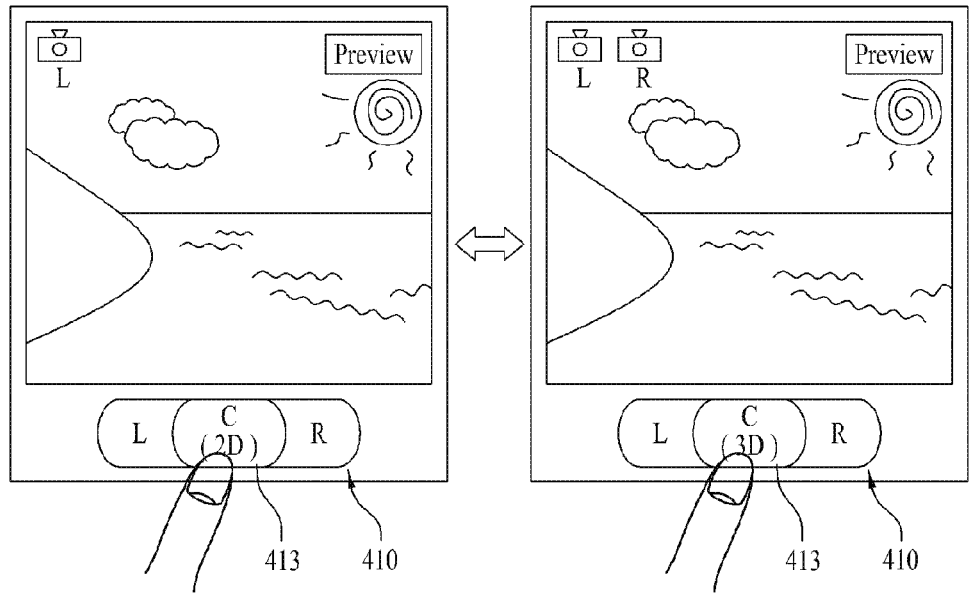
FIG. 18A and FIG. 18B are diagrams of a switching process between a 2D photograph mode and a 3D photograph mode according to the present invention.
Figure 18B:
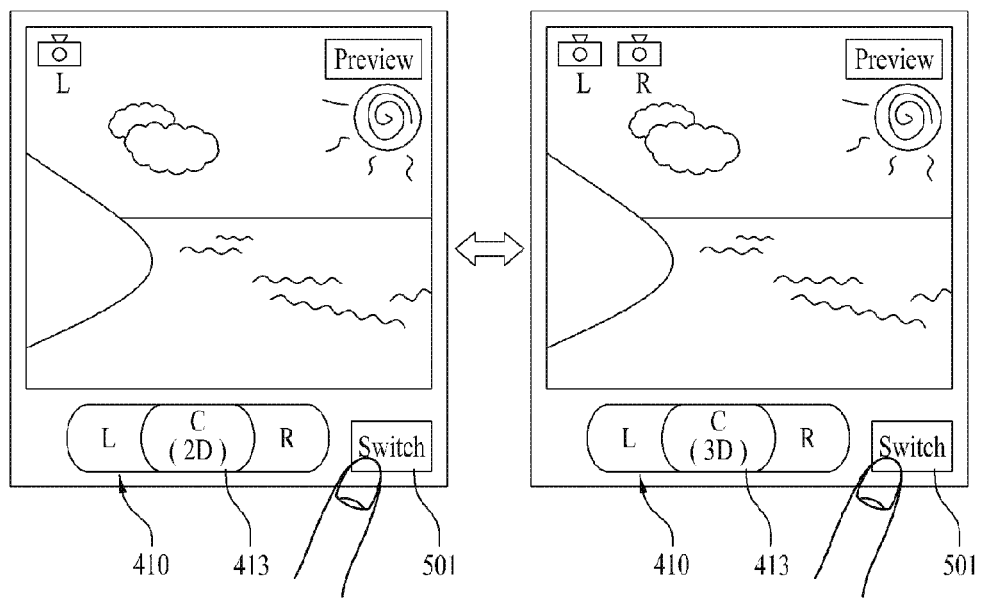

FIG. 18A and FIG. 18B are diagrams of a switching process between a 2D photograph mode and a 3D photograph mode according to the present invention.

Referring to FIG. 18A, while a 2D photograph mode (or a 3D photograph mode) is set, if a photograph mode switching touch action on the common zone 413 is inputted, the mobile terminal 100 is able to switch to the 3D photograph mode (or the 2D photograph mode). In this case, as identification information, 2D (or 3D) can be displayed if the 2D (or 3D) photograph mode is set.

Referring to FIG. 18B, while a 2D photograph mode (or a 3D photograph mode) is set, if a touch action on a switch command zone 501 is inputted, the mobile terminal 100 is able to switch to the 3D photograph mode (or the 2D photograph mode).

Optionally, the photograph mode switching can be performed if a corresponding menu item is executed via a menu search or a motion of a corresponding terminal is detected [not shown in the drawings].

Referring now to FIG. 16, a case of setting a 2D photograph mode [first case] and a case of setting a 3D photograph mode [second case] are separately explained in the following description.

First of all, the first case (i.e., 2D photograph mode) is described in detail with reference to the accompanying drawings.

Referring to FIG. 16, under the control of the controller 180, the mobile terminal 100 displays at least one of a first image inputted from the first camera and a second image inputted from the second camera as a preview image [S1651]. In this case, the displaying step S1651 can be performed using the touchscreen 151.

In the displaying step S1651, the mobile terminal 100 is able to display at least one selected by a user from the first and second images or at least one image randomly selected by the controller as the preview image.

For instance, if the first camera is designated to a basic camera, the controller 180 is able to display the first image as the preview image. Furthermore, if the first image is displayed as the preview image, the second camera is turned off (i.e., no input image). Alternatively, even if an image is externally inputted while the second camera is turned on, the inputted image may not be displayed as the preview image.

In the following description, a process for displaying a first image as a preview image is explained with reference to FIGS. 19A to 19C. In the following description, the first camera can include the left camera for example.

Figure 19A:
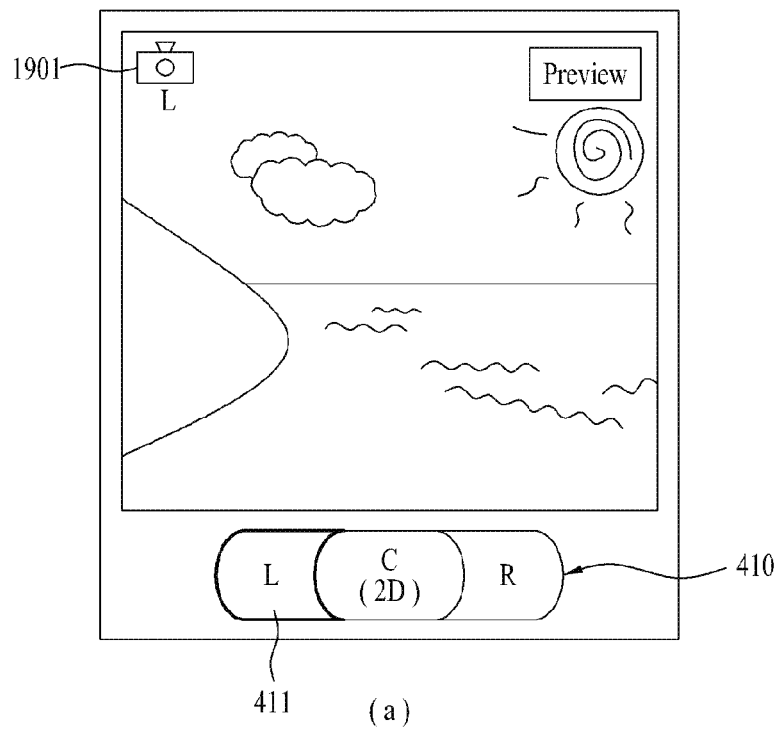
FIGS. 19A to 19C are diagrams of a preview image inputted from a left camera in a 2D photograph mode according to the present invention.
Figure 19A:
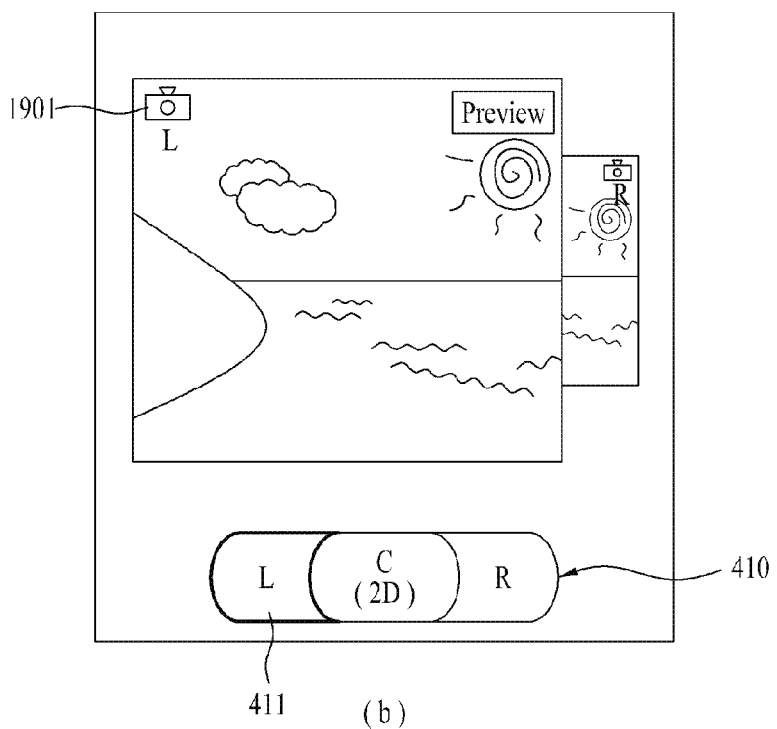
Figure 19B:
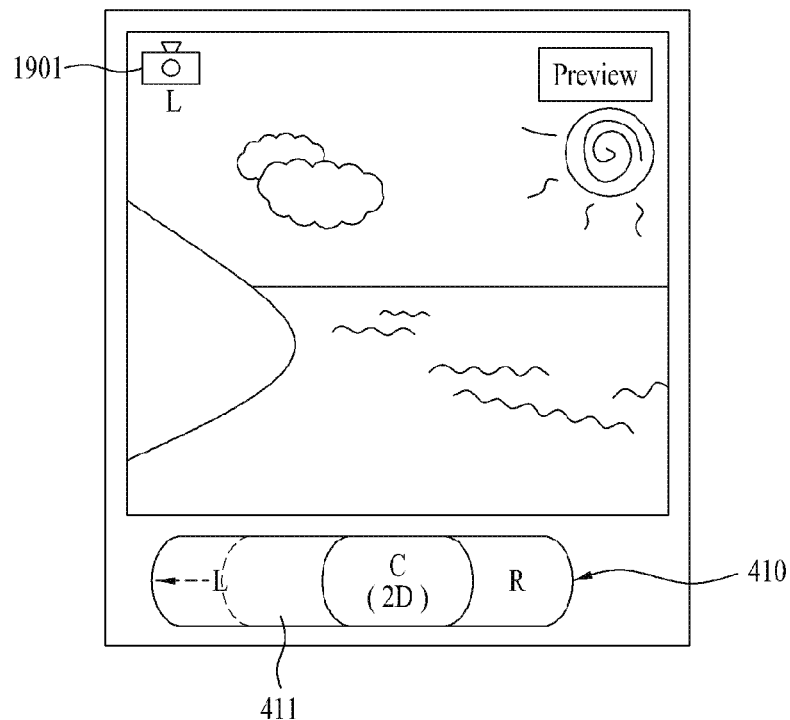
Figure 19C:
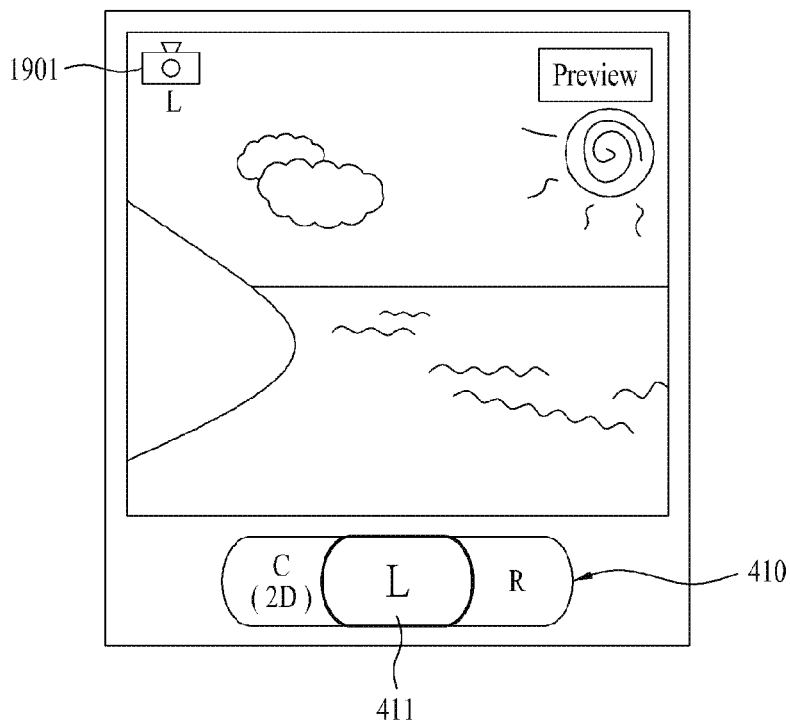

FIGS. 19A to 19C are diagrams of a preview image inputted from a left camera in a 2D photograph mode according to the present invention.

Referring to FIGS. 19A to 19C, in case of executing a camera related application, the mobile terminal 100 activates the first camera designated as a basic camera, displays a first image inputted from the first camera as a preview image, and is able to display an indicator 1901 indicating that the firs image is the preview image inputted from the first camera on a prescribed region of the first image.

In particular, referring to FIG. 19A (b), while displaying the first image as the preview image on a main screen, the mobile terminal 100 is able to display a portion of a second image inputted from the second camera behind the main screen.

In case that the first image inputted from the first camera is displayed as the preview image, the camera photograph command key 410 can identifiably display the first camera zone 411 corresponding to the first camera.

For instance, the first camera zone 411 is represented thick or as a color different from that of other zones [cf. FIG. 19A], is enlarged into a predetermined size [cf. FIG. 19B], or can be arranged at a center by switching its position to that of the common zone 413 [cf. FIG. 19O], by which the present invention is non-limited.

Alternatively, in order to indicate that the currently displayed preview image is the first image, the mobile terminal 100 is able to identifiably display the first camera zone 411 in various ways.

In the following description, a process for displaying a second image as a preview image is explained with reference to FIGS. 20A to 20O. In the following description, the second camera can include the right camera for example.

Figure 20A:
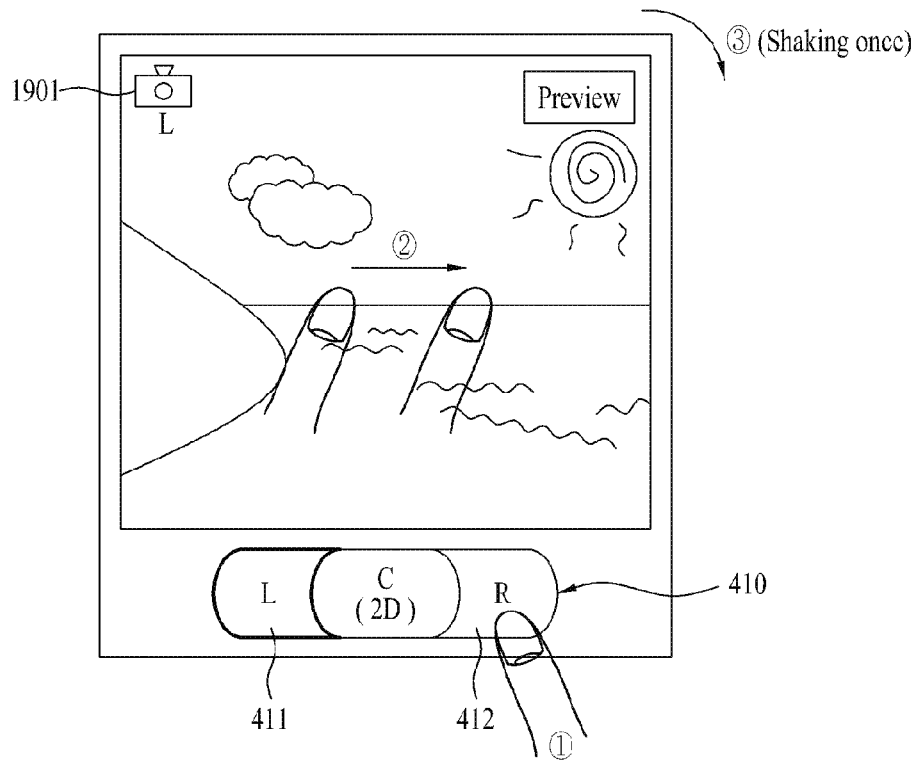
FIGS. 20A to 20C are diagrams of a preview image inputted from a right camera in a 2D photograph mode according to the present invention.

FIGS. 20A to 20O are diagrams of a preview image inputted from a right camera in a 2D photograph mode according to the present invention.

Referring to FIG. 20A, while the first image inputted from the first camera is displayed as the preview image, the mobile terminal 100 is able to receives an input of a command signal for switching the second image inputted from the second camera to the preview image (hereinafter named a preview switch command signal).

For instance, the mobile terminal 100 is able to receive the input of the preview switch command signal in case of receiving an input of a preview command touch action on the second camera zone 412 from a user [①], receiving a touch & drag or flicking action on the first image in a first direction using a single pointer [②], or detecting a single terminal shaking [③], by which the present invention is non-limited. Alternatively, the preview switch command signal can be inputted in various ways.

Figure 20B:
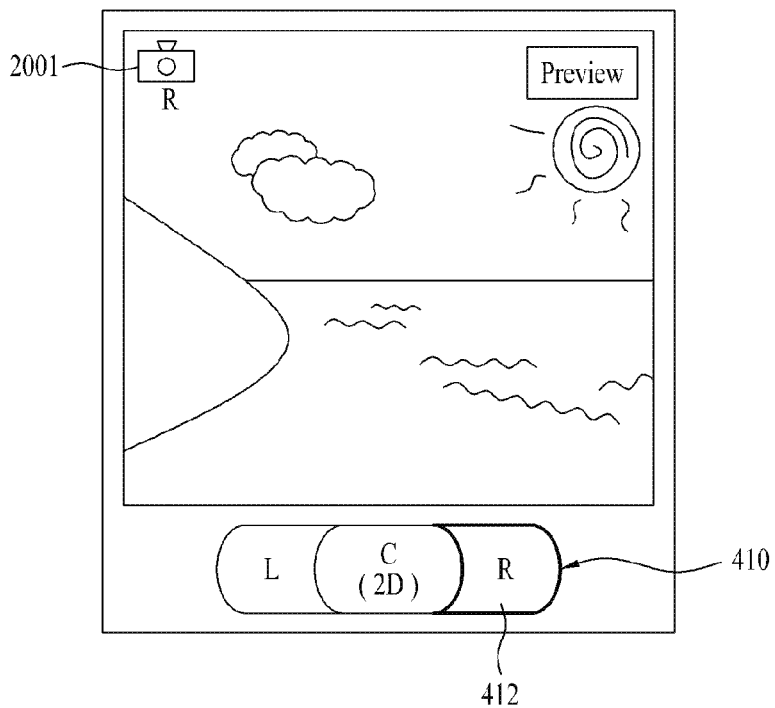

Referring to FIG. 20B and FIG. 20O, in case of receiving the input of the preview switch command signal in FIG. 20A, the mobile terminal 100 switches the preview image from the first image to the second image. While the mobile terminal 100 displays the second image as the preview image, the mobile terminal 100 is able to display an indicator 2001 indicating that the displayed image is the preview image inputted from the second camera on a prescribed region of the second image.

Figure 20C:
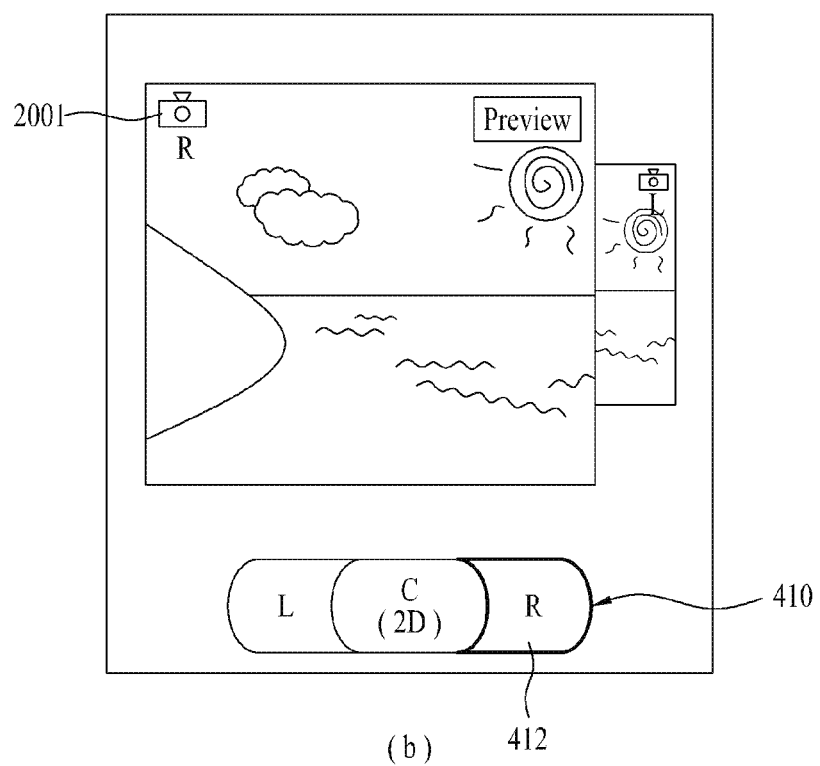

In particular, referring to FIG. 20C, while the mobile terminal 100 displays the second image as the preview image on a main screen, the mobile terminal 100 is able to display a portion of the first image inputted from the first camera behind the main screen.

In case that the second image inputted from the second camera is displayed as the preview image, the mobile terminal 100 identifiably display the second camera zone 412 corresponding to the second camera.

For instance, the second camera zone 412 is represented thick or as a color different from that of other zones [cf. FIG. 20A, FIG. 20B], is enlarged into a predetermined size, or can be arranged at a center by switching its position to that of the common zone 413.

In the following description, a process for displaying first and second images as a preview image is explained with reference to FIG. 21A and FIG. 21B. In the following description, the first camera and the second camera can include the left camera and the right camera, respectively, for example.

Figure 21A:
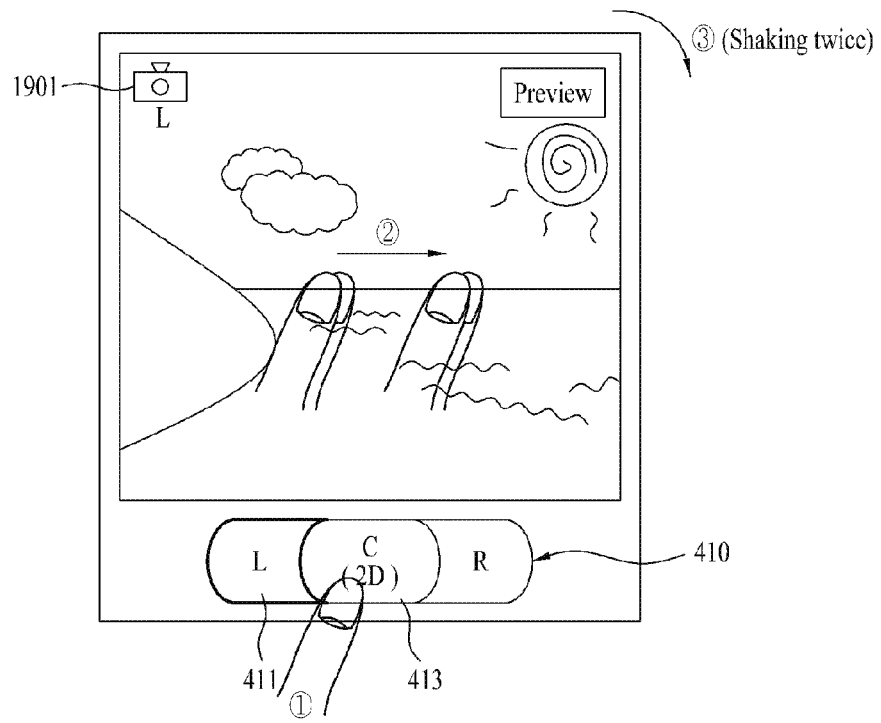
FIG. 21A and FIG. 21B are diagrams of preview images respectively inputted from left and right cameras in a 2D photograph mode according to the present invention.
Figure 21B:
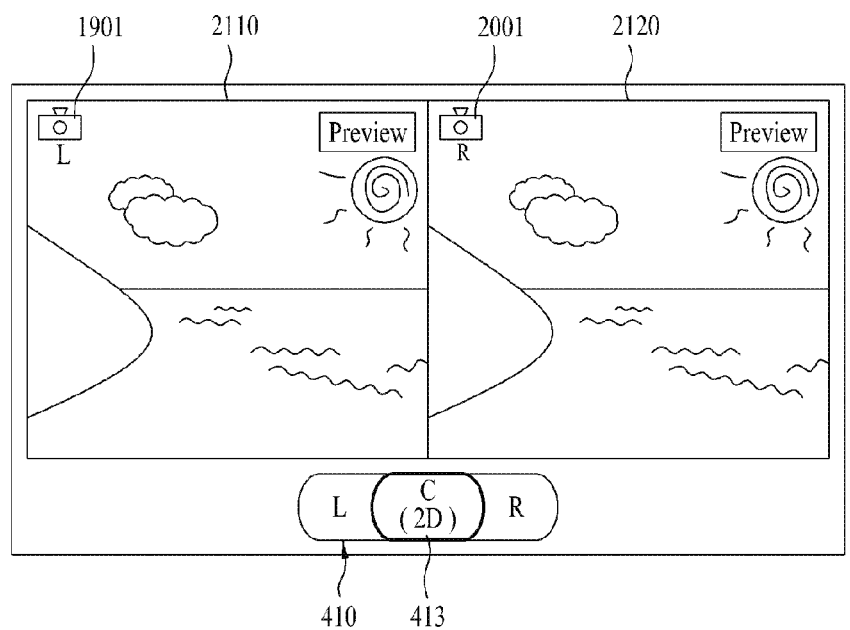

FIG. 21A and FIG. 21B are diagrams of preview images respectively inputted from left and right cameras in a 2D photograph mode according to the present invention.

Referring to FIG. 21A, while the first image inputted from the first camera (or the second image inputted from the second camera) is displayed as a preview image, the mobile terminal 100 is able to receive an input of a command signal (hereinafter named a preview switch command signal) for switching the first and second images respectively inputted from the first and second cameras to the preview image.

For instance, the mobile terminal 100 is able to receive the input of the preview switch command signal in case of receiving an input of a preview command touch action on the common zone 413 from a user [①], receiving a touch & drag or flicking action on the preview image in a first direction using a single pointer [②], or detecting double terminal shakings [③]. In this case, assuming that the first image is displayed as the preview image, a preview switch command signal for switching to the second image and a preview switch command signal for switching to the first and second images can differ from each other in an input pattern.

Referring to FIG. 21B, in case of receiving the preview switch command signal in FIG. 21A, the mobile terminal 100 switches the preview image from the first image to the first and second images, partitions the screen into a plurality of regions, and is then able to display the first image and the second image on the first region 2110 and the second region 2120, respectively. In doing so, an indicator 1901 indicating the preview image inputted from the first camera and an indicator 2001 indicating the preview image inputted from the second camera can be display on a prescribed region of the first image and a prescribed region of the second image, respectively.

In case of displaying the first and second images respectively inputted from the first and second cameras as the preview image, the mobile terminal 100 is able to identifiably display the common zone 413 corresponding to the first and second cameras in common.

For instance, the common zone 413 is represented thick or as a color different from that of other zones [cf. FIG. 21B] or can be enlarged into a predetermined size.

Referring now to FIG. 16, in case of receiving an input of a photograph command touch action on the common zone in the camera photograph command key, the mobile terminal 100 photographs the first and second images respectively inputted from the first and second cameras under the control of the controller 180 [S1652].

In particular, in case of receiving the input of the photograph command touch action on the common zone, the controller 180 generates a common photograph command signal and is then able to control the first and second cameras to photograph the currently inputted first and second images according to the generated common photograph command signal, respectively.

For instance, the common photograph command signal can be generated if the photograph command touch action on the common zone is inputted. For another instance, if a first photograph command touch action on the first camera zone and a second photograph command touch action on the second camera zone are simultaneously received, the common photograph command signal can be generated. For another instance, if a touch action on a key or a key zone (different from the common zone) corresponding to a common photograph command for photographing both of the first and second images is inputted, the common photograph command signal can be generated. For further instance, if a terminal motion corresponding to a common photograph command for photographing both of the first and second images is detected, the common photograph command signal can be generated.

In the photographing step S1652, when the photograph command touch action on the common zone is inputted, if the first and second images are being displayed as the preview image, the mobile terminal 100 is able to directly photograph the first and second images.

On the contrary, in the photographing step S1652, when the photograph command touch action on the common zone is inputted, if either the first image or the second image is being displayed as the preview image, the mobile terminal 100 switches the preview image to the first and second images and is then able to photograph the first and second images in case of receiving a re-input of the photograph command touch action on the common zone.

The mobile terminal 100 performs a 2D image processing on the photographed first and second images under the control of the controller 180 [S1653].

In the performing step S1653, the mobile terminal 100 processes the photographed first and second images into individually photographed images, respectively, by a 2D image processing [hereinafter named an individual image processing], or is able to generate a panoramic image using the photographed first and second images [hereinafter named a panoramic image processing]. In this case, the panoramic image can bring such an effect that the first and second images are consecutively photographed in a manner of shifting positions of the first and second images with reference to a common part in-between.

Of course, in case of receiving an input of a photograph command touch action on the common zone, the mobile terminal 100 is able to discriminate whether the inputted photograph command touch action corresponds to a command for the individual image processing or the panoramic image processing. In this case, since a touch action pattern set for the individual image processing is different from that for the panoramic image processing, the mobile terminal 100 is able to discriminate the inputted photograph command touch action.

The mobile terminal 100 displays the first and second images processed by the individual image processing as photographed images on individual regions, respectively or displays the generated panoramic image as the photographed image, under the control of the controller 180 [S1654]. In this case, the displaying step S1654 can be performed using the touchscreen 151.

The displaying step S1654 is explained in detail with reference to FIGS. 22A to 22C as follows.

Figure 22A:
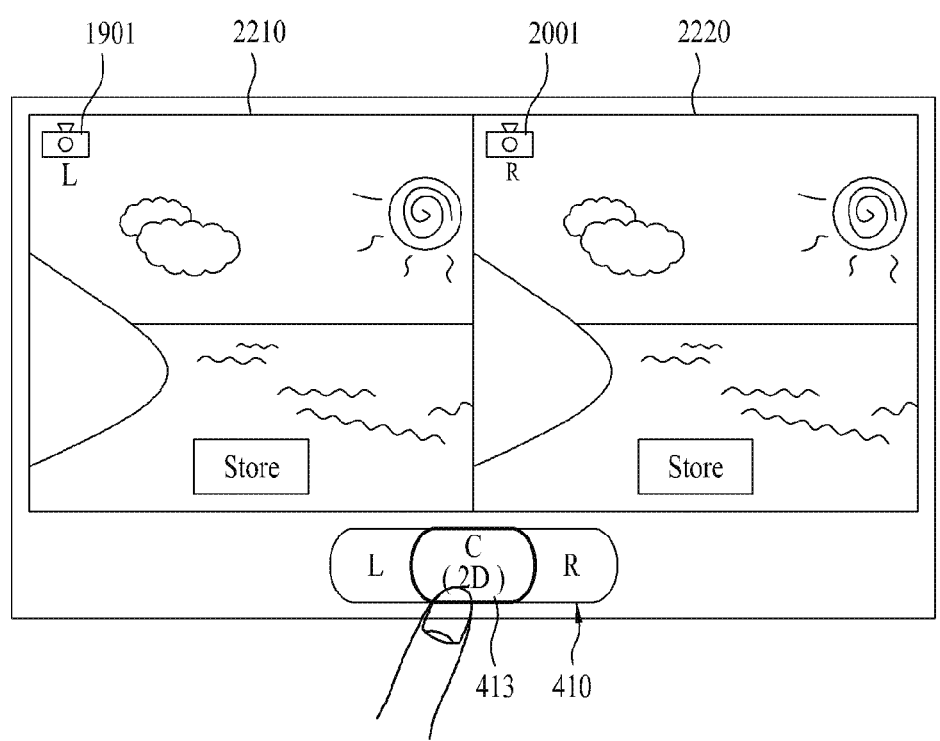
FIGS. 22A to 22C are diagrams for photographing a first image and a second image in case of receiving an input of a photograph command touch action on a common zone in a 2D photograph mode according to the present invention.
Figure 22B:
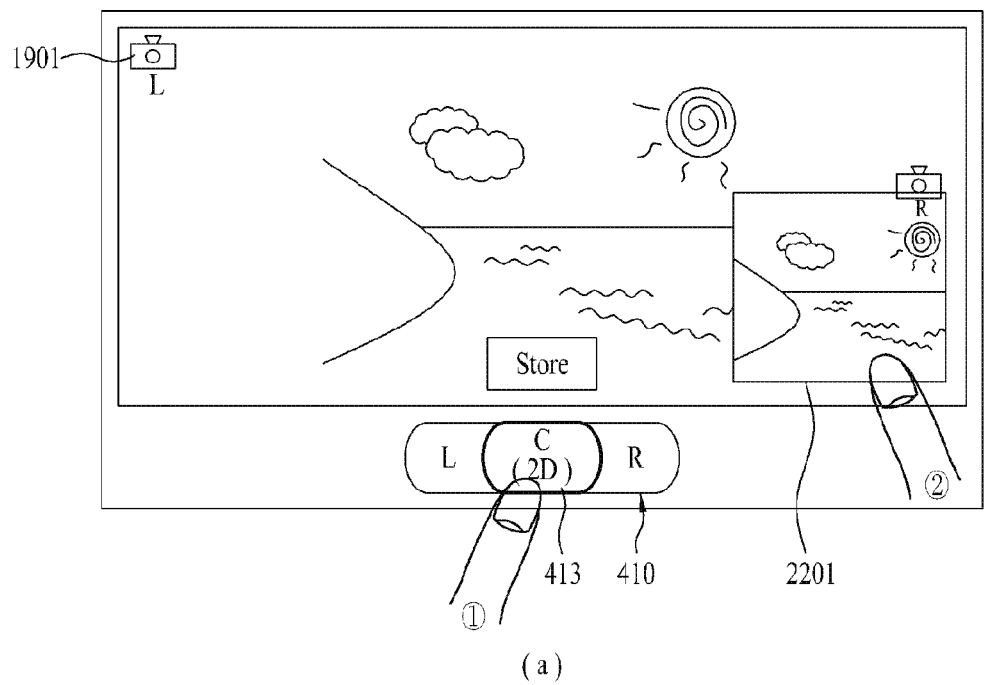
Figure 22B:
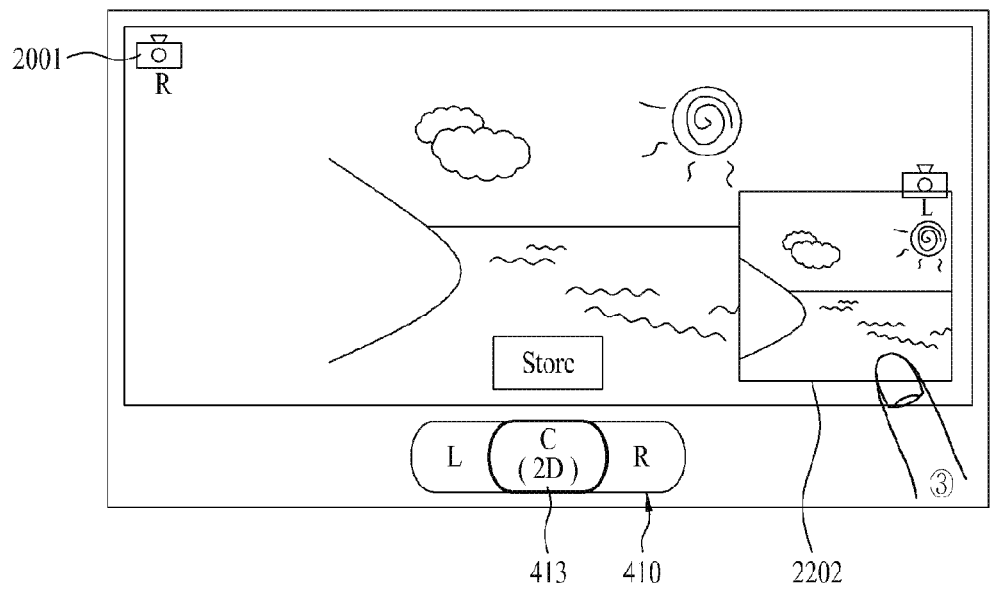
Figure 22C:
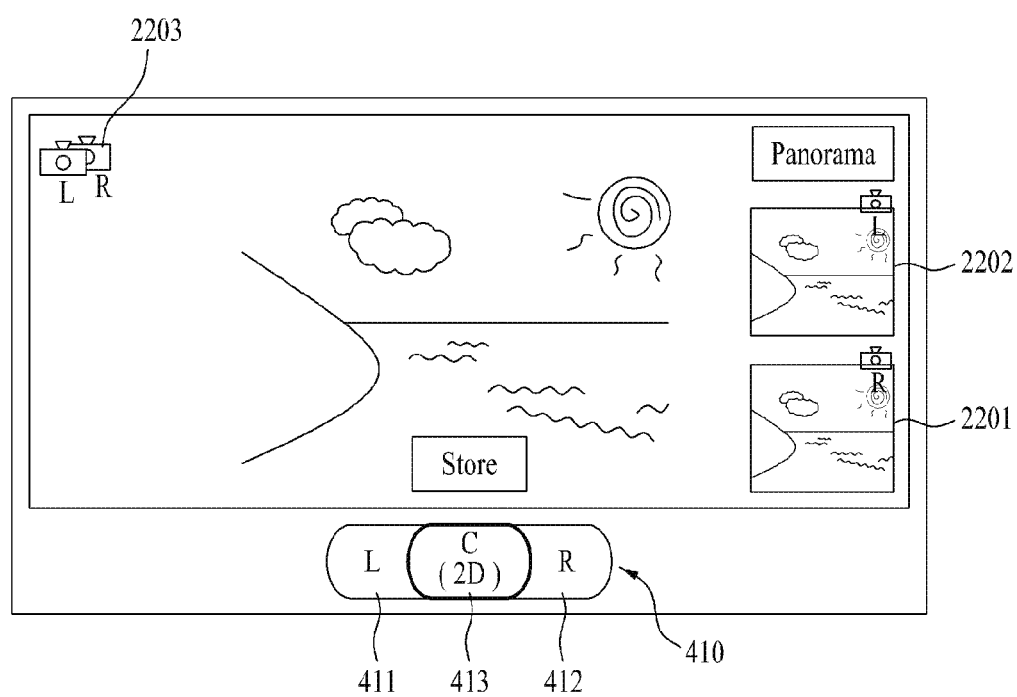

FIGS. 22A to 22C are diagrams for photographing a first image and a second image in case of receiving an input of a photograph command touch action on a common zone in a 2D photograph mode according to the present invention.

Referring to FIG. 22A and FIG. 22B, in case of receiving a photograph command touch action on the common zone 413, the mobile terminal 100 is able to photograph inputted first and second images as individual images using the first camera and the second camera, respectively.

In particular, referring to FIG. 22A, the mobile terminal 100 partitions the screen into a plurality of regions and is then able to display the photographed first image and the photographed second image on the first region 2210 and the second region 2220, respectively.

In particular, referring to FIG. 22B (a), the mobile terminal 100 is able to display the photographed second image as a subscreen 2201 on a prescribed region of the screen while displaying the photographed first image on the whole screen. If the subscreen 2201 having the second image displayed thereon is touched in FIG. 22B (a), the mobile terminal 100 is able to display the first image as a subscreen 2202 on the whole screen [FIG. 22B (b)].

In this case, an indicator 1901 indicating the image photographed via the first camera and an indicator 2001 indicating the image photographed via the second camera can be displayed on the first image and the second image, respectively.

Referring to FIG. 22C, in case of receiving a photograph command touch action on the common zone 413, the mobile terminal 100 photographs inputted first and second images using the first and second cameras, respectively, and is then able to generate a panoramic image from synthesizing the photographed first and second images together.

Subsequently, the mobile terminal 100 displays the generated panoramic image on the whole screen and is then able to further display a first subscreen 2202 having the first image displayed thereon and a second subscreen 2201 having the second image displayed thereon on a prescribed region of the screen.

In doing so, an indicator 2203 indicating the image generated from synthesizing the images inputted from the first and second cameras together is displayed within the panoramic image. And, an indicator 1901 indicating the image inputted from the first camera and an indicator 2001 indicating the image inputted from the second camera can be displayed within the first image and the second image, respectively.

Besides, the photographed first image, the photographed second image and the generated panoramic image can be displayed as thumbnails on a single screen [not shown in the drawings].

Referring now to FIG. 16, in the photographing step S1652, in case off receiving a touch & drag action on at least one of the first camera zone and the second camera zone in the camera photograph command key, the mobile terminal 100 is able to sequentially photograph the first image and the second image with a time interval corresponding to a drag distance of the touch & drag action using the first camera and the second camera under the control of the controller 180, respectively.

In particular, in case of receiving an input of a touch & drag action on the first or second camera zone, the controller 180 generates a standby photograph command signal having a time interval corresponding to the drag distance and is then able to control the first camera and the second camera to photograph the first image and the second image after predetermined standby time according to the generates standby photograph command signal, respectively.

In this case, the touch & drag action on the first or second camera zone can be inputted after the photograph command touch action on the common zone has been inputted. In case of receiving a touch & drag action on the first or second camera zone without a photograph command touch action input to the common zone, the controller 180 is able to generate both photograph command signals and standby photograph command signals for the first and second images.

The standby time per drag distance can be specified by the controller 180 or a user. For instance, the standby time can be specified to 5 seconds for the drag distance D.

In the following description, the photographing process according to the standby photograph signal is explained in detail with reference to FIGS. 23A to 23B. For clarity of the following description, assume that a photographing action is performed with the first and second images are displayed as the preview image. And, assume that the individual image processing is performed on each of the photographed first and second images.

In case that a first touch & drag action having a first drag distance and a second touch & drag action having a second drag distance are inputted to the first camera zone 411 and the second camera zone 412, respectively, FIGS. 23A to 23D show a process for performing a standby photographing on each of the first camera and the second camera to correspond to the first drag distance and the second drag distance.

Figure 23A:
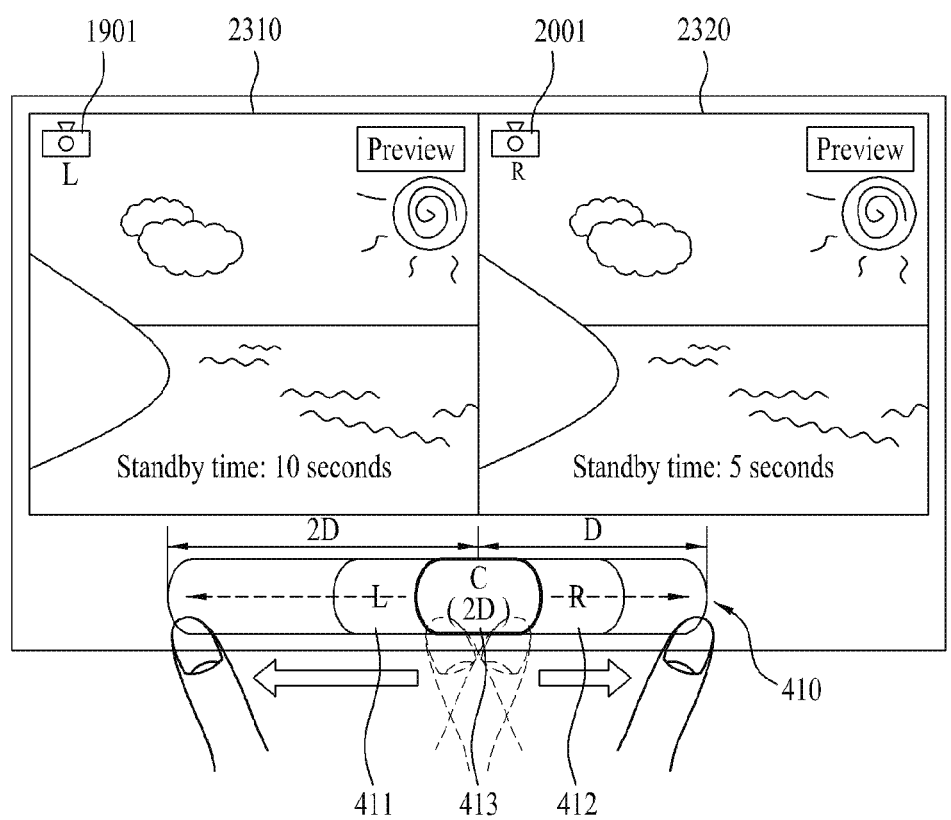
FIGS. 23A to 25B are diagrams for sequentially photographing a first image and a second image in case of receiving an input of a touch & drag action on a camera photograph key in a 2D photograph mode according to the present invention.

Referring to FIG. 23A, in case that a first touch & drag action (a first drag distance 2D) in a left direction and a second touch & drag action (a second drag distance D) in a right direction are inputted to the first camera zone 411 and the second camera zone 412, respectively, the mobile terminal 100 sets a standby time of the first camera to 10 seconds to correspond to the drag distance and also sets a standby time of the second camera to 5 seconds to correspond to the drag distance.

In doing so, both of the first and second touch & drag actions can be simultaneously inputted by a multi-touch & drag action. And, each of the first and second camera zones 411 and 412 can extend its length in the drag direction to correspond to its drag distance.

In case that the inputted first and second touch & drag actions are removed, the mobile terminal 100 is able to perform the standby photographing using each of the first and second cameras according to the set standby time (e.g., 10 seconds, 5 seconds).

Figure 23B:
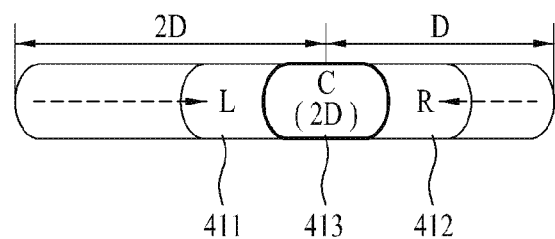
Figure 23B:
Figure 23B:
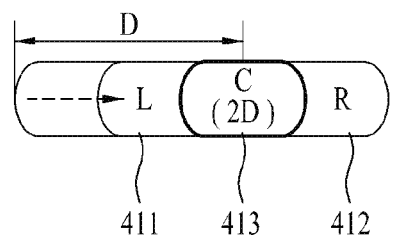
Figure 23B:
Figure 23B:
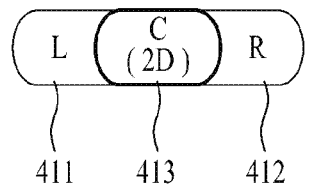

Referring to FIG. 23B, the first camera zone 411 increases its length by the drag distance 2D of the first touch & drag action and the second camera zone 412 extends its length by the drag distance D of the second touch & drag action [(a)]. If the first or second touch & drag action is removed, the corresponding length of the first or second camera zone 411 or 412 can be gradually decreased [(b), (c)]. In this case, the decreased distance can be proportional to elapse of the standby time according to the standby photographing execution.

Figure 23C:
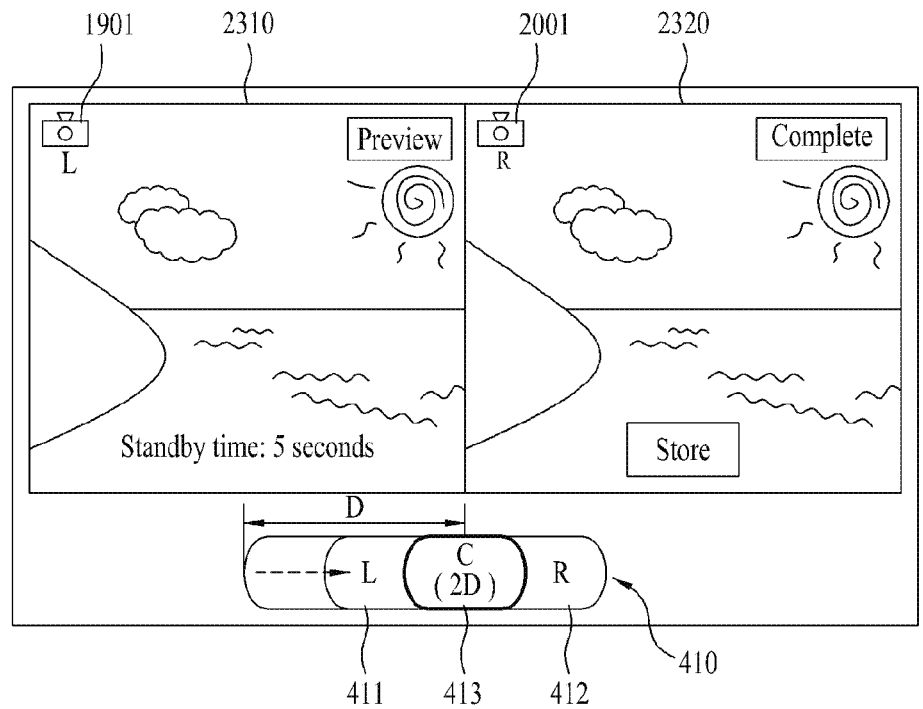

In particular, referring to FIG. 23B (b) and FIG. 23C, at the elapse point of the standby time of 5 seconds (corresponding to the drag distance D), the first camera zone 411 has a length D (decreased by D from the initial length 2D) and the second camera zone 412 can have a length 0 (decreased by D from the initial length D). In this case, since the standby time of 5 seconds still remains for the first camera, the mobile terminal 100 maintains the photographing standby. On the contrary, since the standby time does not exist for the second camera, the mobile terminal 100 is able to photograph the second image.

Figure 23D:
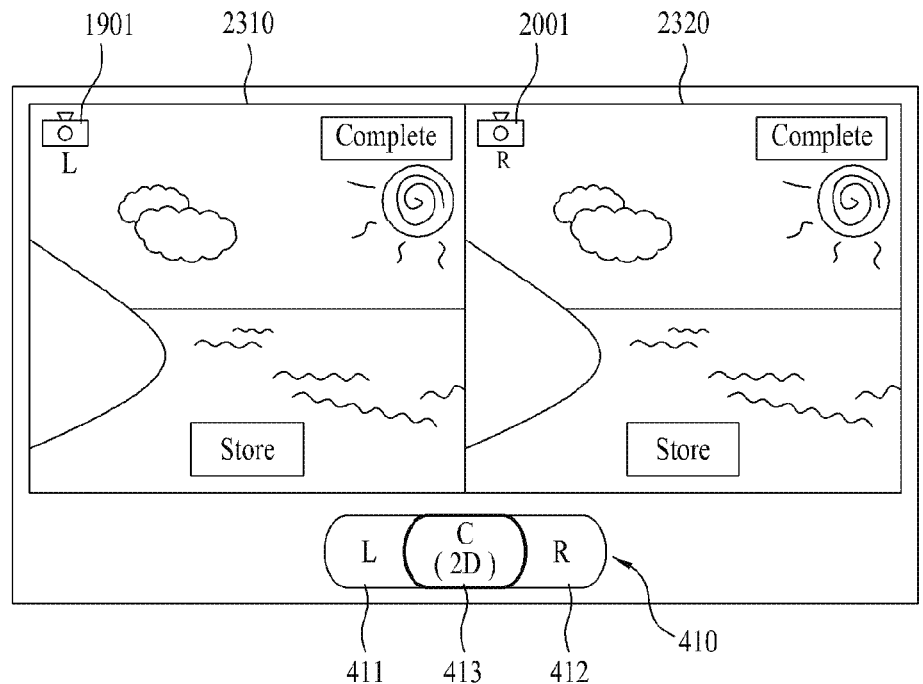

Referring to FIG. 23B (c) and FIG. 23D, at the elapse point of the standby time of 10 seconds (corresponding to the drag distance 2D), the first camera zone 411 has a length 0 (decreased by 2D from the initial length 2D). In this case, since the standby time does not exist for the first camera, the mobile terminal 100 is able to photograph the first image.

Therefore, the mobile terminal 100 photographs the second image at the point of the elapse of 5 seconds after the photograph command touch action input and is then able to photograph the first image at the point of the elapse of 10 seconds after the photograph command touch action input.

Figure 24A:
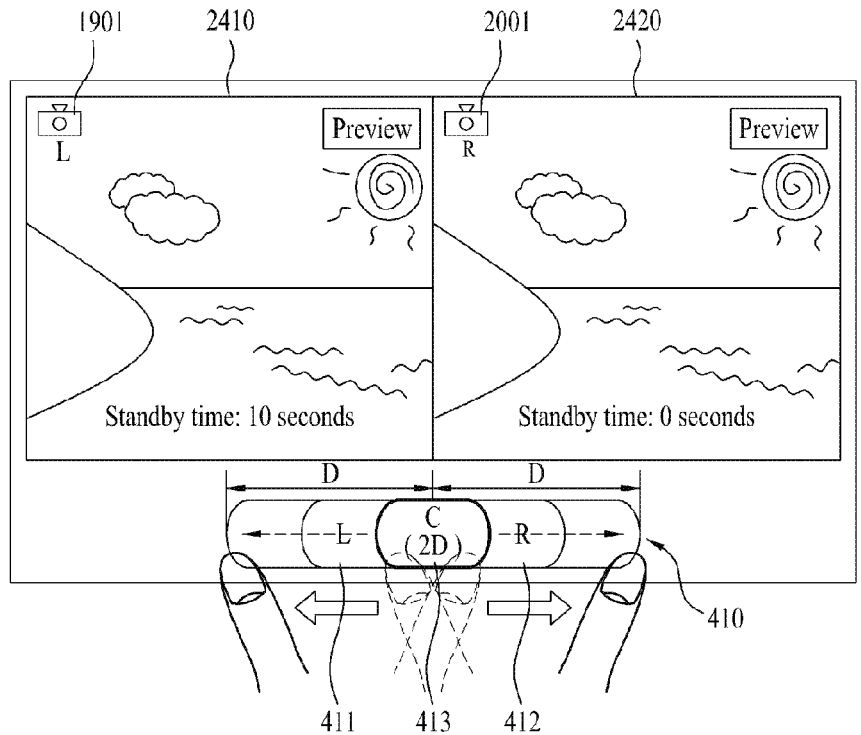
Figure 24B:
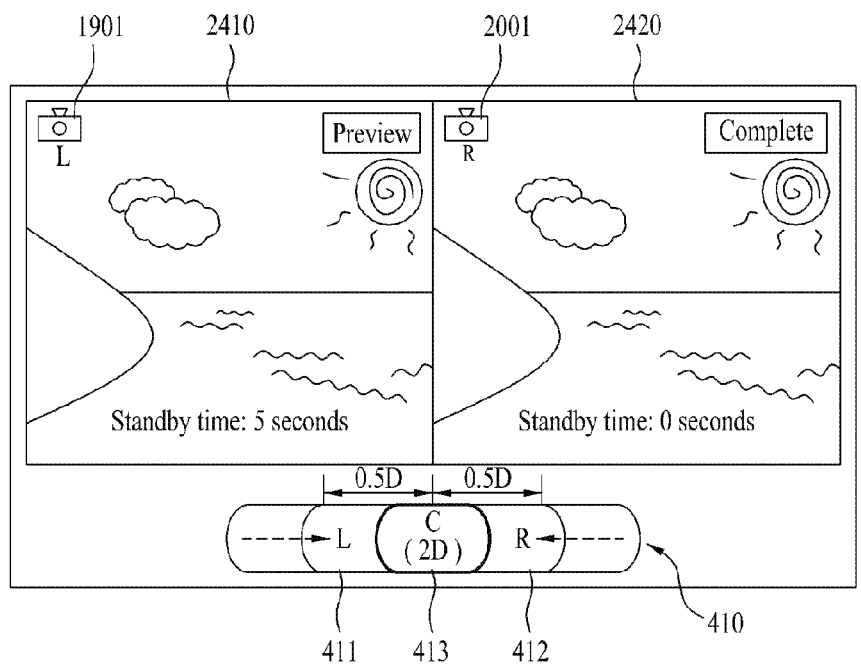

In case that a first touch & drag action having a first drag distance and a second touch & drag action having a second drag distance are inputted to the first camera zone 411 and the second camera zone 412, respectively, FIG. 24A and FIG. 24B show a process for performing a standby photographing on one of the first camera and the second camera to correspond to a sum of the first drag distance and the second drag distance.

For clarity of the following description, assume that the first camera is designated as a camera for performing the standby photographing in advance. Alternatively, as a camera for performing the standby photographing, the mobile terminal 100 is able to designate the camera of the camera zone corresponding to the longer one of the first and second drag distances or the camera of the camera zone corresponding to the first or second touch & drag action removed earlier or later than the other. Alternatively, the mobile terminal 100 is able to randomly designate the camera to perform the standby photographing irrespective of a user selection.

Referring to FIG. 24A, in case that a first touch & drag action (a first drag distance D) in a left direction and a second touch & drag action (a second drag distance D) in a right direction are inputted to the first camera zone 411 and the second camera zone 412, respectively, the mobile terminal 100 sets a standby time of the first camera to 10 seconds to correspond to a sum 2D of the drag distances and also sets an instant photograph for the second camera. In this case the first camera zone 411 and the second camera zone 412 can be extended by the first touch & drag distance D and the second touch & drag distance D in a length direction, respectively.

In case that the first and second touch & drag actions are removed, the mobile terminal 100 enables the first camera to stand by for a photographing (standby time of 10 seconds) and is able to photograph the second image using the second camera. In this case, each of the first and second camera zones 411 and 412 can be gradually decreased into its length in proportion to the standby time elapse according to the standby photographing execution for the first camera.

Referring to FIG. 24B, at a point of elapse of the standby time of 5 seconds (corresponding to the drag distance D), a length sum of the first and second camera zones 411 and 412 has a length D (reduced to D from 2D) and a photograph standby can be maintained for the first camera (standby time of 5 seconds). Moreover, at a point of elapse of the standby time of 10 seconds (corresponding to the drag distance 2D), a length sum of the first and second camera zones 411 and 412 has a length 0 (reduced by 2D from the initial length 2D). And, the mobile terminal 100 is able to photograph the first image because the standby time does not exist for the first camera.

Therefore, the mobile terminal 100 photographs the second image instantly after the photograph command touch action input and is then able to photograph the first image at the point of the elapse of 10 seconds after the photograph command touch action input.

Figure 25A:
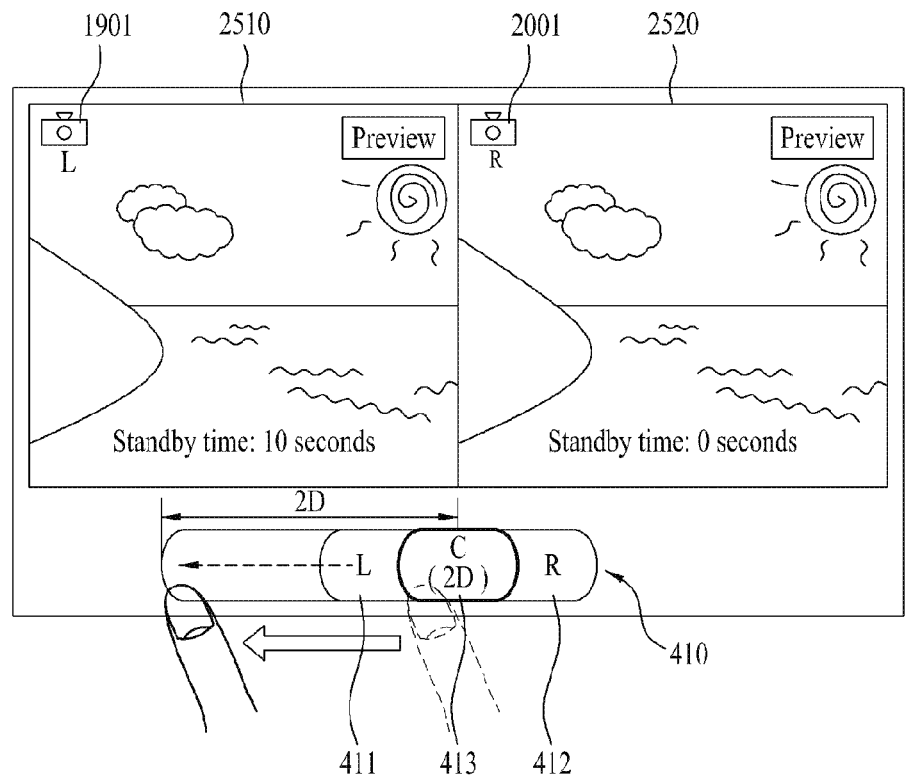
Figure 25B:
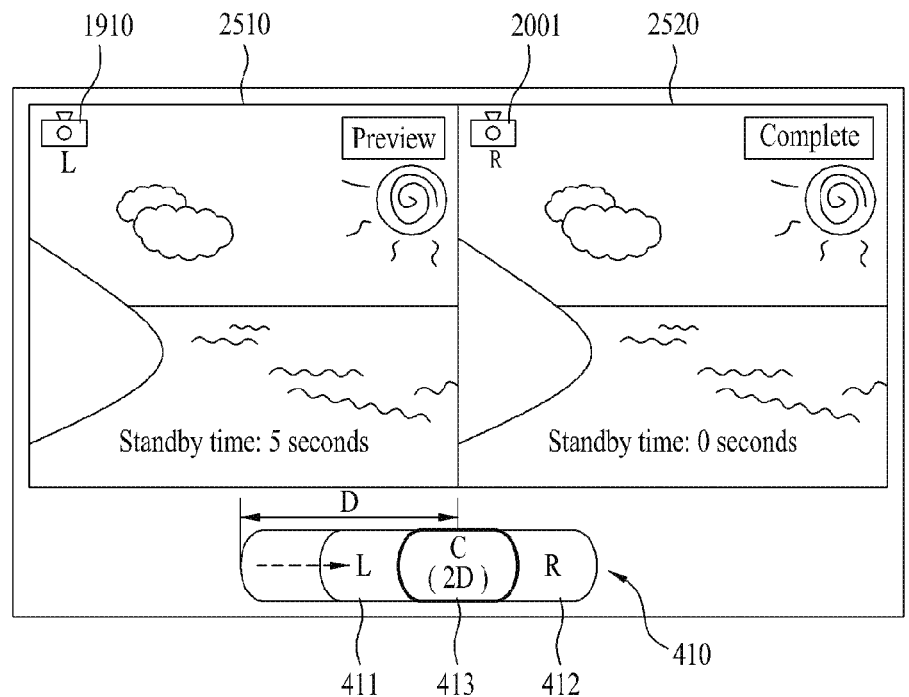

In case that a touch & drag action is inputted to the first camera zone 411, FIG. 25A and FIG. 25B show a process for performing a standby photographing on the first camera to correspond to a drag distance.

Referring to FIG. 25A, in case that a touch & drag action (drag distance 2D) in a left direction is inputted to the first camera zone 411, the mobile terminal 100 sets a standby time of the first camera to 10 seconds to correspond to the drag distance. In this case the first camera zone 411 can be extended by the touch & drag distance 2D in a length direction.

In case that the touch & drag action is removed, the mobile terminal 100 enables the first camera to stand by for a photographing (standby time of 10 seconds) and is able to photograph the second image using the second camera. In this case, the first camera zone 411 can be gradually decreased into its length in proportion to the standby time elapse according to the standby photographing execution for the first camera.

Referring to FIG. 25B, at a point of elapse of the standby time of 5 seconds (corresponding to the drag distance D), the first camera zone 411 has a length D (reduced by D from 2D) and a photograph standby can be maintained for the first camera (standby time of 5 seconds). Moreover, at a point of elapse of the standby time of 10 seconds (corresponding to the drag distance 2D), the first camera zone 411 has a length 0 (reduced by 2D from the initial length 2D). And, the mobile terminal 100 is able to photograph the first image because the standby time does not exist for the first camera.

Therefore, the mobile terminal 100 photographs the second image instantly after the photograph command touch action input and is then able to photograph the first image at the point of the elapse of 10 seconds after the photograph command touch action input.

Referring now to FIG. 16, in the photographing step S1652, in case of receiving an input of a photograph command touch action on the first camera zone, the mobile terminal 100 photographs the first image using the first camera under the control of the controller 180. In case of receiving an input of a photograph command touch action on the second camera zone, the mobile terminal 100 is able to photograph the second image using the second camera.

The individual photographing of the first and second images is explained in detail with reference to FIG. 26A and FIG. 26B as follows.

Figure 26A:
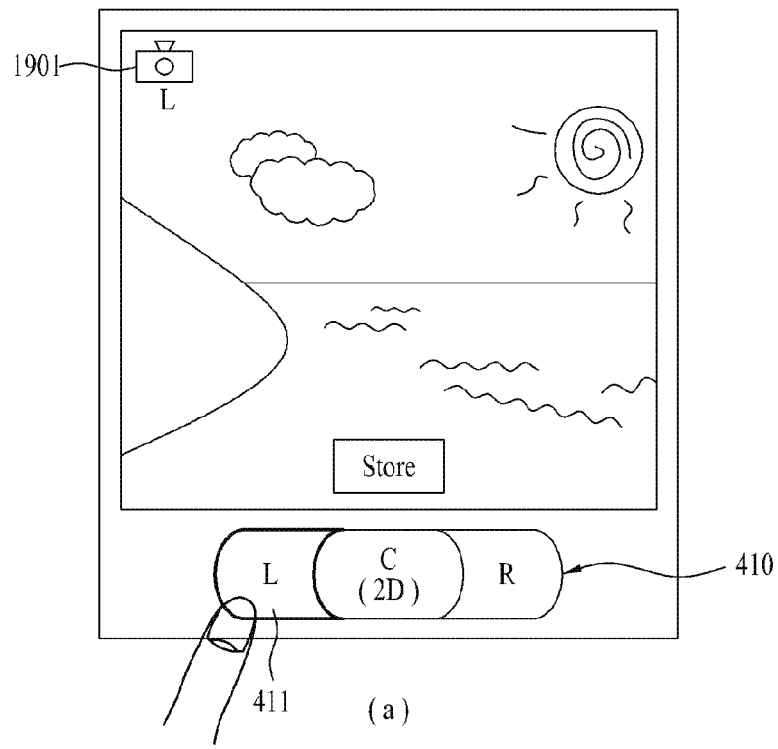
FIG. 26A and FIG. 26B are diagrams for photographing a first image or a second image in case of receiving an input of a photograph command touch action on a first or second camera zone in a 2D photograph mode according to the present invention.
Figure 26A:
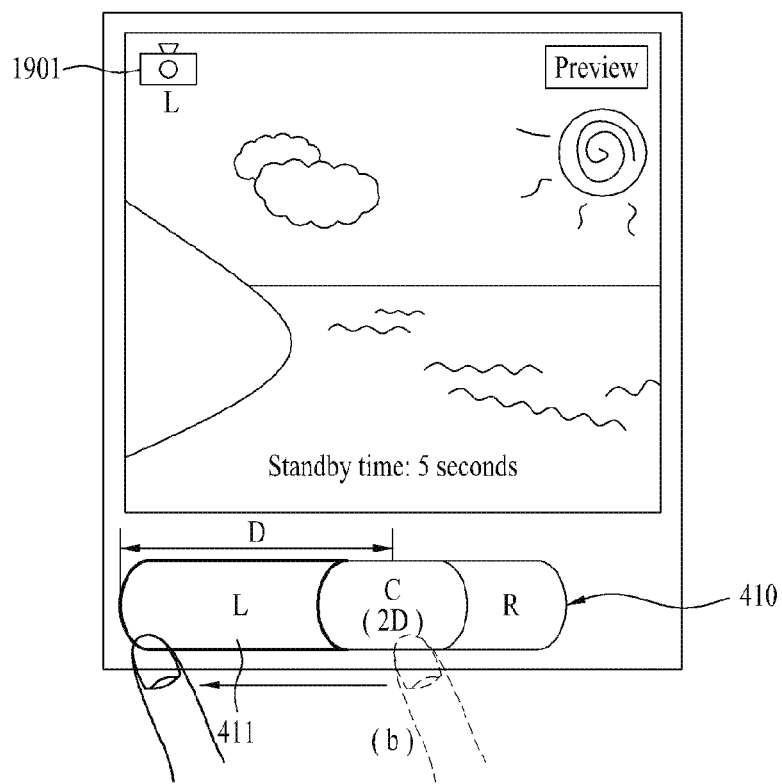
Figure 26B:
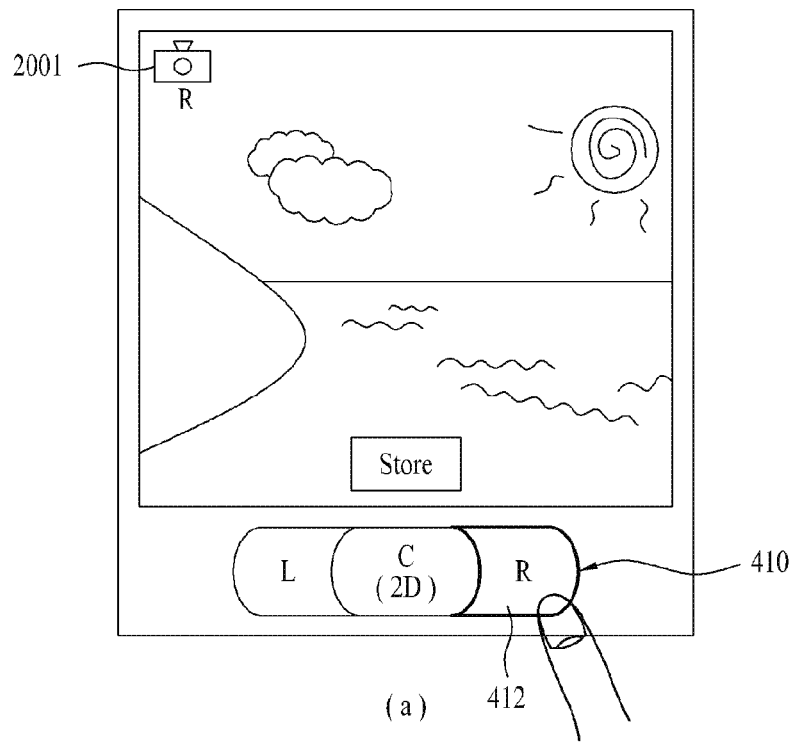
Figure 26B:
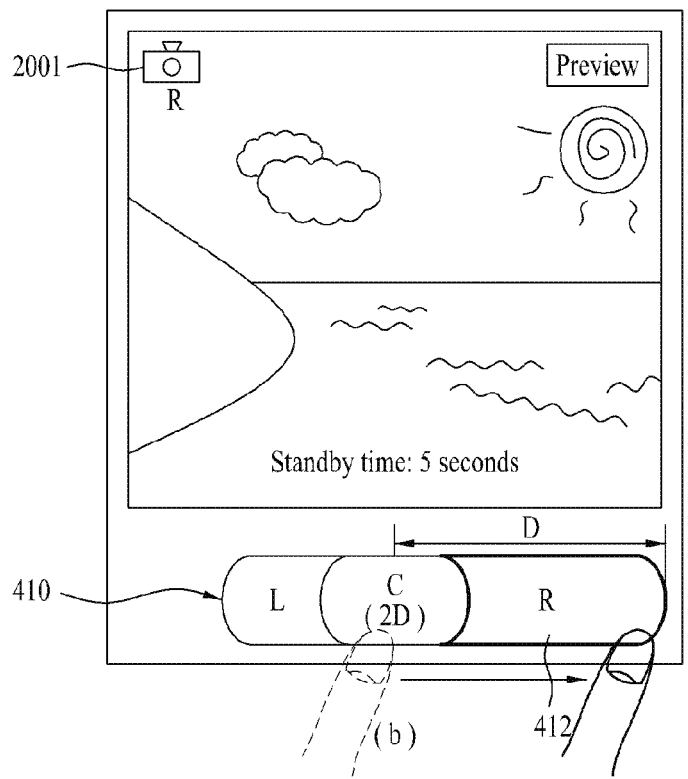

FIG. 26A and FIG. 26B are diagrams for photographing a first image or a second image in case of receiving an input of a photograph command touch action on a first or second camera zone in a 2D photograph mode according to the present invention.

Referring to FIG. 26A, while the first image inputted from the first camera is displayed as a preview image, in case of receiving a photograph command touch action on the first camera zone 411, the mobile terminal 100 is able to photograph the first image using the first camera [(a)].

Moreover, in case of receiving an input of a touch & drag action having a drag distance D (standby time of 5 seconds) together with an input of a photograph command touch action on the first camera zone 411, the mobile terminal 100 is able to set a standby photographing of a standby time of 5 seconds for the first camera and is then able to photograph the first image at a point of elapse of the standby time of 5 seconds [(b)].

Referring to FIG. 26B, while the second image inputted from the second camera is displayed as a preview image, in case of receiving a photograph command touch action on the second camera zone 412, the mobile terminal 100 is able to photograph the second image using the second camera [(a)].

Moreover, in case of receiving an input of a touch & drag action having a drag distance D (standby time of 5 seconds) together with an input of a photograph command touch action on the second camera zone 412, the mobile terminal 100 is able to set a standby photographing of a standby time of 5 seconds for the second camera and is then able to photograph the second image at a point of elapse of the standby time of 5 seconds [(b)].

In the following description, the second case (i.e., 3D photograph mode) is explained in detail with reference to the accompanying drawings.

In this case, assuming that the 3D photograph mode uses both of the first image inputted from the first camera and the second image inputted from the second camera, the mobile terminal 100 is able to activate both of the first and second cameras in the 3D photograph mode.

Referring to FIG. 16, the mobile terminal 100 displays a third image, which is generated from synthesizing a first image inputted from the first camera and a second image inputted from the second camera to together, as a preview image under the control of the controller 180 [S1661]. In this case, the displaying step S1661 can be performed using the touchscreen 151.

In this case, the third image can include a 3D image generated from synthesizing the first and second images together or can include a 3D image generated by setting left and right images to the first and second images, respectively. In particular, if the third image includes the 3D image, the mobile terminal 100 is able to activate a barrier for a 3D image display.

In the displaying step S1661, the mobile terminal 100 displays the first and second images as a preview image on corresponding regions, respectively, and is then able to synthesize the 3D image using the first and second images photographed after receiving an input of a photograph command touch action.

Alternatively, in the displaying step S1661, the mobile terminal 100 is able to selectively display at least one of the first image, the second image and the third image generated from synthesizing the first and second images together as a preview image.

In the following description, a process for displaying a first image or a third image as a preview image is explained with reference to FIGS. 27A to 28C. For instance, the first camera and the second camera can include a left camera and a right camera, respectively.

First of all, a preview image display is explained with reference to FIG. 27A and FIG. 27B.

Figure 27A:
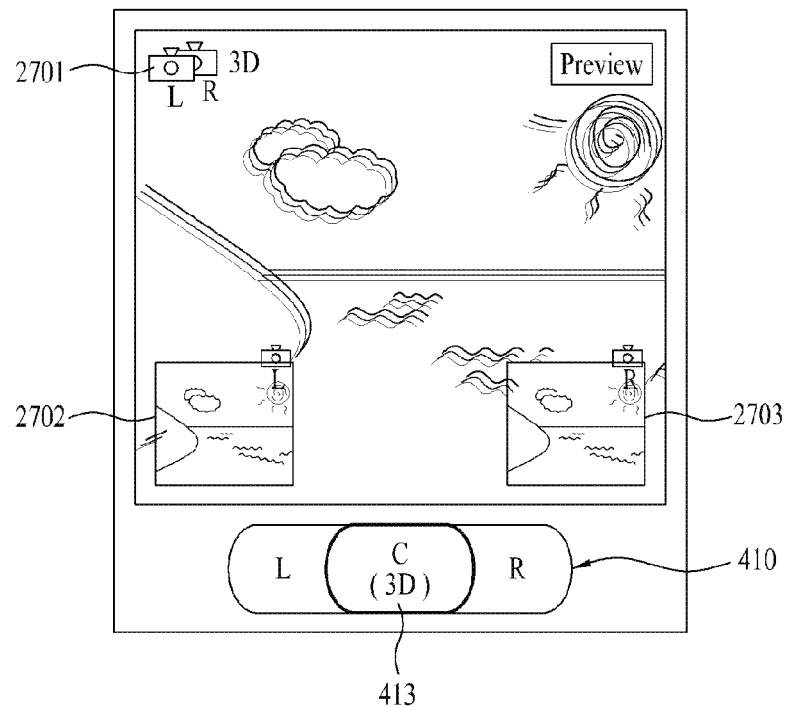
FIG. 27A and FIG. 27B are diagrams of a preview image of a 3D image generated from synthesizing first and second images respectively inputted from left and right cameras in a 3D photograph mode according to the present invention.
Figure 27B:
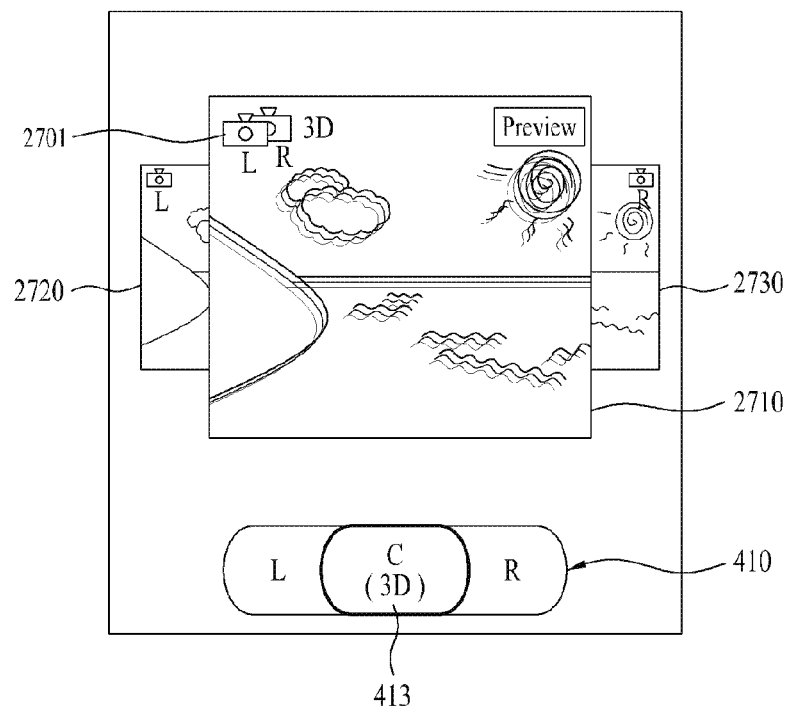

FIG. 27A and FIG. 27B are diagrams of a preview image of a 3D image generated from synthesizing first and second images respectively inputted from left and right cameras in a 3D photograph mode according to the present invention.

Referring to FIG. 27A, in case of executing a camera related application, while the mobile terminal 100 displays a third image as a preview image, the mobile terminal 100 is able to display a first sub-region 2702 for displaying a first image thereon and a second sub-region 2703 for displaying a second image thereon within the third image.

Referring to FIG. 27B, in case of executing a camera related application, while the mobile terminal 100 displays a third image as a preview image on a main screen 2710, the mobile terminal 100 is able to display a first subscreen 2720 for displaying a first image thereon and a second subscreen 2730 for displaying a second image thereon behind the main screen 2710.

In this case, each of the first and second subscreens 2720 and 2730 is relatively smaller than the main screen 2710 in size. Moreover, if the first or second subscreen 2720 or 2730 is overlapped with the main screen 2710, it may not be able to display a corresponding image part blocked by the main screen 2710.

Meanwhile, an indicator 2701, which indicates that the third image is a 3D image generated from synthesizing the first and second images together, can be displayed within the third image. Moreover, in case that the third image is displayed as a preview image, the common zone 413 can be identifiably displayed [cf. FIGS. 19A to 19O].

In the following description, a preview image switching is explained with reference to FIGS. 28A to 28O. For clarity and convenience of the following description, assume that a third image is displayed as a preview image, as shown in FIG. 27B. Of course, the following embodiment is applicable to the case shown in FIG. 27A.

Figure 28A:
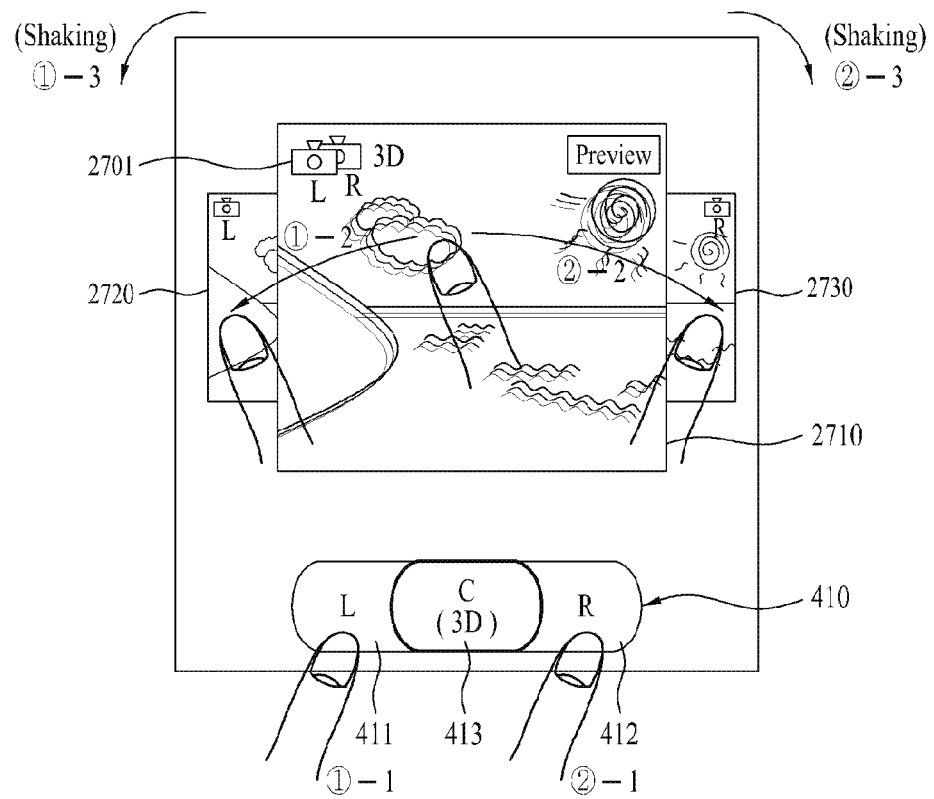
FIGS. 28A to 28C are diagrams of a preview image of a first/second image inputted from a left/right camera in a 3D photograph mode according to the present invention.
Figure 28B:
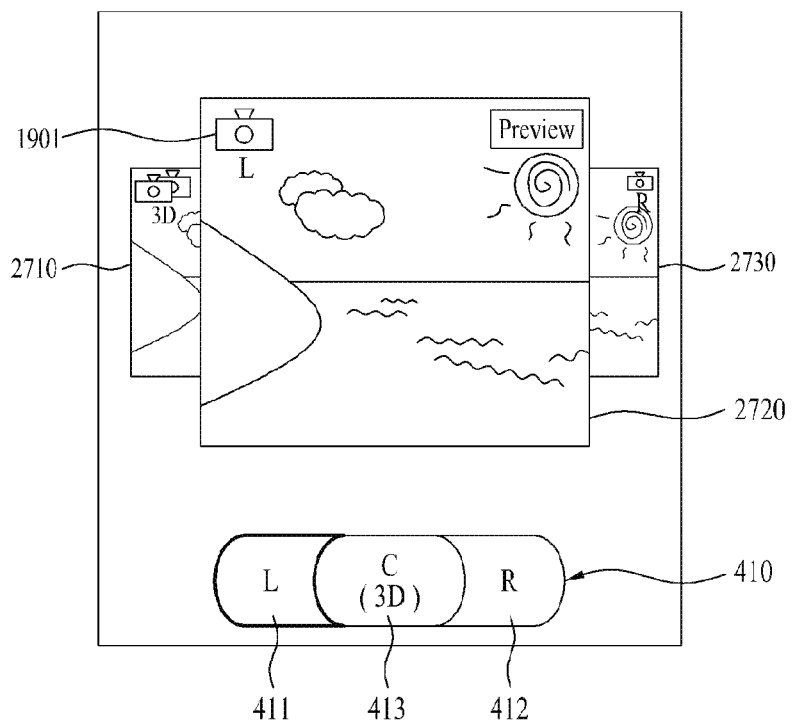
Figure 28C:
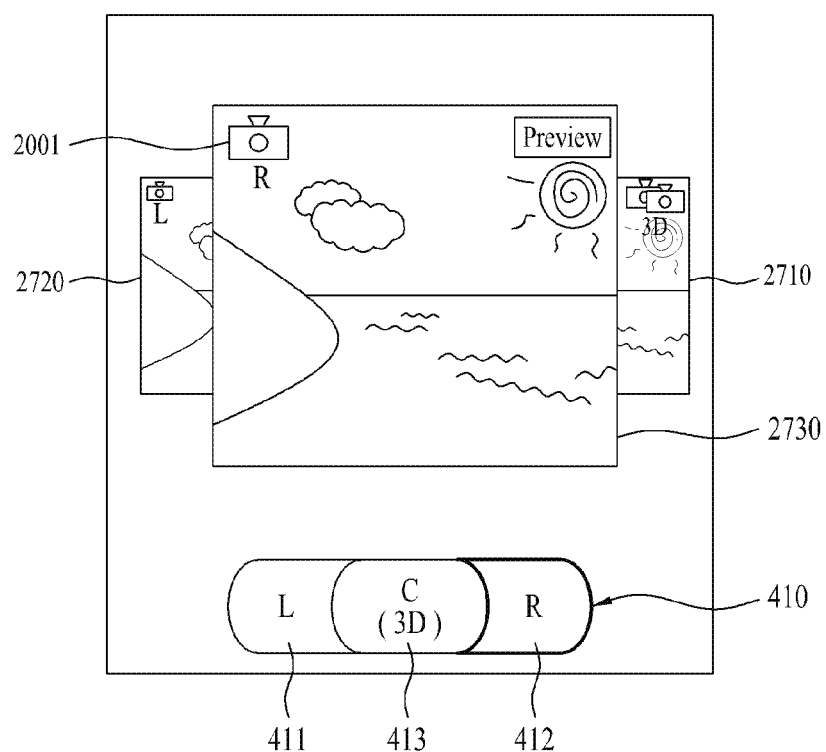

FIGS. 28A to 28O are diagrams of a preview image of a first/second image inputted from a left/right camera in a 3D photograph mode according to the present invention.

Referring to FIG. 28A, the mobile terminal 100 is able to receive an input of a preview switching command signal for switching a third image to a first or second image.

In particular, in case of receiving an input of a preview command touch action on the first camera zone 411 from a user [①-1], receiving an input of a touch & drag action or an input of a flicking action on a preview image in a left direction [①-2], or detecting a terminal shaking in the left direction [①-3], the preview switching command signal for switching the third image to the first image can be inputted.

Hence, in case of receiving the input of the preview switching command signal for switching the third image to the first image, the mobile terminal switches the preview image from the third image to the first image, displays the first image as the preview image on a main screen 2720, and is able to display a first subscreen 2710 displaying the third image thereon and a second subscreen 2730 displaying the second image thereon behind the main screen 2720.

Alternatively, in case of receiving an input of a preview command touch action on the second camera zone 412 from a user [②-1], receiving an input of a touch & drag action or an input of a flicking action on a preview image in a right direction [②-2], or detecting a terminal shaking in the right direction [②-3], the preview switching command signal for switching the third image to the second image can be inputted.

Hence, in case of receiving the input of the preview switching command signal for switching the third image to the second image, the mobile terminal switches the preview image from the third image to the second image, displays the second image as the preview image on a main screen 2730, and is also able to display a first subscreen 2710 displaying the third image thereon and a second subscreen 2720 displaying the first image thereon behind the main screen 2730.

In doing so, indicators 1901, 2001 and 2701 corresponding to the first to third images can be displayed on prescribed regions of the first to third images, respectively.

Referring now to FIG. 16, in case of receiving an input of a photograph command touch action on the common zone in the camera photograph command key, the mobile terminal 10 photographs the first image inputted from the first camera and the second image inputted from the second camera under the control of the controller 180 [S1662].

In particular, the description of the photographing step S1662 refers to that of the former photographing step S1652 in case of receiving the input of the photograph command touch action on the common zone in the 2D photograph mode.

The mobile terminal 100 performs a 3D image processing on the photographed first and second images under the control of the controller 180 [S1663].

In the 3D image processing performing step S1663, the mobile terminal 100 is able to generate a 3D image by generating the photographed first and second images together by the 3D image processing. In particular, the mobile terminal 100 sets the first image and the second image to a left eye image and a right eye image, respectively, and is then able to generate a 3D image by combining the first and second images respectively set to the left and right eye images with each other.

The mobile terminal 100 displays the generated 3D image as a photographed image under the control of the controller 180 [S1664]. In this case, the display step S1664 can be performed using a touchscreen.

In the displaying step S1664, the mobile terminal 100 is able to activate a barrier for the 3D image display.

In the displaying step S1664, the mobile terminal 100 is able to display the first image, the second image and the generated 3D image as thumbnails, respectively.

The display step S1664 is explained in detail with reference to FIG. 29A and FIG. 29B as follows.

Figure 29A:
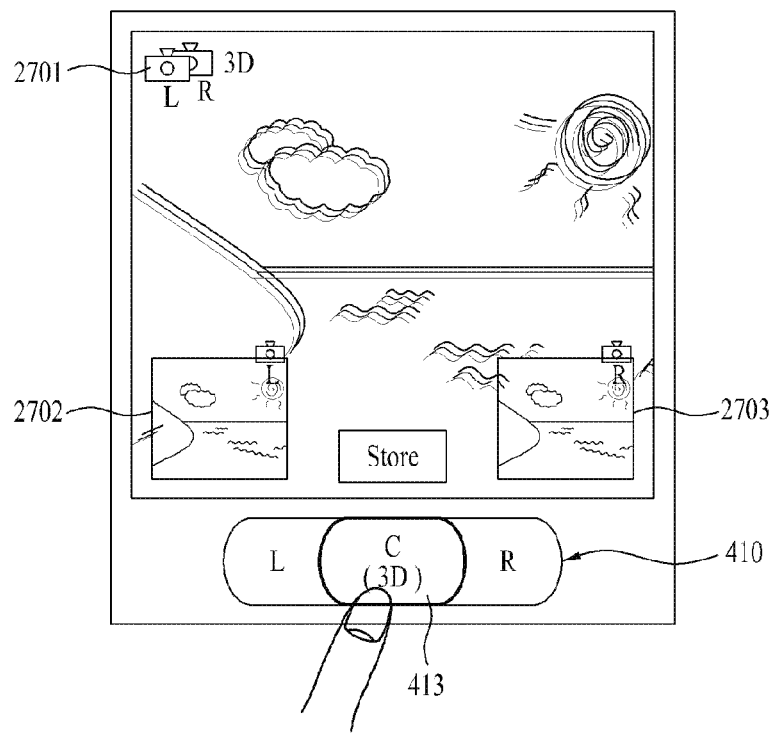
FIG. 29A and FIG. 29B are diagrams for photographing a first image and a second image in case of receiving an input of a photograph command touch action on a common zone in a 3D photograph mode according to the present invention.
Figure 29B:
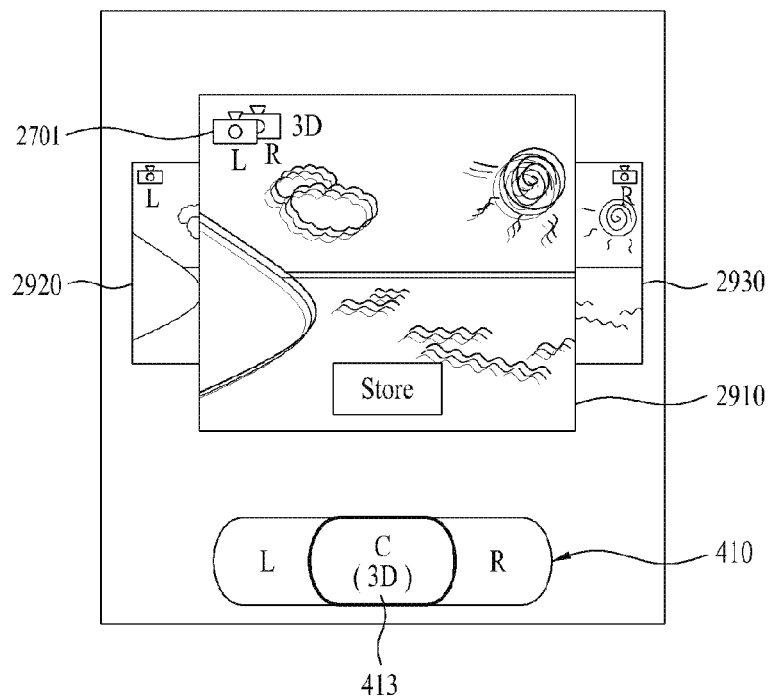

FIG. 29A and FIG. 29B are diagrams for photographing a first image and a second image in case of receiving an input of a photograph command touch action on a common zone in a 3D photograph mode according to the present invention.

Referring to FIG. 29A and FIG. 29B, in case of receiving an input of a photograph command touch action on the common zone 413, the mobile terminal 100 photographs a first image inputted using the first camera and a second image inputted using the second camera and is then able to display a 3D image generated from synthesizing the photographed first and second images together as a photographed image.

In particular, referring to FIG. 29a, while the mobile terminal 100 displays the 3D image as the photographed image on a whole screen, the mobile terminal 100 is able to display a first region 2702 displaying the first image thereon and a second region 2703 displaying the second image thereon within the 3D image.

If the first region 2702 or the second region 2703 is touched, the mobile terminal 100 displays the first or second image as the photographed image on the whole screen and is able to display the 3D image on a prescribed region of the whole screen.

In particular, referring to FIG. 29B, while the mobile terminal 100 displays the 3D image as the photographed image on a main screen 2910, the mobile terminal 100 is able to display a first subscreen 2920 displaying the first image thereon and a second subscreen 2930 displaying the second image thereon behind the main screen 2910.

In this case, an indicator 2701, which indicates that the 3D image is generated from synthesizing the first and second images photographed using the first and second cameras, can be displayed within the 3D image.

Referring now to FIG. 16, in the photographing step S1662, in case of receiving an input of a touch & drag action on at least one of the first camera zone and the second camera zone in the camera photograph command key, the mobile terminal 100 is able to sequentially photograph the first image and the second image with a time interval corresponding to a drag distance attributed to the touch & drag action using the first and second cameras under the control of the controller 180.

For this, the former description of the sequential photographing in the 2D photograph mode shall be referred to.

In the following description, a photographing process according to a standby photograph signal is explained in detail with reference to FIGS. 30A to 32B. For clarity of the following description, assume that a photographing operation is performed in the course of displaying a third image (or a 3D image) generated from synthesizing first and second images together as a preview image.

FIGS. 30A to 32B are diagrams for sequentially photographing a first image and a second image in case of receiving an input of a touch & drag action on a camera photograph key in a 3D photograph mode according to the present invention.

Figure 30A:
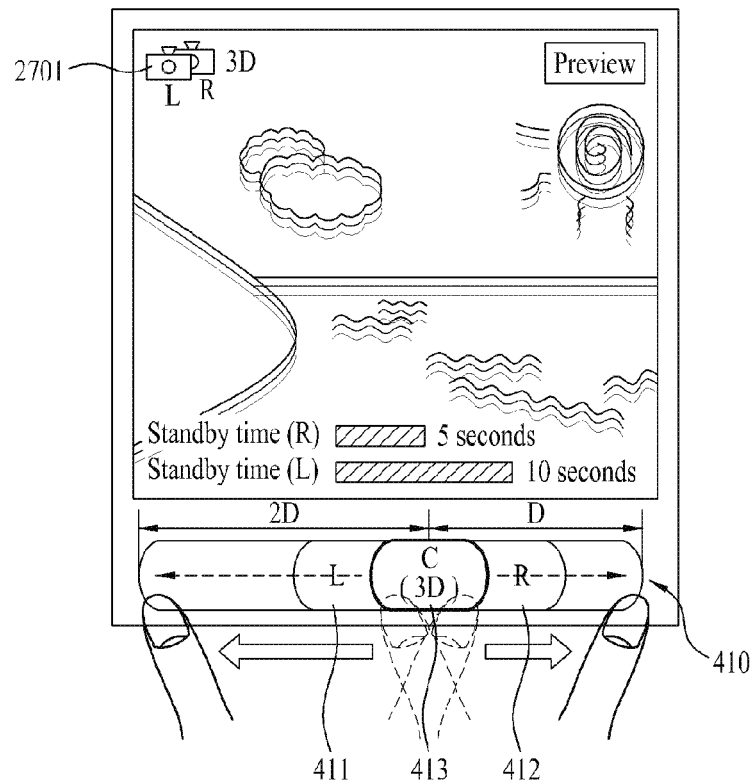
FIGS. 30A to 32B are diagrams for sequentially photographing a first image and a second image in case of receiving an input of a touch & drag action on a camera photograph key in a 3D photograph mode according to the present invention.
Figure 30B:
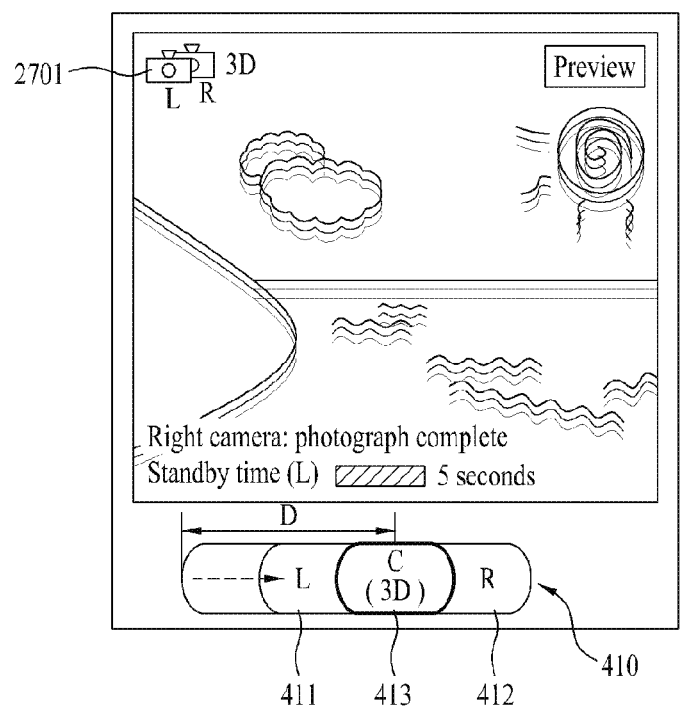
Figure 30C:
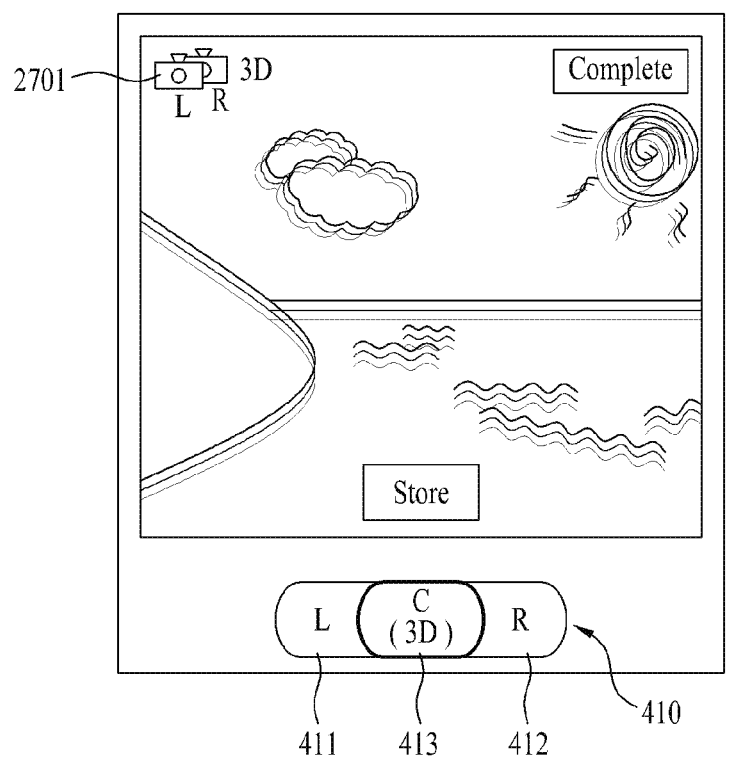

In case that a first touch & drag action having a first drag distance and a second touch & drag action having a second drag distance are inputted to the first camera zone 411 and the second camera zone 412, respectively, FIGS. 30A to 30C show a process for performing a standby photographing on each of the first camera and the second camera to correspond to the first drag distance and the second drag distance.

Referring to FIG. 30A, in case that a first touch & drag action (a first drag distance 2D) in a left direction and a second touch & drag action (a second drag distance D) in a right direction are inputted to the first camera zone 411 and the second camera zone 412, respectively, the mobile terminal 100 sets a standby time of the first camera to 10 seconds to correspond to the drag distance and also sets a standby time of the second camera to 5 seconds to correspond to the drag distance.

Referring to FIG. 30B, at the elapse point of the standby time of 5 seconds (corresponding to the drag distance D), the first camera zone 411 has a length D (decreased by D from the initial length 2D) and the second camera zone 412 can have a length 0 (decreased by D from the initial length D). In this case, since the standby time of 5 seconds still remains for the first camera, the mobile terminal 100 maintains the photographing standby. On the contrary, since the standby time does not exist for the second camera, the mobile terminal 100 is able to photograph the second image.

Referring to FIG. 30C, at the elapse point of the standby time of 10 seconds (corresponding to the drag distance 2D), the first camera zone 411 has a length 0 (decreased by 2D from the initial length 2D). In this case, since the standby time does not exist for the first camera, the mobile terminal 100 is able to photograph the first image.

Figure 31A:
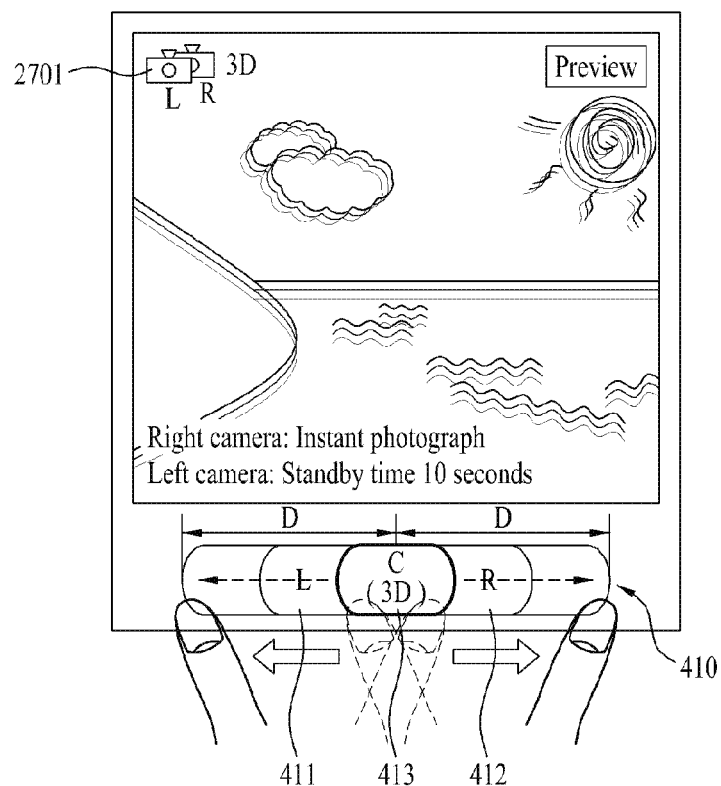
Figure 31B:
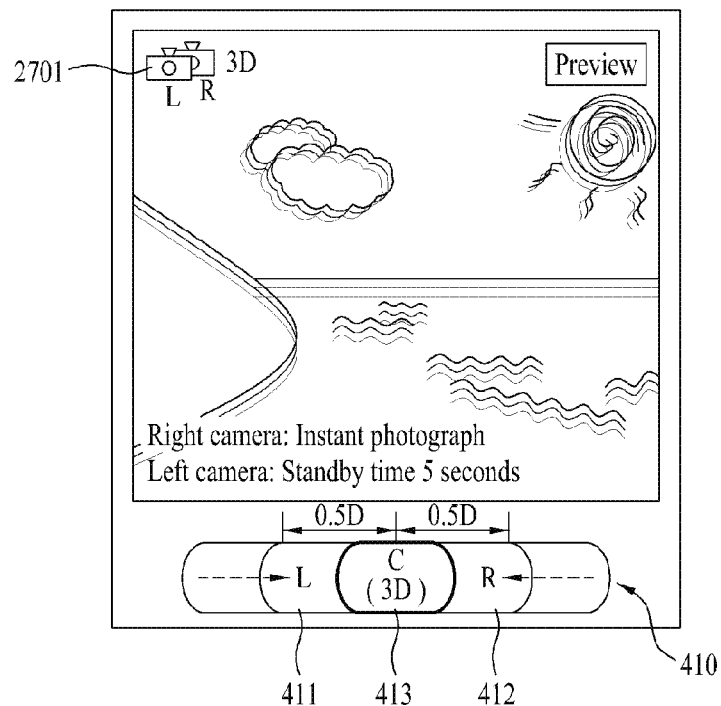

In case that a first touch & drag action having a first drag distance and a second touch & drag action having a second drag distance are inputted to the first camera zone 411 and the second camera zone 412, respectively, FIG. 31A and FIG. 31B show a process for performing a standby photographing on one of the first camera and the second camera to correspond to a sum of the first drag distance and the second drag distance.

For clarity of the following description, assume that the first camera is designated as a camera for performing the standby photographing in advance.

Referring to FIG. 31A, in case that a first touch & drag action (a first drag distance D) in a left direction and a second touch & drag action (a second drag distance D) in a right direction are inputted to the first camera zone 411 and the second camera zone 412, respectively, the mobile terminal 100 sets a standby time of the first camera to 10 seconds to correspond to a sum 2D of the drag distances and also sets an instant photograph for the second camera.

Referring to FIG. 31B, at a point of elapse of the standby time of 5 seconds (corresponding to the drag distance D), a length sum of the first and second camera zones 411 and 412 has a length D (reduced by D from the initial length 2D) and a photograph standby can be maintained for the first camera (standby time of 5 seconds). Moreover, at a point of elapse of the standby time of 10 seconds (corresponding to the drag distance 2D), a length sum of the first and second camera zones 411 and 412 has a length 0 (reduced by 2D from the initial length 2D). And, the mobile terminal 100 is able to photograph the first image because the standby time does not exist for the first camera.

Figure 32A:
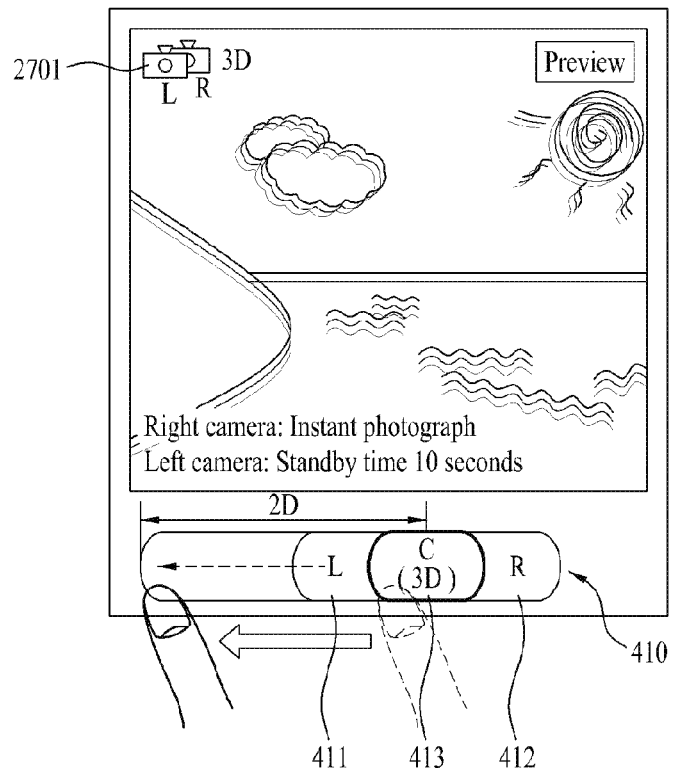
Figure 32B:
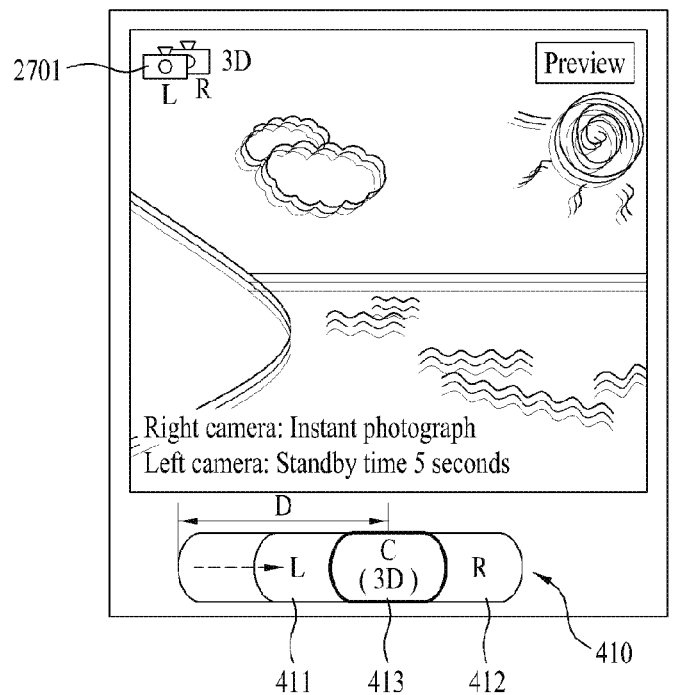

In case that a touch & drag action is inputted to the first camera zone 411, FIG. 32A and FIG. 32B show a process for performing a standby photographing on the first camera to correspond to a drag distance.

Referring to FIG. 32A, in case that a touch & drag action (drag distance 2D) in a left direction is inputted to the first camera zone 411, the mobile terminal 100 sets a standby time of the first camera to 10 seconds to correspond to the drag distance.

Referring to FIG. 32B, at a point of elapse of the standby time of 5 seconds (corresponding to the drag distance D), the first camera zone 411 has a length D (reduced by D from the initial length 2D) and a photograph standby can be maintained for the first camera (standby time of 5 seconds). Moreover, at a point of elapse of the standby time of 10 seconds (corresponding to the drag distance 2D), the first camera zone 411 has a length 0 (reduced by 2D from the initial length 2D). And, the mobile terminal 100 is able to photograph the first image because the standby time does not exist for the first camera.

Referring now to FIG. 16, the mobile terminal 100 stores the first and second images photographed in the photographing step S1652/S1662, the panoramic/3D image processed in the processing step S1653/S1663 or the photographed image displayed in the displaying step S1654/S1664 in the memory 160 under the control of the controller 180 [S1670].

Regarding the storing step S1670, the description of the former storing step S390 of the first embodiment shall be referred to.

According to the present invention, in case of receiving an input of a photograph command touch action during a first time on the first camera zone 411 or the second camera zone 412, the mobile terminal 100 is able to consecutively photograph a first or second image the number of times corresponding to the first time. In this case, in case of further receiving an input of a touch & drag action with a first distance on the first camera zone 411 or the second camera zone 412, the mobile terminal 100 is able to consecutively photograph the first or second image the number of times corresponding to the first time within a time interval corresponding to the first distance.

Moreover, in case of receiving an input of a photograph command touch action during a first time on the common zone 413, the mobile terminal 100 is able to consecutively photograph both first and second images the number of times corresponding to the first time. In this case, in case of further receiving an input of a touch & drag action with a first distance on the common zone 413, the mobile terminal 100 is able to consecutively photograph both of the first and second images the number of times corresponding to the first time within a time interval corresponding to the first distance.

In the following description, various configurations for loading a plurality of cameras on the mobile terminal are explained with reference to FIGS. 33 to 38. In particular, in order to photograph a plurality of images for generating a 3D image (cf. FIG. 2C), a panoramic image (cf. FIG. 2D) or a high-resolution image, a structure of changing a photographing direction of each of a plurality of the cameras is examined as follows.

For clarity of the following description, assume that a plurality of the cameras include a first camera 121-1 and a second camera 121-2. And, assume that the mobile terminal 100 can be divided into a first body 100A and a second body 100B.

FIGS. 33 to 38 are diagrams of various configurations of a mobile terminal provided with a first camera and a second camera according to the present invention.

Figure 33:
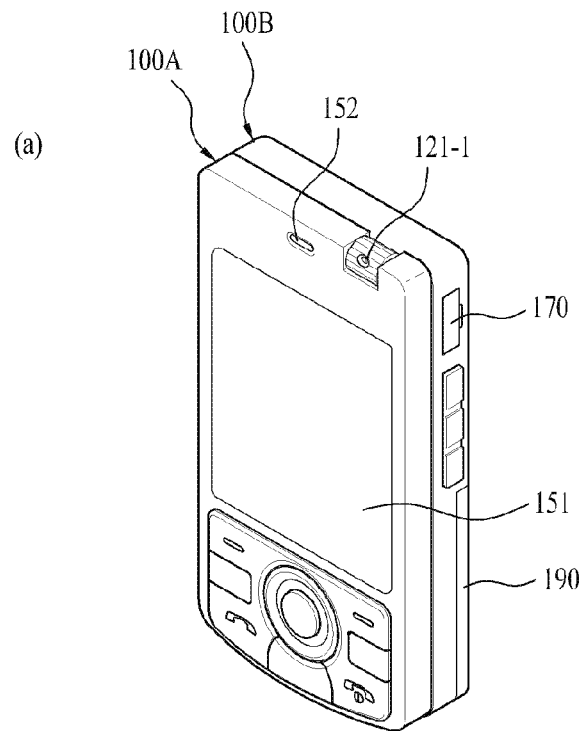
FIGS. 33 to 38 are diagrams of various configurations of a mobile terminal provided with a first camera and a second camera according to the present invention.
Figure 33:
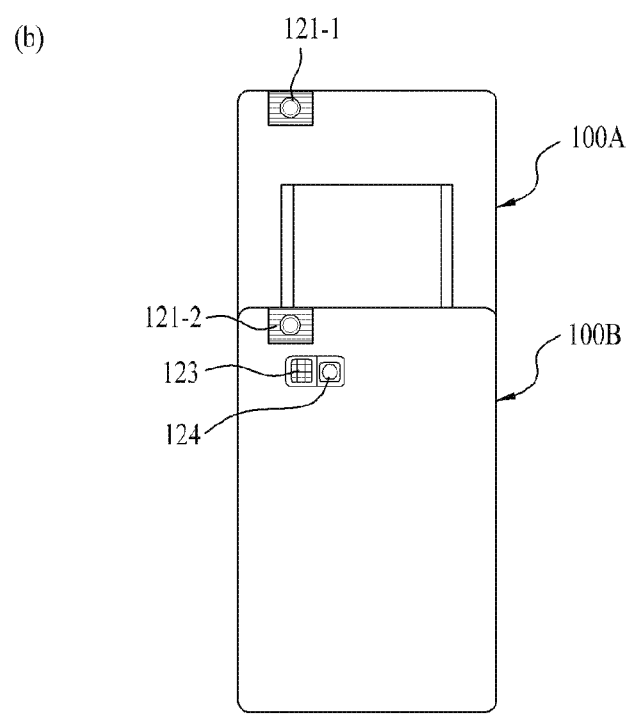

FIG. 33 (a) is a front perspective diagram of a mobile terminal in a closed configuration. And, FIG. 33 (b) is a diagram of a backside of the mobile terminal in an open configuration.

Referring to FIG. 33, the mobile terminal includes two bodies 100A and 100B slidably assembled together. In particular, if the first body 100A is positioned to be overlapped with the second body 100B, it can be called a closed configuration [a]. If the first body 100A is positioned to expose at least one portion of the second body 100B, it can be called an open configuration [b].

If the mobile terminal shown in FIG. 33 is in the closed configuration, it normally works in a standby photograph mode that can be canceled by a user's manipulation. If the mobile terminal shown in FIG. 33 is in the open configuration, it normally works in a call photograph mode that can be switched to the standby photograph mode according to a user's manipulation or an elapse of a prescribed time.

A display unit 151, an audio output module 152 and a first camera 121-1 can be provided to the first body 100A. If a touchpad is provided to the display unit 151 in a manner of being overlapped as a layer structure, the display unit 151 can work as a touchscreen. Therefore, information can be inputted by a user's touch.

An interface unit 170 is provided to a lateral side of the second body 100B. And, a power supply unit 190 can be provided to a backside of the second body 100B to supply a power to the mobile terminal. In particular, the power supply unit 190 is provided with a separate cover and can be configured in a manner of being loaded in the second body. And, the power supply unit 190 can be detachably provided as a rechargeable battery to the second body 100B for an electric charging for example.

According to the embodiment shown in FIG. 33, the first camera 121-1 can be rotatably provided to the first body 100A. And, the second camera 121-2 can be rotatably provided to the second body 100B.

In particular, the first camera 121-1 can be rotatably provided to a top side of the first body 100A (particularly, one end located at the top side of the display unit 151). And, the second camera 121-2 can be rotatably provided to a top side of the second body 100B.

As the first camera 121-1 and the second camera 121-2 are rotatably provided, a subject located in rear of the mobile terminal can be photographed via each of the first and second cameras 121-1 and 121-2. Therefore, it is able to generate a 3D image, a panoramic image or a high-resolution image using the photographed images. So to speak, if the first and second cameras 121-1 and 121-2 are rotated to face a rear direction of the mobile terminal, it is able to photograph a plurality of images to generate a 3D image, a panoramic image or a high-resolution image.

According to the embodiment shown in FIG. 33, since the first body 100A and the second body 100B are slidably assembled together, it is able to adjust a stereoscopic effect by controlling a distance between the cameras in accordance with a slide distance.

In other words, since a space between the first and second cameras 121-1 and 121-2 and photographing directions of the first and second cameras 121-1 and 121-2 can be simultaneously changed, it is able to generate various 3D images, panoramic images or high-resolution images.

Although the loaded positions of the first and second cameras 121-1 and 121-2 and the spaced distance between the first and second cameras 121-1 and 121-2 are fixed, the spaced distance is substantially adjusted by changing a turning direction of the first camera 121-1 for photographing a left eye image and a turning direction of the second camera 121-2 for photographing a right eye image. Therefore, the stereoscopic effect can be controlled.

Figure 34:
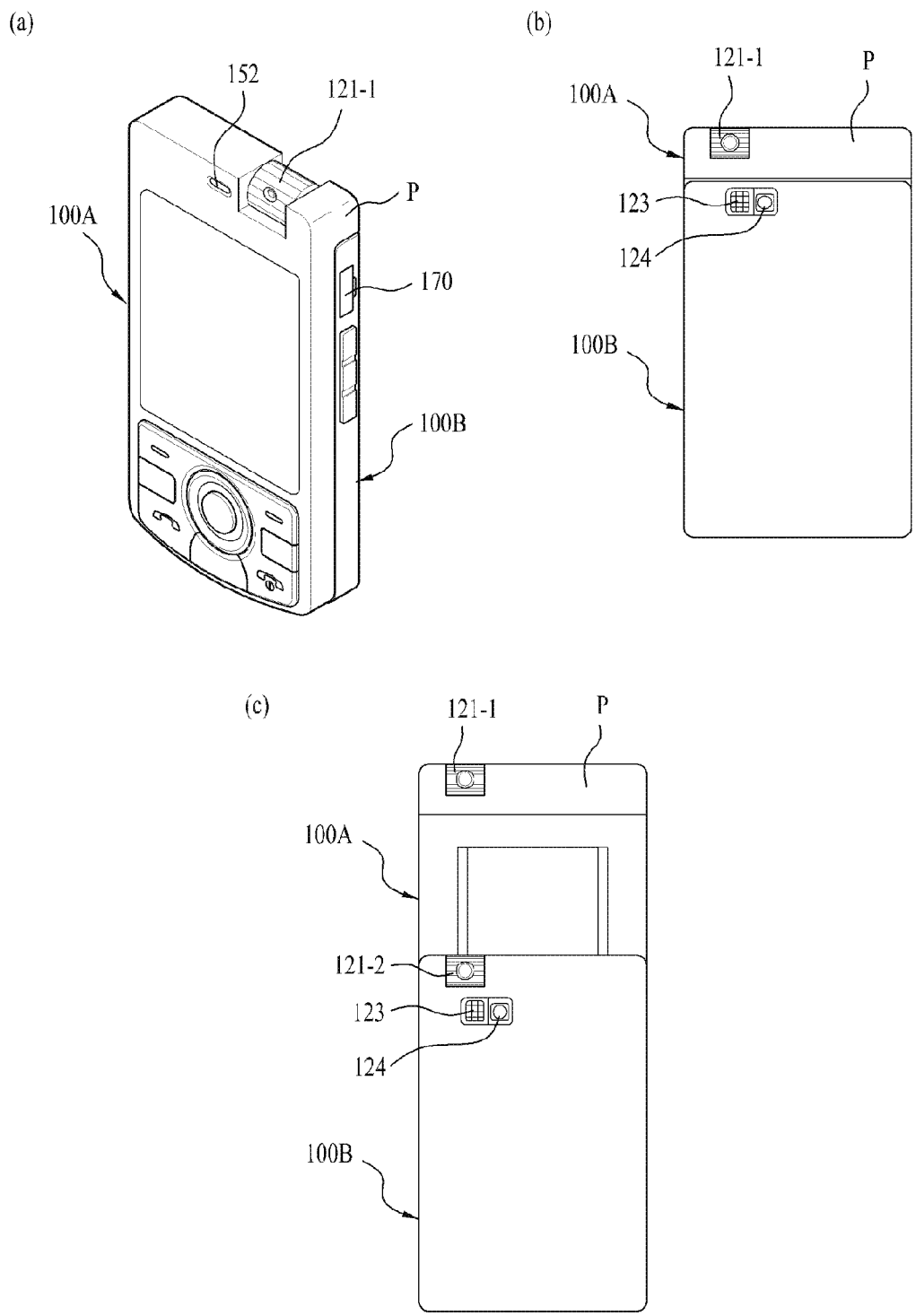

FIG. 34 (a) is a front perspective diagram of a mobile terminal in a closed configuration. FIG. 34 (b) is a diagram of a backside of the mobile terminal in a closed configuration. And, FIG. 34 (c) is a diagram of the backside of the mobile terminal in an open configuration.

Referring to FIG. 34, the first body 100A includes a protrusion p configured to protruding from a top side of one end of the first body 100A in a rear direction. And, the first camera 121-1 can be rotatably provided to the protrusion p. Therefore, even if the first body 100A and the second body 100B are in a closed configuration, the first camera 121-1 can be externally exposed.

In order for the first camera 121-1 to be externally exposed despite that the first body 100A and the second body 100B are in the closed configuration, the first body 100A is configured longer than the second body 100B. And, the protrusion p is configured in a manner that the portion, to which the first camera 121-1 is provided, can protrude in the rear direction. Therefore, referring to FIG. 34 (b), even if the first body 100A and the second body 100B are in the closed configuration, the subject located in the same direction can be photographed via each of the first and second cameras 121-1 and 121-2.

Of course, in order to increase the stereoscopic effect of a 3D image, referring to FIG. 34 (c), the first body 100A and the second body 100B are withdrawn into the open configuration to increase the spaced distance between the first and second cameras 121-1 and 121-2. And, a left eye image and a right image can be photographed.

Moreover, if the first camera 121-1 is turned in the front direction of the mobile terminal, a normal self-photographing is possible while a user is observing the display unit 151. If both of the first and second cameras 121-1 and 121-2 are turned in the rear direction of the mobile terminal, a plurality of images can be photographed to generate a 3D image or a panoramic image.

Figure 35:
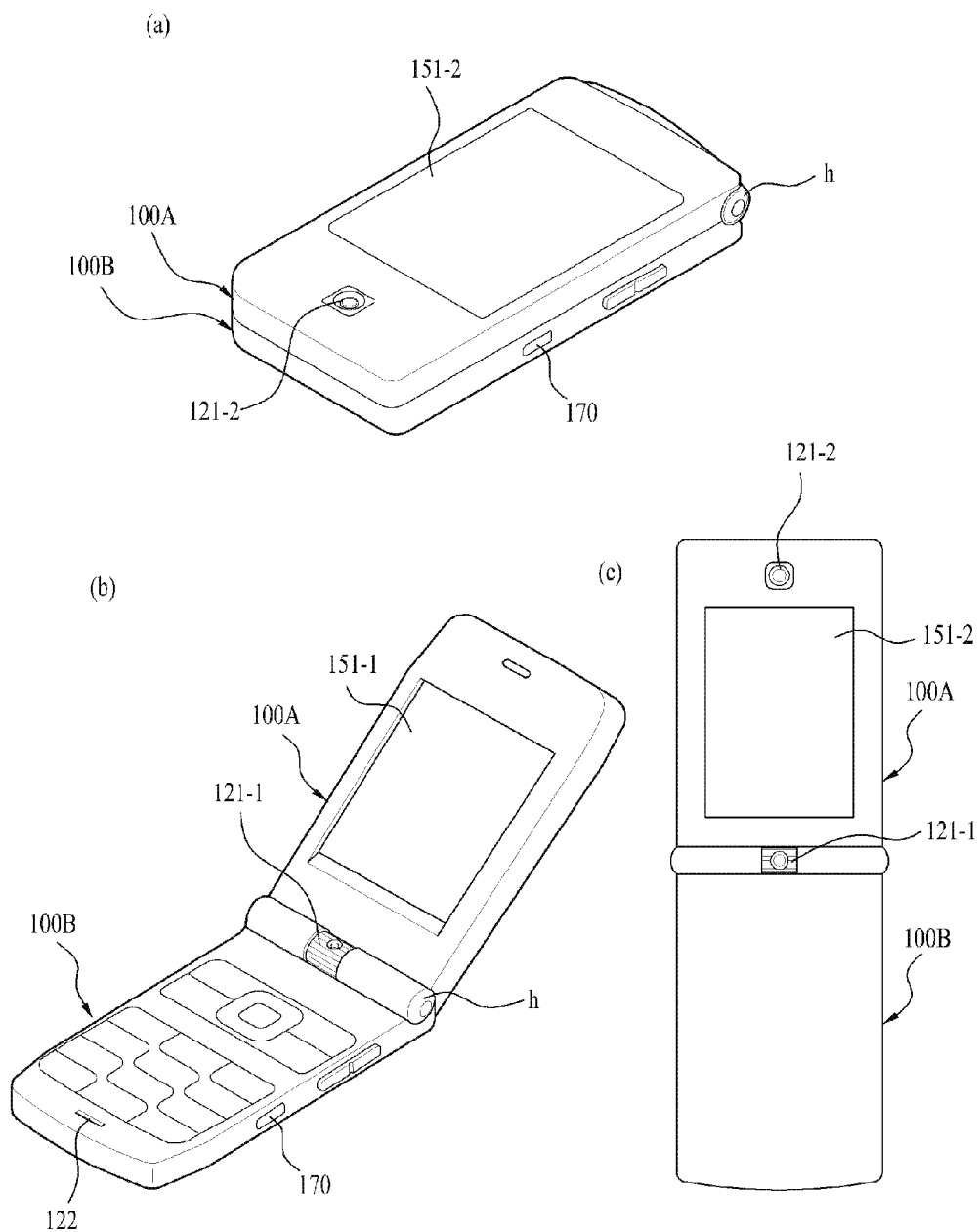

FIG. 35 (a) is a front perspective diagram of a mobile terminal in a closed configuration. FIG. 35 (b) is a front perspective diagram of the mobile terminal in an open configuration. And, FIG. 35 (c) is a diagram of a backside of the mobile terminal in an open configuration.

Referring to FIG. 35, a mobile terminal is configured in a manner that one of the first body 100A and the second body 100B is folded or unfolded against the other. In this case, a folded configuration can be called a closed configuration, while an unfolded configuration can be called an open configuration.

The first camera 121-1 is rotatably installed to a hinge part h that foldably connects the first body 100A and the second body 100B together. And, the second camera 121-2 can be installed in a manner of being fixed to a backside of a face of the first body 100A having a first display unit 151-1 installed thereto, i.e., to a face having a second display unit 151-2 (e.g., if the second display unit is installed) installed thereto.

Therefore, in the unfolded configuration shown in FIG. 35 (c), it is able to photograph the same subject using each of the first and second cameras 121-1 and 121-2. Of course, the same subject can be photographed via each of the first and second cameras 121-1 and 121-2 in a manner of turning the second camera 121-2 to face the same direction of the first camera 121-1 in the folded configuration [cf. FIG. 35 (a)]. And, the photographed images are usable to generate a 3D image, a panoramic image or the like.

Since the second camera 121-2 is rotatably configured to have a variable photographing direction unlike the first camera 121-1, the photographing direction is changeable for a selective generation of a panoramic image or a 3D image. In particular, for the panoramic or 3D image generation, it is unnecessary to change the photographing directions of all of the provided cameras.

Figure 36:
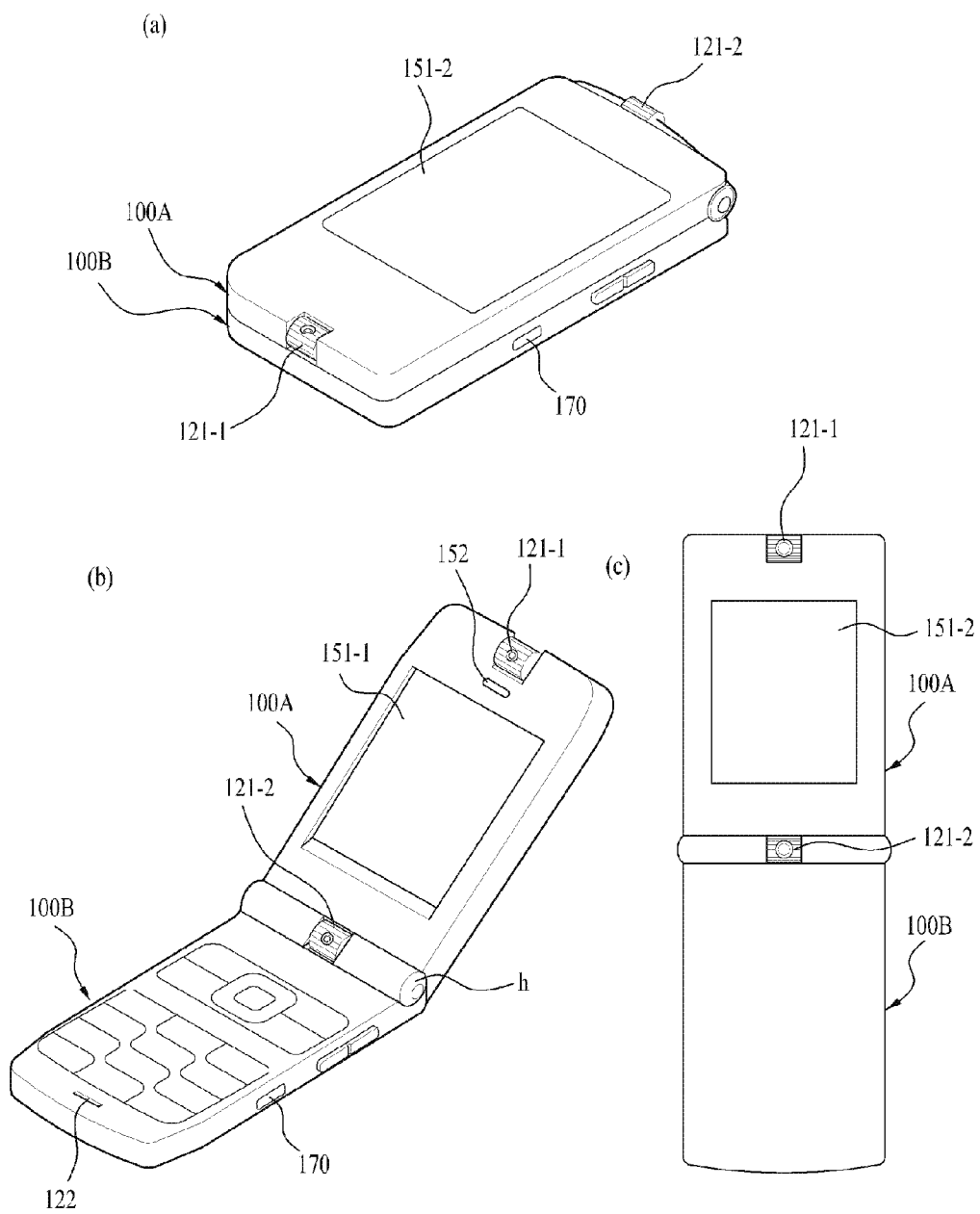

FIG. 36 (a) is a front perspective diagram of a mobile terminal in a closed configuration. FIG. 36 (b) is a front perspective diagram of the mobile terminal in an open configuration. And, FIG. 36 (c) is a diagram of a backside of the mobile terminal in an open configuration.

Referring to FIG. 36, a first camera 121-1 can be rotatably installed to one end of a first body 100A, and more particularly, to an end portion of the first body 100A opposing a hinge part h. and, the second camera 121-2 is rotatably installed to the hinge part h enabling the first and second bodies 100A and 100B to be rotatably connected together.

In this case, although a distance between the first and second cameras 121-1 and 121-2 is not adjustable, a photographing angle or direction of each of the cameras is freely adjustable. Therefore, it is able to generate a 3D image by photographing the same subject in a manner of matching the photographing directions in front and rear directions. And, it is also bale to generate a high-resolution image, a panoramic image and the like in a manner of changing the photographing angles.

Figure 37:
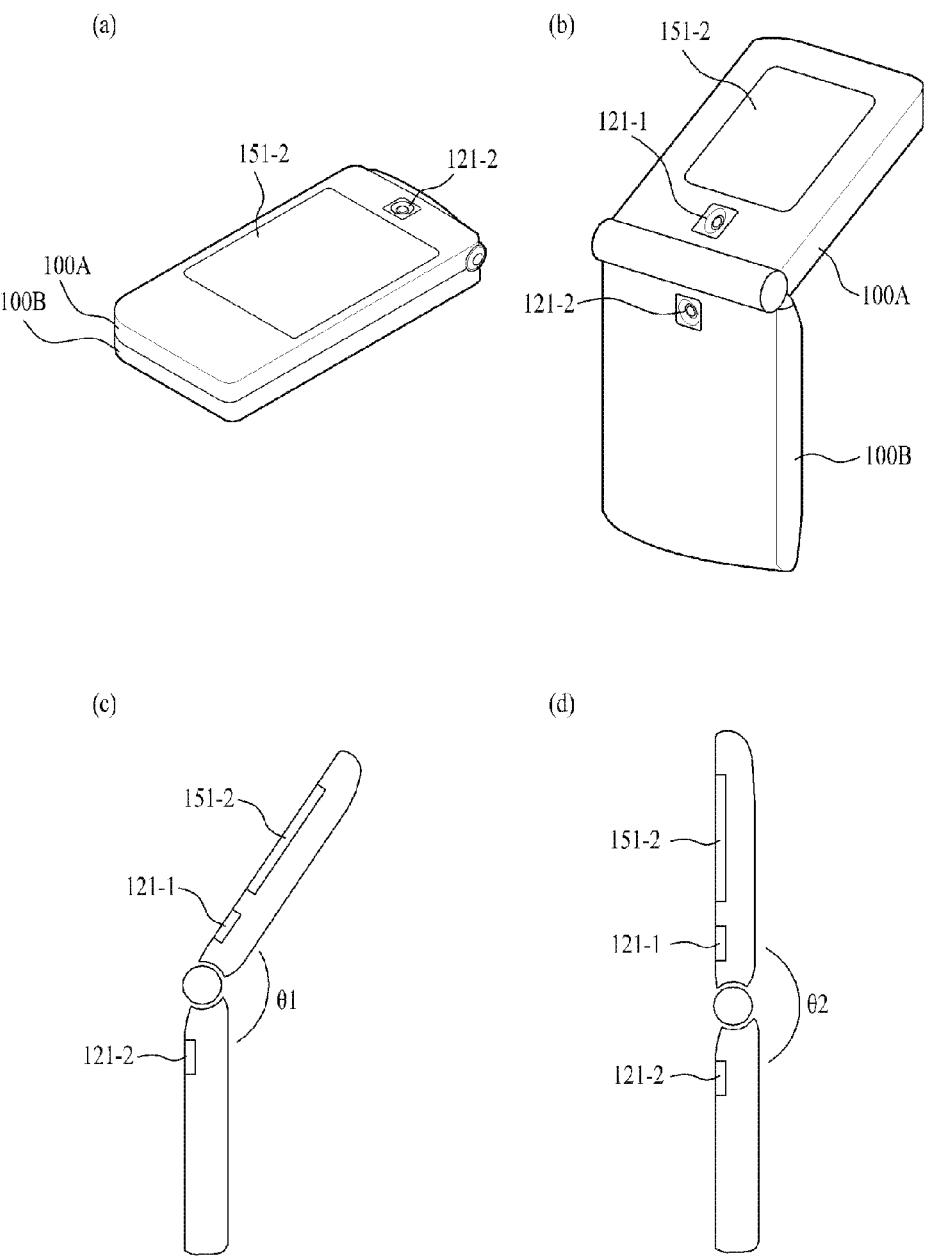

FIG. 37 shows a case that the position of the first or second camera 121-1 or 121-2 is changed in the mobile terminal shown in FIG. 35 or FIG. 36.

Referring to FIG. 37, a first camera 121-1 can be fixed to a backside of a first display unit 151, and more particularly, to a face of the first display unit 151 having a second display unit 151' installed thereto. And, a second camera 121' can be fixed to a backside of a second body 100B.

In order to change a photographing angle or direction of each of the first and second cameras 121-1 and 121-2, it is able to use a method of adjusting a connected angle of a body having the first and second cameras 121-1 and 121-2 installed thereto instead of rotating the first and second cameras 121-1 and 121-2 in direct.

In particular, in case of attempting to generate a panoramic image, referring to FIG. 37 (c), if the first and second bodies 100A and 100B are unfolded at a first angle θ1, the photographing angles of the first and second cameras 121-1 and 121-2 differ from each other. Therefore, it is able to generate the panoramic image by connecting the photographed images to each other. Moreover, in case of attempting to generate a 3D image, referring to FIG. 37 (d), if the first and second bodies 100A and 100B are unfolded at a second angle θ2 (e.g., about 180 degrees), the photographing angles of the first and second cameras 121-1 and 121-2 become approximately equal to each other. Therefore, it is able to generate the 3D image by synthesizing the images photographed via the first and second cameras 121-1 and 121-2 together.

Besides, the first and second bodies 100A and 100B can be rotatably connected to each other via a hinge part that adopts a free-stop hinge or the like to keep various unfolded angles selectively.

Figure 38:
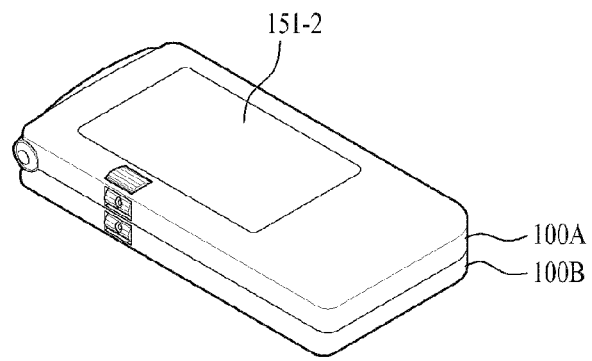
Figure 38:
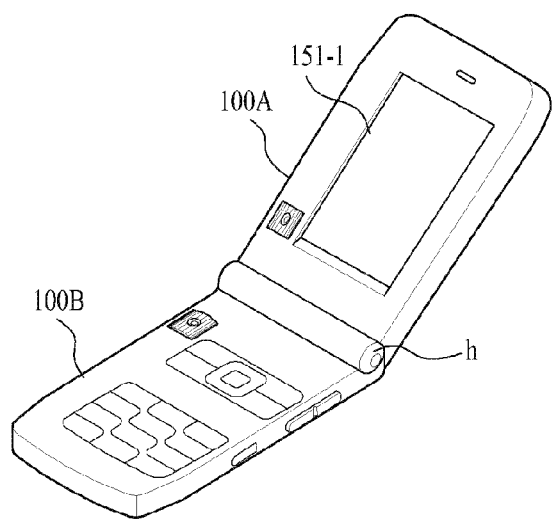
Figure 38:
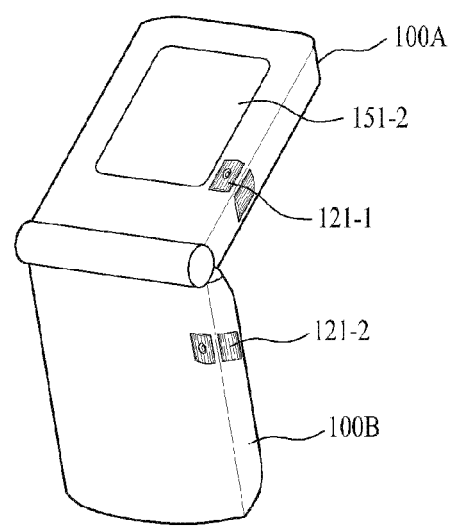

FIG. 38 shows a case that the position of the first or second camera 121-1 or 121-2 is changed in the mobile terminal shown in FIG. 35 or FIG. 36.

Referring to FIG. 38, a mobile terminal is configured in a manner that one of a first body 100A and a second body 100B can be folded or unfolded against the other. And, the first body 100A and the second body 100B can be rotatably connected to each other by a hinge part h.

A first camera 121-1 and a second camera 121-2 are installed to the first body 100A and the second body 100B, respectively. In particular, each of the first and second cameras 121-1 and 121-2 can be rotatably installed to be exposed via at least two of a front side, a rear side and a lateral side of the corresponding body.

Therefore, each of the first and second cameras 121-1 and 121-2 is rotated to enable a photographing in a direction corresponding to the exposed side. In this case, a plurality of openings (not indicated by a reference number) can be provided to each of the first and second bodies 100A and 100B to expose a lens and the like of the corresponding camera (e.g., a camera module, etc.).

The first and second cameras 121-1 and 121-2 respectively installed to the first and second bodies 100A and 100B can be configured to enable a horizontal scroll rotation when the first and second bodies 100A and 100B are unfolded.

Therefore, in case that the first and second cameras 121-1 and 121-2 are turned to face inward [cf. FIG. 38 (b)], a first image and a second image are photographed using the first and second cameras 121-1 and 121-2 by adjusting the connected angle between the first and second bodies 100A and 100B, respectively. And, it is able to generate a panoramic self-image or a 3D self-image by synthesizing the photographed first and second images together.

Figure 39:
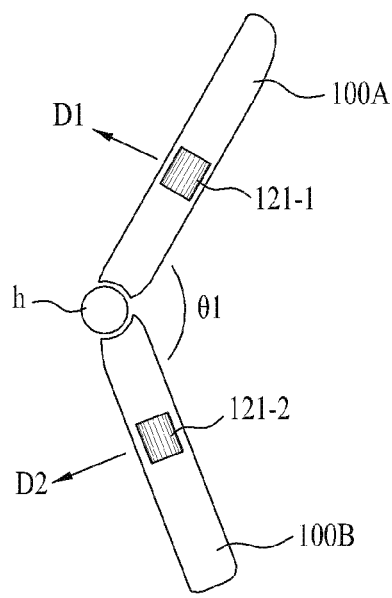
FIG. 39 is a diagram of operational statuses in various photograph modes of the mobile terminal shown in FIG. 38.
Figure 39:
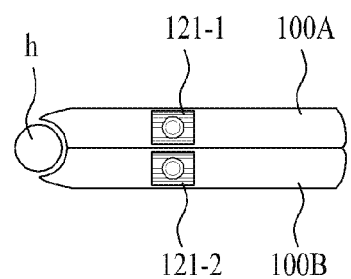
Figure 39:
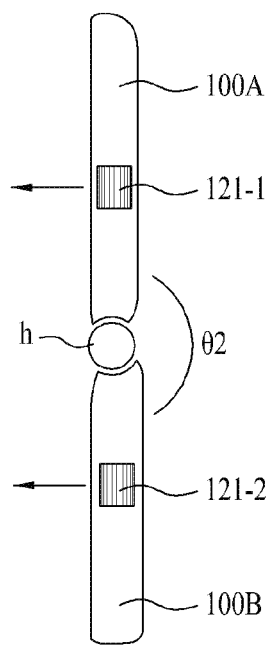
Figure 39:
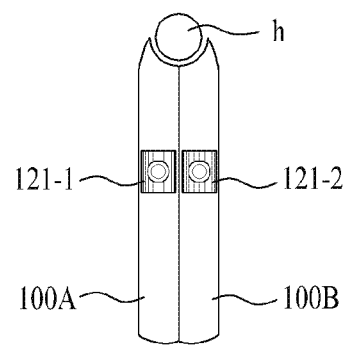

FIG. 39 is a diagram of operational statuses in various photograph modes of the mobile terminal shown in FIG. 38.

In particular, FIG. 39 (a) shows a state that bodies constructing a body are unfolded at a first angle θ1 to generate a panoramic image. FIG. 39 (b) shows a state that bodies constructing a body are unfolded at a second angle θ2 to generate a 3D image. FIG. 39 (c) shows a state that bodies are folded to generate a vertical high-resolution image. And, FIG. 39 (d) shows a state that bodies are folded to generate a horizontal high-resolution image.

The first and second cameras 121-1 and 121-2 shown in FIG. 38 or FIG. 39 are installed to be rotatable in a direction vertical to a turning direction of the body.

The first and second cameras 121-1 and 121-2 are rotatably installed in FIG. 39. This is to support various photograph modes in a manner that the camera is exposed in at least two directions of a front side, a rear side and a lateral side of each body constructing a mobile terminal.

Therefore, the change of the photographing angle for generating a 3D or panoramic image in FIG. 38 or FIG. 39 depends on a method of adjusting a body connected angle instead of camera rotation [cf. FIG. 39 (a), FIG. 39 (b)].

The state shown in FIG. 39 (a) or FIG. 39 (b) can indicate a state for a photographing in a panoramic photograph mode or a 3D photograph mode while the cameras are turned in outer directions D1 and D2 of the bodies 100A and 100B, respectively.

In this case, the panoramic photograph mode means the mode for generating a panoramic image by synthesizing first and second images photographed via the first and second cameras 121-1 and 121-2 together. And, the 3D photograph mode can mean the mode for generating a 3D image by synthesizing first and second images photographed via the first and second cameras 121-1 and 121-2 together. In particular, as the panoramic image represents an image of a wide angle by increasing a horizontal resolution, it can correspond to a high-resolution image in a broad sense.

The mobile terminal shown in FIG. 39 (c) or FIG. 39 (d) assumes that the first body 100A and the second body 100B are folded.

In this case, the high-resolution image can include a vertical image generated in a manner of connecting a horizontal image photographed via the first camera 121-1 and a horizontal image photographed via the second camera 121-2 to each other in a vertical direction. Alternatively, the high-resolution image can include a horizontal image generated in a manner of connecting a vertical image photographed via the first camera 121-1 and a vertical image photographed via the second camera 121-2 to each other in a horizontal direction.

The first and second cameras 121-1 and 121-2 respectively installed to the first and second bodies 100A and 100B are arranged at positions adjacent to each other. And, it is able to adjust a range of an overlapped area between first and second images by adjusting photographing angles of the first and second cameras 121-1 and 121-2.

Therefore, the first and second images photographed in the horizontal direction in the state shown in FIG. 39 (c) are usable to generate a vertically stacked and connected high-resolution image. And, the first and second images photographed in the vertical direction in the state shown in FIG. 39 (*d*) are usable to generate a horizontally connected high-resolution image.

In particular, referring to FIG. 39 (*c*), if the first and second images photographed in the horizontal direction are synthesized together in a manner of being stacked on each other, it is able to obtain a vertical high-resolution image having a resolution improved twice better than that of the first or second image. In particular, referring to FIG. 39 (*d*), if the first and second images photographed in the vertical direction are synthesized together in a manner of being laterally connected to each other, it is able to obtain a horizontal high-resolution image having a resolution improved twice better than that of the first or second image.

According to the above-mentioned embodiments, when the third image is generated by synthesizing the first and second images respectively photographed via the first and second cameras 121-1 and 121-2 in the generating step S370 shown in FIG. 3, the controller 180 is able to generate one of a 3D image, a panoramic image and a high-resolution image.

In doing so, if a currently set photograph mode is a 3D photograph mode, the controller 180 generates the 3D image. If a currently set photograph mode is a panorama photograph mode, the controller 180 generates the panoramic image. And, if a currently set photograph mode is a high-resolution photograph mode, the controller 180 generates the high-resolution image. In particular, in generating the panoramic image, the controller 180 is able to generate the panoramic image in a manner of determining the identity of the boundary areas of the first and second images and then connecting the boundary areas.

Moreover, the controller 180 is able to adjust the photographing direction or the photographing angle of each of the first and second cameras 121-1 and 121-2 according to the currently set photograph mode [cf. FIGS. 33 to 39].

Figure 40:
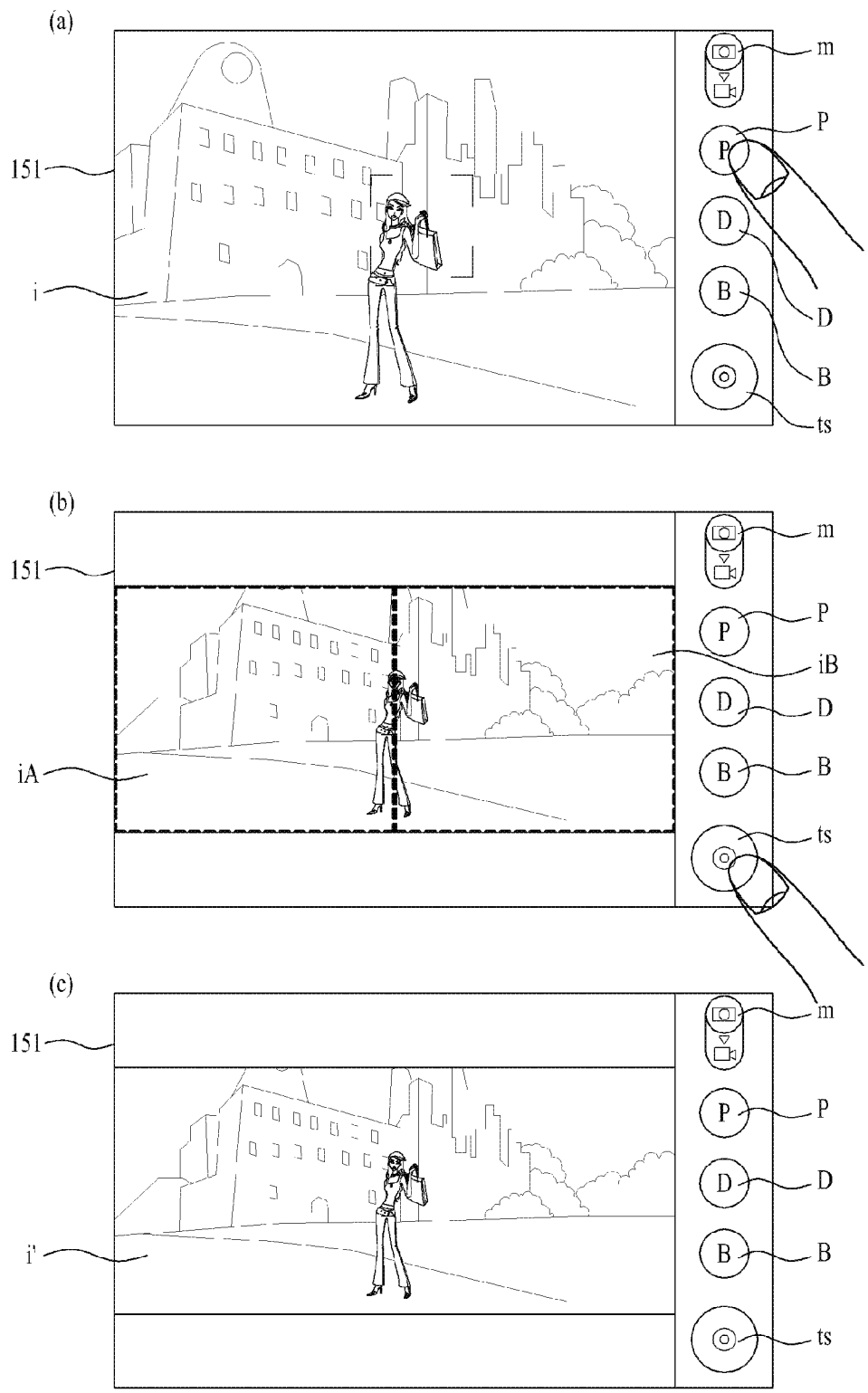
FIG. 40 is a diagram of a process for generating a panoramic image from synthesizing first and second images photographed in the operational status shown in FIG. 39 (a) together.

FIG. 40 is a diagram of a process for generating a panoramic image from synthesizing first and second images photographed in the operational status shown in FIG. 39 (*a*) together. And, FIG. 41 is a diagram of a process for generating a high-resolution image from synthesizing first and second images photographed in the operational status shown in FIG. 39 (*d*) together.

For clarity of the following description, assume that the mobile terminal includes the display unit 151 of a touchscreen type. And, assume that the mobile terminal 100 is able to receive an input of a control signal for a photographing via the display unit 151.

Figure 41:
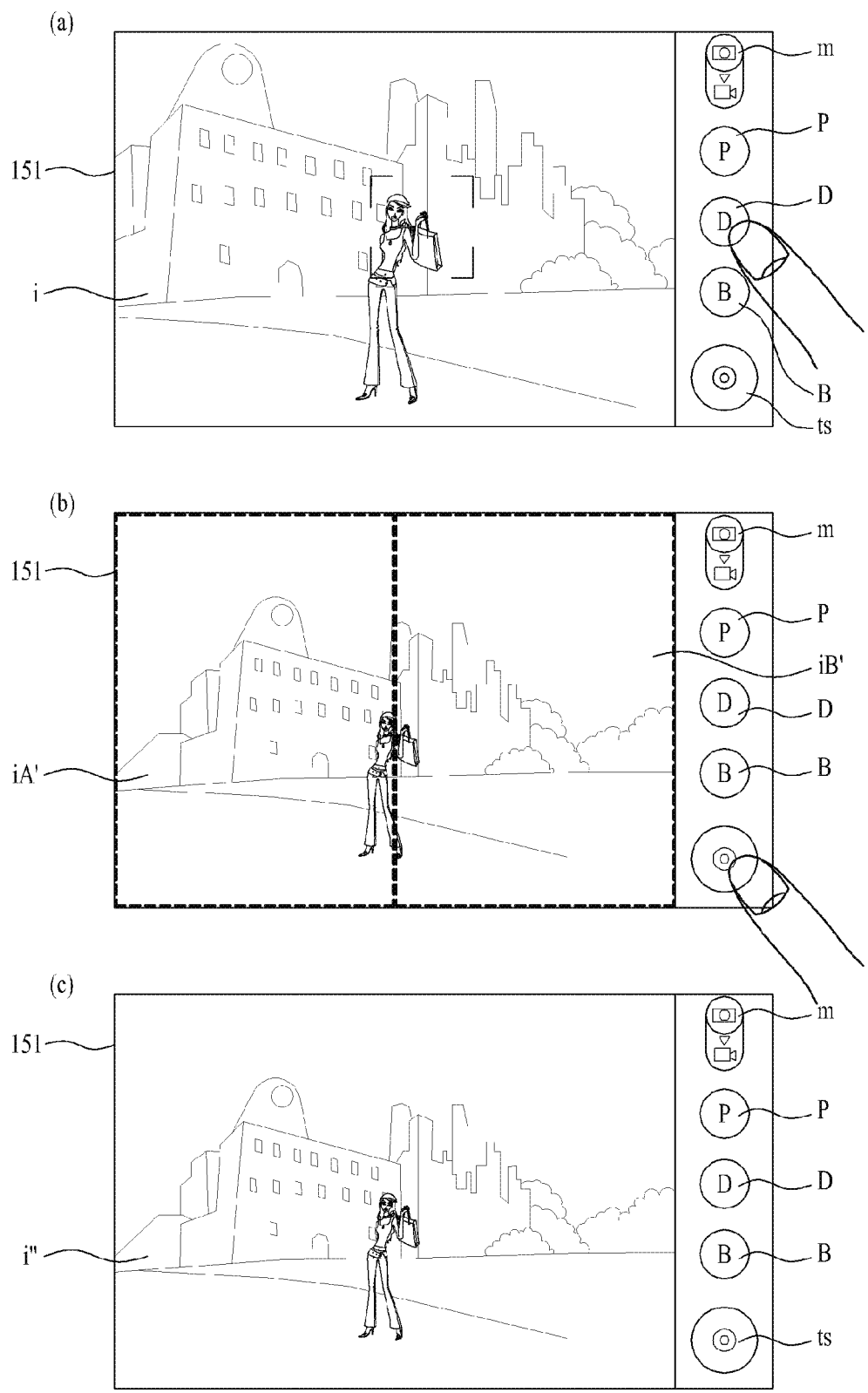
FIG. 41 is a diagram of a process for generating a high-resolution image from synthesizing first and second images photographed in the operational status shown in FIG. 39 (d) together.

Referring to FIG. 40 and FIG. 41, the display unit 151 is able to display a plurality of icons respectively related to corresponding control signals. For instance, an icon m for receiving a command for a switching to a still picture photograph mode, a panorama photograph mode icon P, a high-resolution photograph mode icon D, a normal photograph mode icon B, a 3D photograph mode icon (not shown in the drawings) and the like can be displayed on the display unit 151. And, a photograph shutter icon ts and the like can be further displayed on the display unit 151.

Referring to FIG. 40 (*a*), an image i inputted to either the first camera 121-1 or the second camera 121-2 can be displayed as a preview image on the display unit 151 in a photograph standby mode.

If a user touches or pressurizes the panorama photograph mode icon P to select a panorama photograph mode, a panoramic image, in which first and second images iA and iB respectively photographed via the first and second cameras 121-1 and 121-2 in a horizontal direction are laterally connected to each other by the controller 180, is displayed on the display unit 151.

Subsequently, the controller 180 is able to generate a panoramic image i' in a manner of determining the identity of the boundary areas of the first and second images iA and iB and then connecting the boundary areas.

If a photograph signal is inputted by touching the photograph shutter icon ts [FIG. 40 (*b*)], a complete panoramic image i' is displayed on the display unit 151 and simultaneously stored.

Referring to FIG. 41, while a preview image i is displayed [FIG. 41 (*a*)], if a user touches or pressurizes the high resolution photograph mode icon D to select a high resolution photograph mode, a high-resolution image, in which first and second images iA' and iB' respectively photographed via the first and second cameras 121-1 and 121-2 in a vertical direction are laterally connected to each other by the controller 180, is displayed on the display unit 151.

Subsequently, the controller 180 is able to generate a synthetic high-resolution image i'' in a manner of determining the identity of the boundary areas of the first and second images iA' and iB' and then connecting the boundary areas.

If a photograph signal is inputted by touching the photograph shutter icon ts [FIG. 41 (*b*)], a complete panoramic image I'' is displayed on the display unit 151 and simultaneously stored.

According to one embodiment of the present invention, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

Accordingly, the present invention provides the following effects and/or advantages.

First of all, the present invention generates a new photographed image by synthesizing a plurality of images photographed to match each photographing condition using a plurality of cameras, thereby providing a user with the new photographed image reflecting all of a plurality of photographing conditions instead of providing an actually photographed image.

Secondly, the present invention provides a touchscreen with a camera photograph command key for controlling a plurality of cameras individually or in common, thereby facilitating a user to control a plurality of the cameras.

Thirdly, the present invention generates a new image by synthesizing a plurality of images photographed using a plurality of cameras, thereby generating a 3D image, a panoramic image, a high-resolution image and the like.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A mobile terminal, comprising:
a display unit configured for displaying an image;
a first camera configured for capturing a first image;
a second camera configured for capturing a second image; and
a controller configured for:
receiving input of a photograph command for a two-dimensional (2D) photograph mode;
controlling the first camera to photograph the first image based on a first photographing condition with a first time interval after receiving the input of the photograph command, the first image focused on a first point;

controlling the second camera to photograph the second image based on a second photographing condition with a second time interval after receiving the input of the photograph command, the second image focused on a second point that is different from the first point, and wherein the first time interval is different than the second time interval;

generating a third image based on the first image and the second image, the third image comprising a multi-focus point image focused on the first point and the second point, wherein the third image includes a multi-focused point of the first point of the first image and the second point of the second image, and wherein the third image comprises a 2D stereoscopic image;

controlling the display unit to display the generated third image;

controlling the display unit to display a first indicator and a second indicator, which respectively correspond to the first camera and the second camera;

receiving a touch and drag input relating to one of the first indicator and the second indicator;

setting the first time interval, when the touch and drag input relates to the first indicator, to an amount corresponding to a drag distance of the touch and drag input; and setting the second time interval, when the touch and drag input relates to the second indicator, to an amount corresponding to a drag distance of the touch and drag input.

2. The mobile terminal of claim 1, wherein the controller is further configured for adjusting a photographing angle of the first camera and a photographing angle of the second camera to face a same object.

3. The mobile terminal of claim 1, wherein:
the first photographing condition includes at least a near focus setting, a first exposure time setting or a video photographing setting;
the second photographing condition includes at least a far focus setting, a second exposure time setting or a still picture photographing setting; and
the second photographing condition corresponds to the first photographing condition.

4. The mobile terminal of claim 1, wherein the controller is further configured for controlling the display unit to:
display at least the first image or the second image as a preview image prior to photographing the first image and the second image; and
display the first photographing condition and the second photographing condition within the displayed preview image.

5. The mobile terminal of claim 1, wherein the controller is further configured for controlling the display unit to display a camera photograph command key including a first camera zone, a second camera zone and a common zone.

6. The mobile terminal of claim 5, wherein the controller is further configured for:
receiving an input of a photograph condition setting signal via the camera photograph command key;
setting the first photographing condition and the second photographing condition based on the received photograph condition setting signal; and
controlling the first camera to photograph the first image and controlling the second camera to photograph the second image when the photograph condition setting signal is a photo command signal.

7. The mobile terminal of claim 1, wherein:
the first camera is further configured for performing video photographing of the first image;
the second camera is further configured for performing still picture photographing of the second image; and
the controller is further configured for controlling the display unit to display the video photographed first image on an entire screen of the display unit and to display at least one still photographed second image on a prescribed region of the screen after completion of video photographing via the first camera.

8. The mobile terminal of claim 7, wherein the controller is further configured for:
receiving an input of a selection signal to select one of the at least one still photographed second image; and
controlling the display unit to display the video photographed first image starting at a photograph timing point of the selected one of the at least one still photographed second image based on the received selection signal.

9. The mobile terminal of claim 1, wherein the control unit is further configured for:
generating the third image by synthesizing the first image and second image;
controlling the display unit to display a photographed image list including the generated third image; and
controlling the display unit to display an indicator indicating that the generated third image is a synthesized image of the first image and second image.

10. The mobile terminal of claim 1, further comprising:
a first body including the first camera;
a second body including the second camera; and
a hinge portion configured for rotatably coupling the first body and the second body.

11. The mobile terminal of claim 10, wherein the hinge portion comprises a free-stop hinge configured for adjusting open angles between the first body and the second body in stages.

12. The mobile terminal of claim 1, wherein the generated third image includes at least a panoramic image or a high-resolution image.

13. The mobile terminal of claim 12, wherein:
the photograph command is further for at least a panorama photograph mode or a high-resolution photograph mode; and
generating the third image is further based on the photograph command.

14. A method of controlling a mobile terminal, the method performed by a controller and comprising:
receiving input of a photograph command for a two-dimensional (2D) photograph mode;
controlling a first camera to photograph a first image based on a first photographing condition with a first time interval after receiving the input of the photograph command, the first image focused on a first point;
controlling a second camera to photograph a second image based on a second photographing condition with a second time interval after receiving the input of the photograph command, the second image focused on a second point that is different from the first point;
generating a third image based on the first image and the second image, the third image comprising a multi-focus point image focused on the first point and the second point, wherein the third image includes a multi-focused point of the first point of the first image and the second point of the second image, and wherein the third image comprises a 2D stereoscopic image;

controlling a display unit to display the generated third image;

controlling the display unit to display a first indicator and a second indicator which respectively correspond to the first camera and the second camera;

receiving a touch-drag input relating to one of the first indicator and the second indicator;

setting the first time interval, when the touch and drag input relates to the first indicator, to an amount corresponding to a drag distance of the touch and drag input; and setting the second time interval, when the touch and drag input relates to the second indicator, to an amount corresponding to a drag distance of the touch and drag input.

15. The method of claim 14, further comprising:

controlling the display unit to display at least the first image or the second image as a preview image prior to photographing the first image and the second image; and controlling the display unit to display the first photographing condition and the second photographing condition within the displayed preview image.

16. The method of claim 14, further comprising controlling the display unit to display a camera photograph command key including a first camera zone, a second camera zone and a common zone.

17. The method of claim 14, further comprising:

video photographing the first image via the first camera;

still picture photographing the second image via the second camera; and controlling the display unit to display the video photographed first image on an entire screen of the display unit and to display at least one still photographed second image on a prescribed region of the screen after completion of video photographing via the first camera.

18. The method of claim 14, further comprising:

video photographing the first image via the first camera;

still picture photographing the second image via the second camera; and controlling the display unit to display the video photographed first image on an entire screen of the display unit and to display at least one still photographed second image on a prescribed region of the screen during video photographing via the first camera.

19. The method of claim 14, further comprising:

generating the third image by synthesizing the first image and second image;

controlling the display unit to display a photographed image list including the generated third image; and controlling the display unit to display an indicator indicating that the generated third image is a synthesized image of the first image and second image.

* * * * *